(12) United States Patent
Franklin et al.

(10) Patent No.: US 11,976,212 B2
(45) Date of Patent: May 7, 2024

(54) POLYOLS, POLYURETHANE DISPERSIONS, AND USES THEREOF

(71) Applicant: Checkerspot, Inc., Alameda, CA (US)

(72) Inventors: Scott Franklin, Woodside, CA (US); Zoran Petrovic, Pittsburg, KS (US); Jian Hong, Pittsburg, KS (US); Milica Lovric Vukovic, Cacak (RS); Jasna Djonlagic, Pittsburg, KS (US)

(73) Assignee: Checkerspot, Inc., Alameda, CA (US)

( * ) Notice: Subject to any disclaimer, the term of this patent is extended or adjusted under 35 U.S.C. 154(b) by 0 days.

(21) Appl. No.: 18/241,561

(22) Filed: Sep. 1, 2023

(65) Prior Publication Data

US 2023/0407130 A1    Dec. 21, 2023

Related U.S. Application Data

(63) Continuation of application No. PCT/US2022/051436, filed on Nov. 30, 2022.
(Continued)

(51) Int. Cl.
*C09D 175/08* (2006.01)
*C08G 18/08* (2006.01)
(Continued)

(52) U.S. Cl.
CPC ....... *C09D 175/08* (2013.01); *C08G 18/0866* (2013.01); *C08G 18/12* (2013.01); *C08G 18/246* (2013.01); *C08G 18/4018* (2013.01); *C08G 18/42* (2013.01); *C08G 18/4825* (2013.01); *C08G 18/755* (2013.01); *C08G 18/758* (2013.01); *C09D 7/65* (2018.01);

*D06B 3/18* (2013.01); *D06M 13/224* (2013.01); *D06M 13/2246* (2013.01); *D06M 15/568* (2013.01);
(Continued)

(58) Field of Classification Search
CPC .................................................. C08G 18/0866
See application file for complete search history.

(56) References Cited

U.S. PATENT DOCUMENTS 2,059,052 A   10/1936   Sperr, Jr.
2,822,368 A   2/1958    Rowland et al.
(Continued)

FOREIGN PATENT DOCUMENTS

CN    106995519 B    9/2019
DE    202006018792 U1   4/2008
(Continued)

OTHER PUBLICATIONS

Co-pending U.S. Appl. No. 18/486,450, inventors Rand; Charles et al., filed Oct. 13, 2023.
(Continued)

*Primary Examiner* — Peter F Godenschwager
(74) *Attorney, Agent, or Firm* — Wilson Sonsini Goodrich & Rosati

(57) ABSTRACT

Provided herein are surface treating compositions for imparting beneficial surface properties to substrates. The compositions can be prepared by reacting a bio-based polyol with an isocyanate and an ionogenic molecule. The compositions can be used to treat a variety of substrates to provide enhanced properties to a surface of the substrate. Also provided are methods for the chemical modification of triglycerides and fatty acids and use thereof in creating beneficial surface treating compositions.

23 Claims, 10 Drawing Sheets

Scheme to create polyols from triglyceride oil via epoxidation and ring opening of FAMEs

Related U.S. Application Data

(60) Provisional application No. 63/287,573, filed on Dec. 9, 2021, provisional application No. 63/284,874, filed on Dec. 1, 2021.

(51) Int. Cl.

| | |
|---|---|
| *C08G 18/12* | (2006.01) |
| *C08G 18/24* | (2006.01) |
| *C08G 18/40* | (2006.01) |
| *C08G 18/42* | (2006.01) |
| *C08G 18/48* | (2006.01) |
| *C08G 18/75* | (2006.01) |
| *C09D 7/65* | (2018.01) |
| *D06B 3/18* | (2006.01) |
| *D06M 13/224* | (2006.01) |
| *D06M 15/568* | (2006.01) |
| *D06M 101/06* | (2006.01) |
| *D06M 101/32* | (2006.01) |
| *D06M 101/34* | (2006.01) |
| *D06M 101/38* | (2006.01) |

(52) U.S. Cl.
CPC .... *D06M 2101/06* (2013.01); *D06M 2101/32* (2013.01); *D06M 2101/34* (2013.01); *D06M 2101/38* (2013.01); *D06M 2200/12* (2013.01)

(56) References Cited

U.S. PATENT DOCUMENTS

| | | | |
|---|---|---|---|
| 4,248,802 A | 2/1981 | Kuntz | |
| 4,349,904 A | 9/1982 | Janssen et al. | |
| 4,483,802 A | 11/1984 | Gartner et al. | |
| RE31,812 E | 1/1985 | Kuntz | |
| 4,545,941 A | 10/1985 | Rosenburg | |
| 5,130,404 A | 7/1992 | Freeland | |
| 6,107,433 A | 8/2000 | Petrovic et al. | |
| 6,180,686 B1 | 1/2001 | Kurth et al. | |
| 6,414,172 B1 | 7/2002 | Garces et al. | |
| 6,562,933 B2 | 5/2003 | Ohmori et al. | |
| 6,599,977 B1 | 7/2003 | Hesselmans et al. | |
| 6,924,336 B2 | 8/2005 | Faust et al. | |
| 7,883,882 B2 | 2/2011 | Franklin et al. | |
| 7,935,515 B2 | 5/2011 | Franklin et al. | |
| 8,187,860 B2 | 5/2012 | Franklin et al. | |
| 8,222,010 B2 | 7/2012 | Franklin et al. | |
| 8,268,610 B2 | 9/2012 | Franklin et al. | |
| 8,435,767 B2 | 5/2013 | Franklin et al. | |
| 8,450,083 B2 | 5/2013 | Day et al. | |
| 8,476,059 B2 | 7/2013 | Trimbur et al. | |
| 8,497,116 B2 | 7/2013 | Trimbur et al. | |
| 8,512,999 B2 | 8/2013 | Trimbur et al. | |
| 8,518,689 B2 | 8/2013 | Trimbur et al. | |
| 8,557,249 B2 | 10/2013 | Brooks et al. | |
| 8,592,188 B2 | 11/2013 | Franklin et al. | |
| 8,633,012 B2 | 1/2014 | Franklin et al. | |
| 8,647,397 B2 | 2/2014 | Trimbur et al. | |
| 8,674,180 B2 | 3/2014 | Franklin et al. | |
| 8,697,402 B2 | 4/2014 | Trimbur et al. | |
| 8,697,427 B2 | 4/2014 | Franklin et al. | |
| 8,765,424 B2 | 7/2014 | Franklin et al. | |
| 8,772,575 B2 | 7/2014 | Franklin et al. | |
| 8,790,914 B2 | 7/2014 | Trimbur et al. | |
| 8,802,422 B2 | 8/2014 | Trimbur et al. | |
| 8,822,176 B2 | 9/2014 | Day et al. | |
| 8,822,177 B2 | 9/2014 | Day et al. | |
| 8,846,375 B2 | 9/2014 | Franklin et al. | |
| 8,852,885 B2 | 10/2014 | Franklin et al. | |
| 8,871,985 B2 | 10/2014 | Van Vliet et al. | |
| 8,889,401 B2 | 11/2014 | Trimbur et al. | |
| 8,889,402 B2 | 11/2014 | Trimbur et al. | |
| 8,945,908 B2 | 2/2015 | Franklin et al. | |
| 8,951,777 B2 | 2/2015 | Franklin et al. | |
| 9,000,062 B2 | 4/2015 | Albach et al. | |
| 9,062,294 B2 | 6/2015 | Franklin et al. | |
| 9,066,527 B2 | 6/2015 | Franklin et al. | |
| 9,068,213 B2 | 6/2015 | Franklin et al. | |
| 9,102,973 B2 | 8/2015 | Franklin et al. | |
| 9,109,239 B2 | 8/2015 | Franklin et al. | |
| 9,200,307 B2 | 12/2015 | Franklin et al. | |
| 9,249,252 B2 | 2/2016 | Ngantung et al. | |
| 9,249,436 B2 | 2/2016 | Franklin et al. | |
| 9,249,441 B2 | 2/2016 | Franklin et al. | |
| 9,255,282 B2 | 2/2016 | Franklin et al. | |
| 9,279,136 B2 | 3/2016 | Franklin et al. | |
| 9,328,351 B2 | 5/2016 | Franklin et al. | |
| 9,353,389 B2 | 5/2016 | Franklin et al. | |
| 9,375,703 B2 | 6/2016 | Harlin et al. | |
| 9,388,435 B2 | 7/2016 | Franklin et al. | |
| 9,493,640 B2 | 11/2016 | Cernohous et al. | |
| 9,518,277 B2 | 12/2016 | Franklin et al. | |
| 9,551,017 B2 | 1/2017 | Franklin et al. | |
| 9,567,615 B2 | 2/2017 | Davis | |
| 9,593,351 B2 | 3/2017 | Franklin et al. | |
| 9,649,368 B2 | 5/2017 | Franklin et al. | |
| 9,657,299 B2 | 5/2017 | Franklin et al. | |
| 9,758,757 B2 | 9/2017 | Harlin et al. | |
| 9,796,949 B2 | 10/2017 | Dummer et al. | |
| 9,909,155 B2 | 3/2018 | Franklin et al. | |
| 10,006,034 B2 | 6/2018 | Franklin et al. | |
| 10,053,646 B2 | 8/2018 | Schiff-Deb et al. | |
| 10,053,715 B2 | 8/2018 | Franklin et al. | |
| 10,100,341 B2 | 10/2018 | Franklin et al. | |
| 10,125,382 B2 | 11/2018 | Casolari et al. | |
| 10,138,435 B2 | 11/2018 | Trimbur et al. | |
| 10,167,489 B2 | 1/2019 | Franklin et al. | |
| 10,260,076 B2 | 4/2019 | Franklin et al. | |
| 10,287,613 B2 | 5/2019 | Franklin et al. | |
| 10,316,299 B2 | 6/2019 | Davis et al. | |
| 10,344,305 B2 | 7/2019 | Franklin et al. | |
| 10,557,114 B2 | 2/2020 | Rudenko et al. | |
| 10,683,522 B2 | 6/2020 | Franklin et al. | |
| 11,118,134 B2 | 9/2021 | Franklin | |
| 11,208,369 B2 | 12/2021 | Petrovic et al. | |
| 11,352,602 B2 | 6/2022 | Wee et al. | |
| 11,667,870 B2 | 6/2023 | Franklin | |
| 11,673,850 B2 | 6/2023 | Petrovic et al. | |
| 11,691,382 B2 | 7/2023 | Sterbenz et al. | |
| 11,873,405 B2 | 1/2024 | Parker et al. | |
| 2004/0241392 A1 | 12/2004 | Sorrentino | |
| 2006/0264568 A1 | 11/2006 | Pajerski | |
| 2007/0117947 A1 | 5/2007 | Wehner | |
| 2008/0118992 A1 | 5/2008 | Bellini et al. | |
| 2009/0260754 A1 | 10/2009 | Te | |
| 2010/0267925 A1 | 10/2010 | Abraham et al. | |
| 2010/0311992 A1 | 12/2010 | Petrovic et al. | |
| 2011/0015292 A1 | 1/2011 | Radhakrishnan et al. | |
| 2011/0113679 A1 | 5/2011 | Cohen et al. | |
| 2011/0256282 A1 | 10/2011 | Piechocki et al. | |
| 2012/0073186 A1 | 3/2012 | Knuth et al. | |
| 2012/0130039 A1 | 5/2012 | Millero, Jr. et al. | |
| 2012/0135479 A1 | 5/2012 | Dillon et al. | |
| 2012/0196079 A1 | 8/2012 | Brauers et al. | |
| 2012/0238667 A1 | 9/2012 | Gotou et al. | |
| 2013/0323382 A1 | 12/2013 | Franklin et al. | |
| 2013/0338385 A1 | 12/2013 | Franklin et al. | |
| 2014/0145374 A1 | 5/2014 | Altonen et al. | |
| 2014/0178950 A1 | 6/2014 | Franklin et al. | |
| 2014/0256600 A1 | 9/2014 | Dillon et al. | |
| 2014/0288636 A1 | 9/2014 | Headley, Jr. et al. | |
| 2015/0299099 A1 | 10/2015 | Narine et al. | |
| 2016/0002566 A1 | 1/2016 | Vanhercke et al. | |
| 2016/0009852 A1 | 1/2016 | Yu et al. | |
| 2016/0176800 A1 | 6/2016 | Schiff-Deb et al. | |
| 2016/0193793 A1 | 7/2016 | Filippini | |
| 2016/0194584 A1 | 7/2016 | Ngantung et al. | |
| 2016/0312151 A1 | 10/2016 | Narine et al. | |
| 2016/0348119 A1 | 12/2016 | Franklin et al. | |
| 2017/0066893 A1 | 3/2017 | Falken | |
| 2017/0240253 A1 | 8/2017 | Woo | |
| 2017/0335057 A1 | 11/2017 | Tabor et al. | |
| 2018/0127350 A1 | 5/2018 | Hapiot et al. | |
| 2018/0163170 A1 | 6/2018 | Wee et al. | |

(56) References Cited

U.S. PATENT DOCUMENTS

| | | | |
|---|---|---|---|
| 2018/0237811 A1 | 8/2018 | Franklin et al. |
| 2021/0130858 A1 | 5/2021 | Franklin et al. |
| 2021/0244064 A1 | 8/2021 | Brooks et al. |
| 2021/0246434 A1 | 8/2021 | Ko et al. |
| 2022/0356292 A1 | 11/2022 | Sterbenz et al. |
| 2023/0167224 A1 | 6/2023 | Franklin et al. |

FOREIGN PATENT DOCUMENTS

| | | |
|---|---|---|
| JP | 2009114247 A | 5/2009 |
| JP | 2011516634 A | 5/2011 |
| JP | 2014500349 A | 1/2014 |
| JP | 2015521033 A | 7/2015 |
| JP | 2018509516 A | 4/2018 |
| KR | 101296172 B1 | 8/2013 |
| WO | WO-0238375 A2 | 5/2002 |
| WO | WO-2006116456 A1 | 11/2006 |
| WO | WO-2008151149 A2 | 12/2008 |
| WO | WO-2009117665 A2 | 9/2009 |
| WO | WO-2010006032 A1 | 1/2010 |
| WO | WO-2010045368 A2 | 4/2010 |
| WO | WO-2010063031 A2 | 6/2010 |
| WO | WO-2010063032 A2 | 6/2010 |
| WO | WO-2010120923 A1 | 10/2010 |
| WO | WO-2010120939 A2 | 10/2010 |
| WO | WO-2011047369 A2 | 4/2011 |
| WO | WO-2011150410 A2 | 12/2011 |
| WO | WO-2011150411 A1 | 12/2011 |
| WO | WO-2012061647 A2 | 5/2012 |
| WO | WO-2012106560 A1 | 8/2012 |
| WO | WO-2013082186 A2 | 6/2013 |
| WO | WO-2013138161 A1 | 9/2013 |
| WO | WO-2013158938 A1 | 10/2013 |
| WO | WO-2014124967 A1 | 8/2014 |
| WO | WO-2014176515 A2 | 10/2014 |
| WO | WO-2014186395 A1 | 11/2014 |
| WO | WO-2015051319 A2 | 4/2015 |
| WO | WO-2015138684 A2 | 9/2015 |
| WO | WO-2020047216 A1 | 3/2020 |
| WO | WO-2020117465 A1 | 6/2020 |
| WO | WO-2020167745 A1 | 8/2020 |
| WO | WO-2021127181 A1 | 6/2021 |
| WO | WO-2021150923 A1 | 7/2021 |
| WO | WO-2021247368 A1 | 12/2021 |
| WO | WO-2022221402 A1 | 10/2022 |
| WO | WO-2023043945 A1 | 3/2023 |
| WO | WO-2023043945 A2 | 3/2023 |
| WO | WO-2023091669 A1 | 5/2023 |
| WO | WO-2023043945 A3 | 6/2023 |
| WO | WO-2023102069 A1 | 6/2023 |
| WO | WO-2023196923 A1 | 10/2023 |
| WO | WO-2023212726 A2 | 11/2023 |
| WO | WO-2023212726 A3 | 12/2023 |

OTHER PUBLICATIONS

Co-pending U.S. Appl. No. 18/501,505, inventors Parker; Leon et al., filed Nov. 3, 2023.

Co-pending U.S. Appl. No. 18/515,988, inventor Franklin; Scott, filed Nov. 21, 2023.

Co-pending U.S. Appl. No. 18/519,816, inventors Petrovic; Zoran et al., filed Nov. 27, 2023.

Szabo et al. Safety evaluation of oleic-rich triglyceride oil produced by a heterotrophic microalgal fermentation process. Food and Chemical Toxicology 65 (2014) 301-311. Available online Jan. 3, 2014.

Acero, Polyurethane foams from renewable and sustainable polyols. Portugal: Instituto Superior Tecnico (2014).

Co-pending U.S. Appl. No. 17/396,876, inventor Franklin; Scott, filed Aug. 9, 2021.

Co-pending U.S. Appl. No. 18/156,929, inventors Parker; Leon et al., filed Jan. 19, 2023.

Co-pending U.S. Appl. No. 18/304,085, inventor Franklin; Scott, filed Apr. 20, 2023.

Co-pending U.S. Appl. No. 18/310,329, inventors Petrovic; Zoran et al., filed May 1, 2023.

Co-pending U.S. Appl. No. 18/317,748, inventors Sterbenz; Matthew et al., filed May 15, 2023.

Co-pending U.S. Appl. No. 18/345,568, inventors Witmer; Garrett et al., filed Jun. 30, 2023.

Co-pending U.S. Appl. No. 18/345,591, inventors Witmer; Garrett et al., filed Jun. 30, 2023.

Co-pending U.S. Appl. No. 18/366,323, inventor Franklin; Scott, filed Aug. 7, 2023.

Co-pending U.S. Appl. No. 18/450,573, inventors Petrovic; Zoran et al., filed Aug. 16, 2023.

Garrison, Thomas Frederick. Synthesis and characterization of vegetable oil-based polyurethane dispersions (2013). Iowa State University, Ames, Iowa. Graduate Theses and Dissertations. 13470. Retrieved Dec. 29, 2020 at URL: https://lib.dr.iastate.edu/cgi/viewcontent.cgi?article=4477&context=etd.

Jin et al. Synthesis and Characterization of N,N-Bis(2-hydroxyethyl) Cinnamamide as a Photo-Responsive Monomer. Designed Monomers and Polymers, 14:1, 47-55 (2011). DOI: 10.1163/138577210X541196.

Liang et al. Castor oil-based cationic waterborne polyurethane dispersions: Storage stability, thermo-physical properties and antibacterial properties. Industrial Crops & Products 117 (2018) 169-178. Available online Mar. 22, 2018.

Lin et al. Genetic engineering of microorganisms for biodiesel production. Bioengineered. Sep. 1, 2013; 4(5): 292-304. Published online Dec. 6, 2012. doi: 10.4161/bioe.23114.

Lu et al. Aqueous Cationic Polyurethane Dispersions from Vegetable Oils. ChemSusChem 2010, 3, 329-333. Published online on Jan. 5, 2010.

Lu et al. Soybean-Oil-Based Waterborne Polyurethane Dispersions: Effects of Polyol Functionality and Hard Segment Content on Properties. Biomacromolecules 2008, 9, 3332-3340. Published on Web Oct. 21, 2008.

McDonald. Surfing into a Greener Future. UC San Diego News Center. Apr. 23, 2015. 4 pages. URL: https://ucsdnews.ucsd.edu/feature/surfing_into_a_greener_future.

Mucci et al. Plant Oil-Based Waterborne Polyurethanes: A Brief Review. Journal of Renewable Materials, vol. 8, No. 6, pp. 579-601 (2020).

Patel et al. High conversion and productive catalyst turnovers in cross-metathesis reactions of natural oils with 2-butene. Green Chemistry, vol. 8, No. 5, pp. 450-454 (2006). First published online Mar. 22, 2006. DOI: https://doi.org/10.1039/B600956E.

PCT/US2022/051436 International Search Report and Written Opinion dated May 3, 2023.

Petrović et al. Polyols and Polyurethanes from Crude Algal Oil. Journal of the American Oil Chemists' Society, vol. 90, Issue 7, pp. 1073-1078 (Jul. 2013). First published Apr. 18, 2013. doi: https://doi.org/10.1007/s11746-013-2245-9.

Petrović. Polyurethanes from Vegetable Oils. Polymer Reviews 48:109-155 (2008).

Saalah et al. Waterborne polyurethane dispersions synthesized from jatropha oil. Industrial Crops and Products 64 (2015) 194-200. Available online Nov. 16, 2014.

Shi et al. Metabolic Engineering of Oleaginous Yeasts for Production of Fuels and Chemicals. Front Microbiol. 2017; 8: 2185. Published online Nov. 8, 2017. doi: 10.3389/fmich.2017.02185. 16 pages.

Uprety et al. Utilization of microbial oil obtained from crude glycerol for the production of polyol and its subsequent conversion to polyurethane foams. Bioresour Technol. Jul. 2017;235:309-315. doi: 10.1016/j.biortech.2017.03.126. Epub Mar. 24, 2017.

Zhang et al. Bio-based Polyurethane Foam Made from Compatible Blends of Vegetable-Oil-based Polyol and Petroleum-based Polyol. ACS Sustainable Chem Eng 3:743-749 (Mar. 6, 2015).

POLYOLS, POLYURETHANE DISPERSIONS, AND USES THEREOF

CROSS-REFERENCE

This application is a continuation of International Application No. PCT/US22/51436, filed Nov. 30, 2022, which claims the benefit of U.S. Provisional Application No. 63/284,874, filed Dec. 1, 2021, and U.S. Provisional Application No. 63/287,573, filed Dec. 9, 2021, each of which is incorporated herein by reference in its entirety.

BACKGROUND OF THE INVENTION

Various compositions can be useful for providing beneficial surface properties to substrates. Surface treating agents prepared with fluorinated compounds, for example, are prevalent in the market. However, due to environmental and human health concerns, there is an increasing interest to reduce the use of or replace fluorochemicals with fluorine-free surface treating products. Ecolabels such as "Blue Angel," which is awarded by RAL gGmbH, St. Augustin, Germany and others are continuously reinforcing this trend.

INCORPORATION BY REFERENCE

All publications, patents, and patent applications mentioned in this specification are herein incorporated by reference to the same extent as if each individual publication, patent, or patent application was specifically and individually indicated to be incorporated by reference.

SUMMARY

In some aspects, the present disclosure provides a method for producing a hydrogenated epoxidized algal oil polyol, the method comprising: a) epoxidizing an algal triglyceride (TAG) oil, thereby generating an epoxidized algal TAG oil, wherein the epoxidized algal TAG oil comprises at least about 80% epoxidized oleic acid; and b) hydrogenating the epoxidized algal TAG oil in the presence of a catalyst and hydrogen gas, thereby generating the hydrogenated epoxidized algal oil polyol. The epoxidized algal TAG oil comprising at least about 80% epoxidized oleic acid is the product of epoxidizing oleic acid moieties of the TAG.

In some embodiments, the at least about 80% of the fatty acids of the epoxidized algal TAG oil are epoxidized oleic acid moieties. The percentage of fatty acids of the epoxidized algal oil TAG oil can be determined by the areas under the curve of a GC/FID trace of fatty acid methyl esters of the TAG oil using 4 mg of C19:0 as an internal standard.

In some embodiments, the catalyst is Raney nickel.

In some embodiments, the epoxidized algal TAG oil comprises at least about 90% epoxidized oleic acid.

In some aspects, the present disclosure provides a hydrogenated epoxidized polyol, wherein the polyol comprises greater than 80% of 9-hydroxyoctadecanoic acid, 10-hydroxyoctadecanoic acid, or a combination thereof.

In some embodiments, the polyol comprises greater than 90% of 9-hydroxyoctadecanoic acid, 10-hydroxyoctadecanoic acid, or a combination thereof.

In some aspects, the present disclosure provides a TAG polyol oil, wherein greater than 80% of fatty acids of the TAG polyol oil are 9-hydroxyoctadecanoic acid, 10-hydroxyoctadecanoic acid, or a combination thereof.

In some embodiments, the polyol comprises greater than 90% of 9-hydroxyoctadecanoic acid, 10-hydroxyoctadecanoic acid, or a combination thereof.

In some aspects, the present disclosure provides a reaction mixture for producing a hydrogenated epoxidized algal oil polyol, the reaction mixture comprising: a) an epoxidized algal TAG oil, wherein the epoxidized algal TAG oil comprises about 80% epoxidized oleic acid; b) a catalyst; and c) hydrogen gas.

In some embodiments, the epoxidized algal TAG oil comprises about at least 90% epoxidized oleic acid.

In some embodiments, the catalyst is Raney nickel.

In some embodiments, the hydrogenated epoxidized algal oil polyol has a hydroxyl number of 150-160.

In some aspects, the present disclosure provides a method for producing a polyether diol, the method comprising: a) epoxidizing an algal TAG oil, thereby generating an epoxidized algal TAG oil, wherein the epoxidized algal TAG oil comprises at least about 80% epoxidized oleic acid; b) subjecting the epoxidized algal TAG oil to methanolysis, thereby generating methyl esters of the epoxidized algal TAG oil (Me-EAO); and c) ring opening the Me-EAO with an alkyl diol in the presence of a catalyst, thereby generating the polyether diol.

In some embodiments, the at least about 80% of the fatty acids of the epoxidized algal TAG oil are epoxidized oleic acid moieties. The percentage of fatty acids of the epoxidized algal oil TAG oil can be determined by the areas under the curve of a GC/FID trace of fatty acid methyl esters of the TAG oil using 4 mg of C19:0 as an internal standard.

In some embodiments, the epoxidized algal TAG oil comprises at least about 90% epoxidized oleic acid.

In some embodiments, the methanolysis of the algal oil polyol is in the presence of methanol and a methoxide salt.

In some embodiments, the methoxide salt is $KOCH_3$.

In some embodiments, the alkyl diol is 1,3-propanediol.

In some embodiments, the alkyl diol is 1,4-butanediol.

In some embodiments, the alkyl diol is 1,5-pentanediol.

In some embodiments, the alkyl diol is 1,6-hexanediol.

In some embodiments, the catalyst is tris(pentafluorophenyl)borane.

In some embodiments, the ring opening is with an excess of the Me-EAO as compared to the alkyl diol.

In some embodiments, the molar ratio of the Me-EAO and the alkyl diol is about 6 to about 1.

In some aspects, the present disclosure provides a reaction mixture for producing a polyether diol, the reaction mixture comprising: a) an epoxidized algal TAG oil, wherein the epoxidized algal TAG oil comprises methyl esters, wherein the epoxidized algal TAG oil comprises at least about 80% epoxidized oleic acid; b) an alkyl diol; and c) a catalyst.

In some aspects, the present disclosure provides a reaction mixture for producing a polyether diol, the reaction mixture comprising: a) epoxidized methyl esters cleaved from an epoxidized algal TAG oil, wherein at least about 80% of the epoxidized methyl esters are epoxidized methyl esters of oleic acid; b) an alkyl diol; and c) a catalyst.

In some embodiments, the epoxidized algal TAG oil comprises at least about 90% epoxidized oleic acid.

In some embodiments, the alkyl diol is 1,3-propanediol.

In some embodiments, the alkyl diol is 1,4-butanediol.

In some embodiments, the alkyl diol is 1,5-pentanediol.

In some embodiments, the alkyl diol is 1,6-hexanediol.

In some embodiments, the catalyst is tris(pentafluorophenyl)borane.

In some embodiments, the epoxidized algal TAG oil is in an excess as compared to the alkyl diol.

In some embodiments, the molar ratio of the epoxidized algal TAG oil and the alkyl diol is about 6 to about 1.

In some aspects, the present disclosure provides a method for producing a polyester diol, the method comprising:
a) epoxidizing an algal triglyceride oil, thereby generating an epoxidized algal triglyceride oil, wherein the epoxidized algal triglyceride oil comprises at least about 80% epoxidized oleic acid;
b) ring opening the epoxidized algal oil in the presence of an alcohol, thereby generating an algal oil polyol;
c) subjecting the algal oil polyol to methanolysis, thereby generating methyl esters of the epoxidized algal oil (Me-EAO); and
d) chain extending the Me-EAO using an alkyl diol in the presence of a catalyst, thereby generating a polyester diol.

In some embodiments, the epoxidized algal triglyceride oil comprises at least about 90% epoxidized oleic acid.

In some embodiments, the methanolysis of the algal oil polyol is in the presence of methanol and a methoxide salt.

In some embodiments, the methoxide salt is $KOCH_3$.

In some embodiments, the alkyl diol is 1,3-propanediol.

In some embodiments, the alkyl diol is 1,4-butanediol.

In some embodiments, the alkyl diol is 1,5-pentanediol.

In some embodiments, the alkyl diol is 1,6-hexanediol.

In some embodiments, the catalyst is tris(pentafluorophenyl)borane.

In some embodiments, the ring opening is with an excess of the Me-EAO as compared to the alkyl diol.

In some embodiments, the molar ratio of the Me-EAO and the alkyl diol is about 6 to about 1.

In some aspects, the present disclosure provides a reaction mixture for producing a polyester diol, the reaction mixture comprising:
a) epoxidized methyl esters cleaved from an epoxidized algal triglyceride oil, wherein at least about 80% of the epoxidized methyl esters are epoxidized methyl esters of oleic acid;
b) an alkyl diol; and
c) a catalyst.

In some embodiments, the epoxidized algal triglyceride oil comprises at least about 90% epoxidized oleic acid.

In some embodiments, the alkyl diol is 1,3-propanediol.

In some embodiments, the alkyl diol is 1,4-butanediol.

In some embodiments, the alkyl diol is 1,5-pentanediol.

In some embodiments, the alkyl diol is 1,6-hexanediol.

In some embodiments, the catalyst is titanium(IV) isopropoxide.

In some embodiments, the epoxidized algal triglyceride oil is in an excess as compared to the alkyl diol.

In some embodiments, the molar ratio of the epoxidized algal triglyceride oil and the alkyl diol is about 5 to about 1.

In some embodiments, the molar ratio of the epoxidized algal triglyceride oil and the alkyl diol is about 6 to about 1.

In some embodiments, the molar ratio of the epoxidized algal triglyceride oil and the alkyl diol is about 7 to about 1.

In some aspects, the present disclosure provides a method for producing a polyurethane dispersion, the method comprising: a) epoxidizing an algal TAG oil, thereby generating an epoxidized algal TAG oil; b) ring opening the epoxidized algal TAG oil in the presence of an alcohol, thereby generating an algal oil polyol; c) reacting the algal oil polyol with an isocyanate, an ionomer, and an additive, thereby generating an isocyanate-terminated pre-polymer; d) neutralizing the isocyanate-terminated pre-polymer with an acid or a base, thereby generating a neutralized isocyanate-terminated pre-polymer; and e) dispersing the neutralized isocyanate-terminated pre-polymer in water, thereby generating the polyurethane dispersion that encapsulates the additive, wherein the algal TAG oil comprises at least 60% of one or more monounsaturated fatty acids. The algal TAG oil comprises the one or more monounsaturated fatty acids such that the one or more monounsaturated fatty acids are at least 60% of the fatty acids appended to the glycerol backbone of the TAG.

In some embodiments, the algal TAG oil comprises at least 80% of one or more monounsaturated fatty acids. The algal TAG oil comprises the one or more monounsaturated fatty acids such that the one or more monounsaturated fatty acids are at least 80% of the fatty acids appended to the glycerol backbone of the TAG.

In some embodiments, the algal TAG oil comprises at least 90% of one or more monounsaturated fatty acids. The algal TAG oil comprises the one or more monounsaturated fatty acids such that the one or more monounsaturated fatty acids are at least 90% of the fatty acids appended to the glycerol backbone of the TAG.

In some embodiments, the one or more monounsaturated fatty acids is a C18:1 fatty acid.

In some embodiments, the one or more monounsaturated fatty acids is oleic acid.

In some embodiments, the algal TAG oil comprises at least 60% of oleic acid. The algal TAG oil comprises the oleic acid such that the oleic acid is at least 60% of the fatty acids appended to the glycerol backbone of the TAG.

In some embodiments, the algal TAG oil comprises at least 80% of oleic acid. The algal TAG oil comprises the oleic acid such that the oleic acid is at least 80% of the fatty acids appended to the glycerol backbone of the TAG.

In some embodiments, the algal TAG oil comprises at least 90% of oleic acid. The algal TAG oil comprises the oleic acid such that the oleic acid is at least 90% of the fatty acids appended to the glycerol backbone of the TAG.

In some embodiments, the algal TAG oil has an iodine value of at least 80 g $I_2$/100 g.

In some embodiments, the algal TAG oil has an iodine value of 88 g $I_2$/100 g.

In some embodiments, the epoxidized algal TAG oil comprises at least about 80% epoxidized oleic acid.

In some embodiments, the epoxidized algal TAG oil comprises at least about 90% epoxidized oleic acid.

In some embodiments, the alcohol is ethanol.

In some embodiments, the isocyanate is isophorone diisocyanate (IPDI).

In some embodiments, the isocyanate is dicyclohexylmethane diisocyanate (HMDI).

In some embodiments, the ionomer is N-methyldiethanolamine (MDEA).

In some embodiments, the additive does not react with the algal oil polyol, the isocyanate, or the ionomer.

In some embodiments, the additive is a wax.

In some embodiments, the additive is a fat.

In some embodiments, the additive is kokum butter.

In some embodiments, the additive is beeswax.

In some embodiments, the additive is carnauba wax.

In some embodiments, the additive is present in an amount of from 1-30%, from 1-10%, from 10-30%, from 10-20%, from 20-30%, e.g., about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30%.

In some embodiments, the neutralizing of the isocyanate-terminated pre-polymer is with acetic acid.

In some embodiments, the molar ratio of the algal oil polyol, the ionomer, and the isocyanate is 0.8-1.2 to 0.8-1.2 to 1.8-2.3, respectively.

In some embodiments, the molar ratio of the algal oil polyol, the ionomer, and the isocyanate is 1 to 0.95 to 2, respectively.

In some embodiments, the molar ratio of the algal oil polyol, the ionomer, and the isocyanate is 1 to 1.2 to 2.3, respectively.

In some aspects, the present disclosure provides a method for producing a polyurethane dispersion, the method comprising: a) epoxidizing an algal TAG oil, thereby generating an epoxidized algal TAG oil; b) ring opening the epoxidized algal TAG oil in the presence of ethanol, thereby generating an algal oil polyol; c) reacting the algal oil polyol with IPDI, MDEA, and kokum butter, thereby generating an isocyanate-terminated pre-polymer; d) neutralizing the isocyanate-terminated pre-polymer with acetic acid, thereby generating a neutralized isocyanate-terminated pre-polymer; and e) dispersing the neutralized isocyanate-terminated pre-polymer in water, thereby generating the polyurethane dispersion, wherein the algal TAG oil comprises at least 60% of one or more monounsaturated fatty acids, wherein the molar ratio of the algal oil polyol, the ionomer, and the isocyanate is 1 to 0.95 to 2, respectively. The algal TAG oil comprises the one or more monounsaturated fatty acids such that the one or more monounsaturated fatty acids are at least 60% of the fatty acids appended to the glycerol backbone of the TAG.

In some aspects, the present disclosure provides a method for producing a polyurethane dispersion, the method comprising: a) epoxidizing an algal TAG oil, thereby generating an epoxidized algal TAG oil; b) ring opening the epoxidized algal TAG oil in the presence of ethanol, thereby generating an algal oil polyol; c) reacting the algal oil polyol with IPDI, MDEA, and beeswax, thereby generating an isocyanate-terminated pre-polymer; d) neutralizing the isocyanate-terminated pre-polymer with acetic acid, thereby generating a neutralized isocyanate-terminated pre-polymer; and e) dispersing the neutralized isocyanate-terminated pre-polymer in water, thereby generating the polyurethane dispersion, wherein the algal TAG oil comprises at least 60% of one or more monounsaturated fatty acids, wherein the molar ratio of the algal oil polyol, the ionomer, and the isocyanate is 1 to 1.2 to 2.3, respectively. The algal TAG oil comprises the one or more monounsaturated fatty acids such that the one or more monounsaturated fatty acids are at least 60% of the fatty acids appended to the glycerol backbone of the TAG.

In some aspects, the present disclosure provides a method for producing a polyurethane dispersion, the method comprising: a) epoxidizing an algal TAG oil, thereby generating an epoxidized algal TAG oil; b) ring opening the epoxidized algal TAG oil in the presence of an alcohol, thereby generating an algal oil polyol; c) reacting the algal oil polyol with an isocyanate and an ionomer, thereby generating an isocyanate-terminated pre-polymer; d) neutralizing the isocyanate-terminated pre-polymer with an acid or a base, thereby generating a neutralized isocyanate-terminated pre-polymer; and e) dispersing the neutralized isocyanate-terminated pre-polymer in water, thereby generating the polyurethane dispersion, wherein the algal triglyceride oil comprises at least 60% of one or more monounsaturated fatty acids. The algal TAG oil comprises the one or more monounsaturated fatty acids such that the one or more monounsaturated fatty acids are at least 60% of the fatty acids appended to the glycerol backbone of the TAG.

In some embodiments, the algal TAG oil comprises at least 80% of one or more monounsaturated fatty acids.

In some embodiments, the algal TAG oil comprises at least 90% of one or more monounsaturated fatty acids.

In some embodiments, the one or more monounsaturated fatty acids is a C18:1 fatty acid.

In some embodiments, the one or more monounsaturated fatty acids is oleic acid.

In some embodiments, the algal TAG oil comprises at least 60% of oleic acid.

In some embodiments, the algal TAG oil comprises at least 80% of oleic acid.

In some embodiments, the algal TAG oil comprises at least 90% of oleic acid.

In some embodiments, the algal TAG oil has an iodine value of at least 80 g $I_2$/100 g.

In some embodiments, the algal TAG oil has an iodine value of 88 g $I_2$/100 g.

In some embodiments, the epoxidized algal TAG oil comprises at least about 80% epoxidized oleic acid.

In some embodiments, the epoxidized algal TAG oil comprises at least about 90% epoxidized oleic acid.

In some embodiments, the alcohol is ethanol.

In some embodiments, the isocyanate is isophorone diisocyanate (IPDI).

In some embodiments, the isocyanate is dicyclohexylmethane diisocyanate (HMDI).

In some embodiments, the ionomer is N-methyldiethanolamine (MDEA).

In some embodiments, the neutralizing of the isocyanate-terminated pre-polymer is with acetic acid.

In some aspects, the present disclosure provides a method for producing a polyurethane dispersion, the method comprising: a) epoxidizing an algal TAG oil, thereby generating an epoxidized algal TAG oil; b) ring opening the epoxidized algal TAG oil in the presence of ethanol, thereby generating an algal oil polyol; c) reacting the algal oil polyol with HMDI and MDEA, thereby generating an isocyanate-terminated pre-polymer; d) neutralizing the isocyanate-terminated pre-polymer with acetic acid, thereby generating a neutralized isocyanate-terminated pre-polymer; and e) dispersing the neutralized isocyanate-terminated pre-polymer in water, thereby generating the polyurethane dispersion, wherein the algal TAG oil comprises at least 60% of one or more monounsaturated fatty acids. The algal TAG oil comprises the one or more monounsaturated fatty acids such that the one or more monounsaturated fatty acids are at least 60% of the fatty acids appended to the glycerol backbone of the TAG.

In some embodiments, the molar ratio of the algal oil polyol, the MDEA, and the isocyanate is 1 to 1 to 2.05, respectively.

In some embodiments, the molar ratio of the algal oil polyol, the MDEA, and the isocyanate is 1 to 1.05 to 2.1, respectively.

In some embodiments, the molar ratio of the algal oil polyol, the MDEA, and the isocyanate is 1 to 0.9 to 1.95, respectively.

In some embodiments, the molar ratio of the algal oil polyol, the MDEA, and the isocyanate is 1 to 1.15 to 2.2, respectively.

In some aspects, the present disclosure provides a method for producing a polyurethane dispersion, the method comprising: a) epoxidizing an algal TAG oil, thereby generating an epoxidized algal TAG oil; b) ring opening the epoxidized algal oil in the presence of an alcohol, thereby generating an algal oil polyol; c) subjecting the algal oil polyol to methanolysis, thereby generating methyl esters of the epoxidized algal oil (Me-EAO); d) chain extending the Me-EAO using an alkyl diol in the presence of a catalyst, thereby generating a polyester diol; e) reacting the polyester diol with an isocyanate, an ionomer, and an additive, thereby generating an isocyanate-terminated pre-polymer; f) neutralizing the isocyanate-terminated pre-polymer with an acid or a base, thereby generating a neutralized isocyanate-terminated pre-polymer; and g) dispersing the neutralized isocyanate-terminated pre-polymer in water and a chain extender, thereby generating the polyurethane dispersion that encapsulates the additive, wherein the algal TAG oil comprises at least 60% of one or more monounsaturated fatty acids. The algal TAG oil comprises the one or more monounsaturated fatty acids such that the one or more monounsaturated fatty acids are at least 60% of the fatty acids appended to the glycerol backbone of the TAG.

In some embodiments, the algal TAG oil comprises at least 80% of one or more monounsaturated fatty acids.

In some embodiments, the algal TAG oil comprises at least 90% of one or more monounsaturated fatty acids.

In some embodiments, the one or more monounsaturated fatty acids is a C18:1 fatty acid.

In some embodiments, the one or more monounsaturated fatty acids is oleic acid.

In some embodiments, the algal TAG oil comprises at least 60% of oleic acid.

In some embodiments, the algal TAG oil comprises at least 80% of oleic acid.

In some embodiments, the algal TAG oil comprises at least 90% of oleic acid.

In some embodiments, the algal TAG oil has an iodine value of at least 80 g $I_2$/100 g.

In some embodiments, the algal TAG oil has an iodine value of 88 g $I_2$/100 g.

In some embodiments, the epoxidized algal TAG oil comprises at least about 80% epoxidized oleic acid.

In some embodiments, the epoxidized algal TAG oil comprises at least about 90% epoxidized oleic acid.

In some embodiments, the alcohol is ethanol.

In some embodiments, the methanolysis of the algal oil polyol is in the presence of methanol and a methoxide salt.

In some embodiments, the methoxide salt is $KOCH_3$.

In some embodiments, the alkyl diol is 1,3-propanediol.

In some embodiments, the alkyl diol is 1,4-butanediol.

In some embodiments, the alkyl diol is 1,5-pentanediol.

In some embodiments, the alkyl diol is 1,6-hexanediol.

In some embodiments, the isocyanate is isophorone diisocyanate (IPDI).

In some embodiments, the isocyanate is dicyclohexylmethane diisocyanate (HMDI).

In some embodiments, the ionomer is N-methyldiethanolamine (MDEA).

In some embodiments, the additive does not react with the algal oil polyol, the isocyanate, or the ionomer.

In some embodiments, the additive is a wax.

In some embodiments, the additive is a fat.

In some embodiments, the additive is kokum butter.

In some embodiments, the additive is beeswax.

In some embodiments, the additive is carnauba wax.

In some embodiments, the neutralizing of the isocyanate-terminated pre-polymer is with acetic acid.

In some embodiments, the chain extender is ethylene diamine (EDA).

In some embodiments, the molar ratio of OH groups from the polyester diol, OH groups from the ionomer, amine groups on the chain extender, and isocyanate groups from the isocyanate is 0.90 to 2.1 to 0.3 to 3.5, respectively.

In some embodiments, the molar ratio of OH groups from the polyester diol, OH groups from the ionomer, amine groups on the chain extender, and isocyanate groups from the isocyanate is 0.75 to 2.25 to 0.3 to 3.66, respectively.

In some aspects, the present disclosure provides a method for producing a polyurethane dispersion, the method comprising: a) epoxidizing an algal TAG oil, thereby generating an epoxidized algal TAG oil; b) hydrogenating the epoxidized algal TAG oil in the presence of a catalyst and hydrogen gas, thereby generating the hydrogenated epoxidized (H-EAO) polyol; c) reacting the H-EAO polyol with an isocyanate and an ionomer, thereby generating an isocyanate-terminated pre-polymer; d) neutralizing the isocyanate-terminated pre-polymer with an acid or a base, thereby generating a neutralized isocyanate-terminated pre-polymer; and e) dispersing the neutralized isocyanate-terminated pre-polymer in water, thereby generating the polyurethane dispersion, wherein the algal TAG oil comprises at least 60% of one or more monounsaturated fatty acids. The algal TAG oil comprises the one or more monounsaturated fatty acids such that the one or more monounsaturated fatty acids are at least 60% of the fatty acids appended to the glycerol backbone of the TAG.

In some embodiments, the algal TAG oil comprises at least 80% of one or more monounsaturated fatty acids.

In some embodiments, the algal TAG oil comprises at least 90% of one or more monounsaturated fatty acids.

In some embodiments, the one or more monounsaturated fatty acids is a C18:1 fatty acid.

In some embodiments, the one or more monounsaturated fatty acids is oleic acid.

In some embodiments, the algal TAG oil comprises at least 60% of oleic acid.

In some embodiments, the algal TAG oil comprises at least 80% of oleic acid.

In some embodiments, the algal TAG oil comprises at least 90% of oleic acid.

In some embodiments, the algal TAG oil has an iodine value of at least 80 g $I_2$/100 g.

In some embodiments, the algal TAG oil has an iodine value of 88 g $I_2$/100 g.

In some embodiments, the epoxidized algal TAG oil comprises about 80% epoxidized oleic acid.

In some embodiments, the epoxidized algal TAG oil comprises at least about 90% epoxidized oleic acid.

In some embodiments, the isocyanate is isophorone diisocyanate (IPDI).

In some embodiments, the isocyanate is dicyclohexylmethane diisocyanate (HMDI).

In some embodiments, the ionomer is N-methyldiethanolamine (MDEA).

In some embodiments, the neutralizing of the isocyanate-terminated pre-polymer is with acetic acid.

In some embodiments, the molar ratio of OH groups from the H-EAO polyol, OH groups from the MDEA, isocyanate groups from the isocyanate is 1 to 0.95 to 2, respectively.

In some aspects, the present disclosure provides a method for producing a polyurethane dispersion, the method comprising: a) epoxidizing an algal TAG oil, thereby generating an epoxidized algal TAG oil; b) subjecting the epoxidized algal TAG oil to methanolysis, thereby generating methyl esters of the epoxidized algal TAG oil (Me-EAO); c) ring opening the Me-EAO with an alkyl diol in the presence of a catalyst, thereby generating the polyether diol; d) reacting the polyether diol with an isocyanate and an ionomer, thereby generating an isocyanate-terminated pre-polymer; e) neutralizing the isocyanate-terminated pre-polymer with an acid or a base, thereby generating a neutralized isocyanate-terminated pre-polymer; and f) dispersing the neutralized isocyanate-terminated pre-polymer in water and a chain extender, thereby generating the polyurethane dispersion, wherein the algal TAG oil comprises at least 60% of one or more monounsaturated fatty acids. The algal TAG oil comprises the one or more monounsaturated fatty acids such that the one or more monounsaturated fatty acids are at least 60% of the fatty acids appended to the glycerol backbone of the TAG.

In some embodiments, the algal TAG oil comprises at least 80% of one or more monounsaturated fatty acids.

In some embodiments, the algal TAG oil comprises at least 90% of one or more monounsaturated fatty acids.

In some embodiments, the one or more monounsaturated fatty acids is a C18:1 fatty acid.

In some embodiments, the one or more monounsaturated fatty acids is oleic acid.

In some embodiments, the algal TAG oil comprises at least 60% of oleic acid.

In some embodiments, the algal TAG oil comprises at least 80% of oleic acid.

In some embodiments, the algal TAG oil comprises at least 90% of oleic acid.

In some embodiments, the algal TAG oil has an iodine value of at least 80 g $I_2$/100 g.

In some embodiments, the algal TAG oil has an iodine value of 88 g $I_2$/100 g.

In some embodiments, the epoxidized algal TAG oil comprises about 80% epoxidized oleic acid.

In some embodiments, the epoxidized algal TAG oil comprises at least about 90% epoxidized oleic acid.

In some embodiments, the methanolysis of the algal oil polyol is in the presence of methanol and a methoxide salt.

In some embodiments, the methoxide salt is $KOCH_3$.

In some embodiments, the alkyl diol is 1,3-propanediol.

In some embodiments, the alkyl diol is 1,4-butanediol.

In some embodiments, the alkyl diol is 1,5-pentanediol.

In some embodiments, the alkyl diol is 1,6-hexanediol.

In some embodiments, the catalyst is tris(pentafluorophenyl)borane.

In some embodiments, the ring opening is with an excess of the Me-EAO as compared to the alkyl diol.

In some embodiments, the molar ratio of the Me-EAO and the alkyl diol is about 6 to about 1.

In some embodiments, the isocyanate is isophorone diisocyanate (IPDI).

In some embodiments, the isocyanate is dicyclohexylmethane diisocyanate (HMDI).

In some embodiments, the ionomer is N-methyldiethanolamine (MDEA).

In some embodiments, the neutralizing of the isocyanate-terminated pre-polymer is with acetic acid.

In some embodiments, the chain extender is ethylene diamine (EDA).

In some embodiments, the molar ratio of OH groups from the polyether diol, OH groups from the MDEA, amine groups from the chain extender, isocyanate groups from the isocyanate is 1 to 2 to 0.3 to 3.6, respectively.

In some aspects, the present disclosure provides a method for producing a polyurethane dispersion, the method comprising: a) epoxidizing an algal TAG oil, thereby generating an epoxidized algal TAG oil; b) subjecting the epoxidized algal TAG oil to methanolysis, thereby generating methyl esters of the epoxidized algal TAG oil (Me-EAO); c) ring opening the Me-EAO with 1,3-propanediol in the presence of a catalyst, thereby generating the polyether diol; d) reacting the polyether diol with an isocyanate and an ionomer, thereby generating an isocyanate-terminated pre-polymer; e) neutralizing the isocyanate-terminated pre-polymer with acetic acid, thereby generating a neutralized isocyanate-terminated pre-polymer; and f) dispersing the neutralized isocyanate-terminated pre-polymer in water and EDA, thereby generating the polyurethane dispersion, wherein the algal TAG oil comprises at least 60% of one or more monounsaturated fatty acids. The algal TAG oil comprises the one or more monounsaturated fatty acids such that the one or more monounsaturated fatty acids are at least 60% of the fatty acids appended to the glycerol backbone of the TAG.

In some embodiments, the molar ratio of OH groups from the polyether diol, OH groups from the MDEA, amine groups from the EDA, isocyanate groups from the isocyanate is 1 to 2 to 0.3 to 3.6, respectively.

In some aspects, the present disclosure provides a method for producing a polyurethane dispersion, the method comprising:

a) reacting an algal oil polyester diol composition with an isocyanate and an ionomer, thereby generating an isocyanate-terminated pre-polymer;

b) neutralizing the isocyanate-terminated pre-polymer with an acid or a base, thereby generating a neutralized isocyanate-terminated pre-polymer; and c) dispersing the neutralized isocyanate-terminated pre-polymer in water, thereby generating the polyurethane dispersion, wherein the algal oil polyester diol composition comprises at least 25% of a compound of the formula:
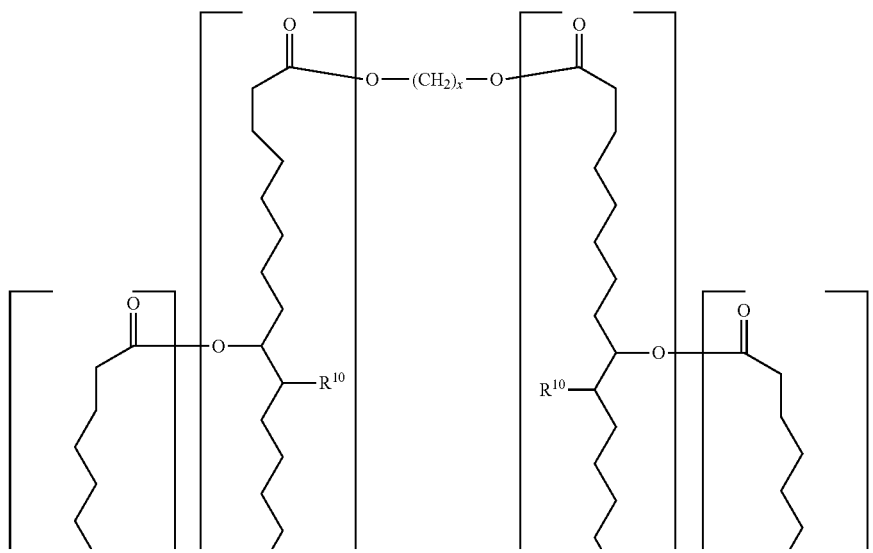
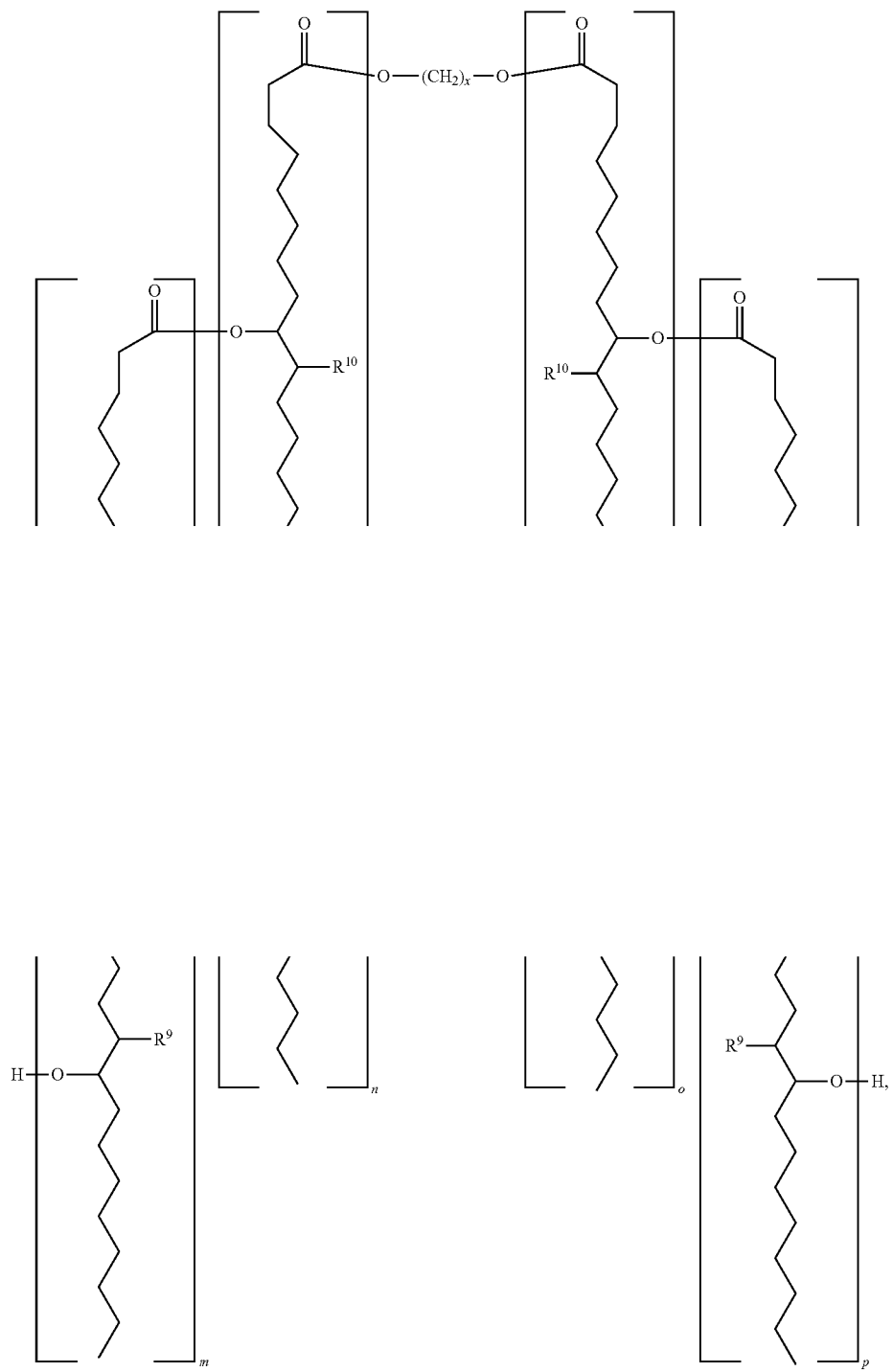
wherein:
x is an integer selected from 1-10;
m, n, o, and p are independently selected from 0-10; and
$R^9$ and $R^{10}$ are —O($C_{1-6}$)alkyl or —O($C_{1-6}$)acyl.
In some embodiments, the at least 25% of the algal oil polyester diol composition is of the formula on a weight-by-weight basis.

In some embodiments, the algal oil polyester diol composition further comprises a compound of the formula:

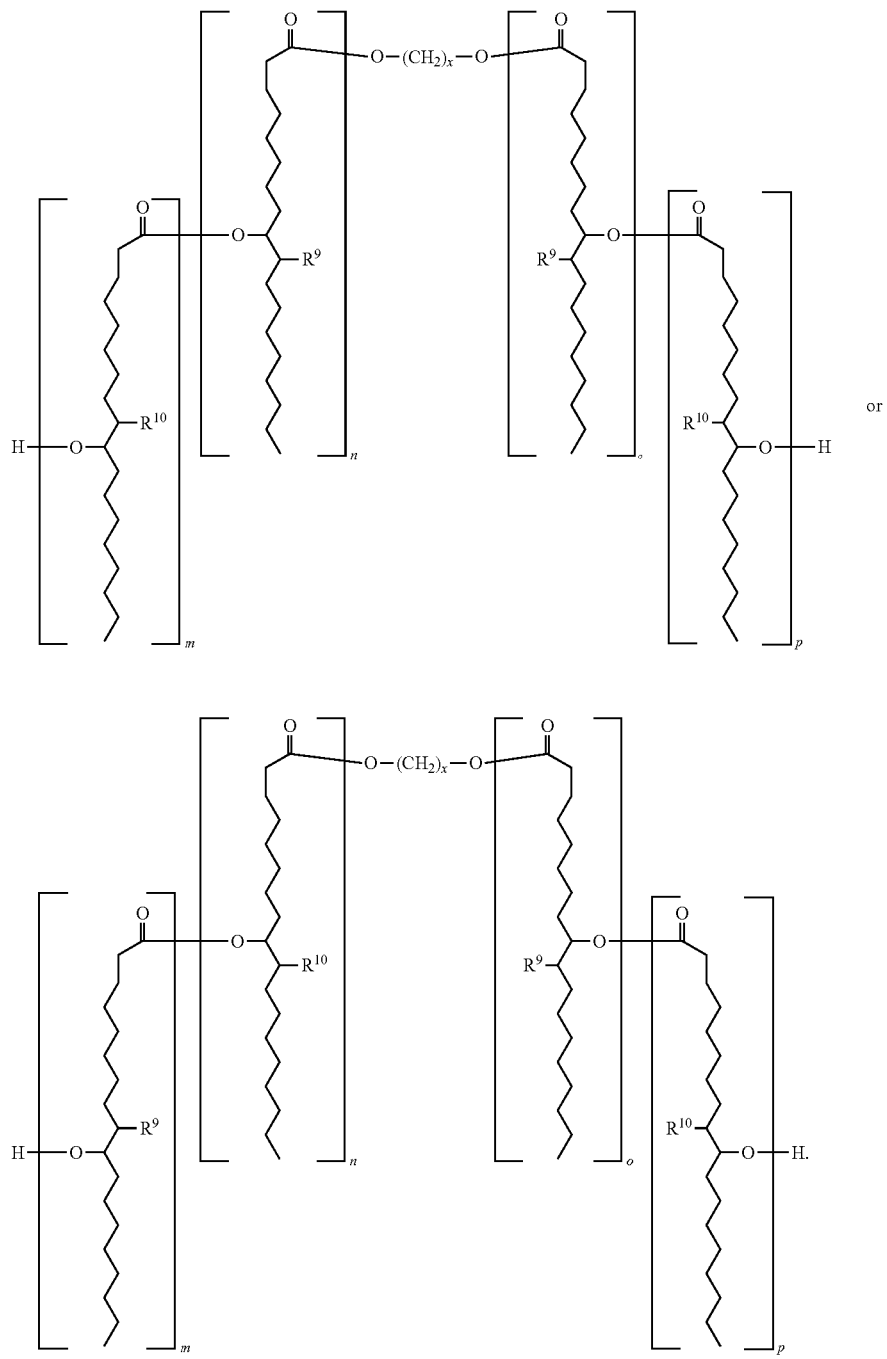

In some embodiments, the algal oil polyester diol composition comprises at least 30% of the compound.

In some embodiments, the algal oil polyester diol composition comprises at least 40%, or of the compound.

In some embodiments, the algal oil polyester diol composition comprises at least 50% of the compound.

In some embodiments, the method further comprises reacting the algal oil polyester diol composition with an additive in a), wherein the polyurethane dispersion encapsulates the additive.

In some aspects, the present disclosure provides a compound of the formula:
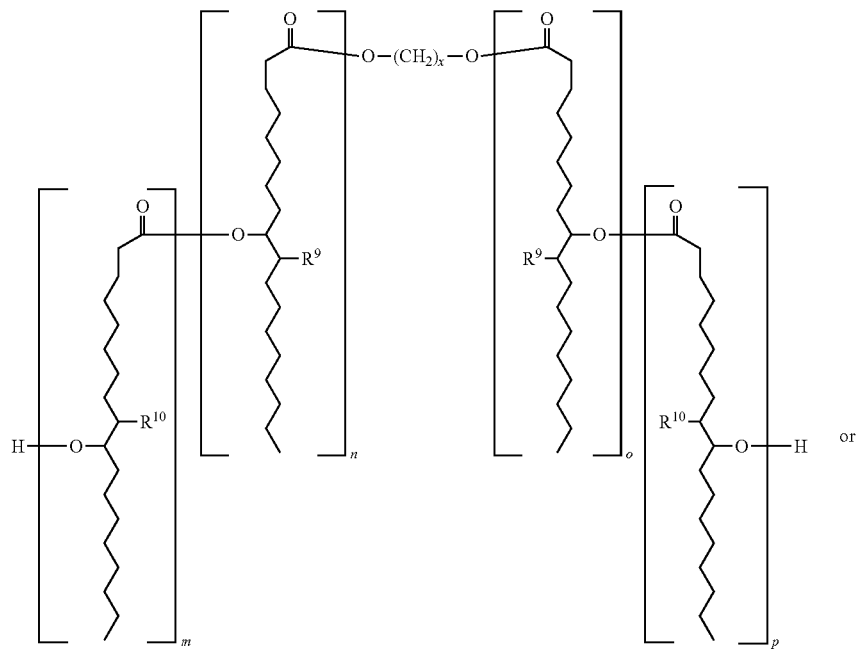
or
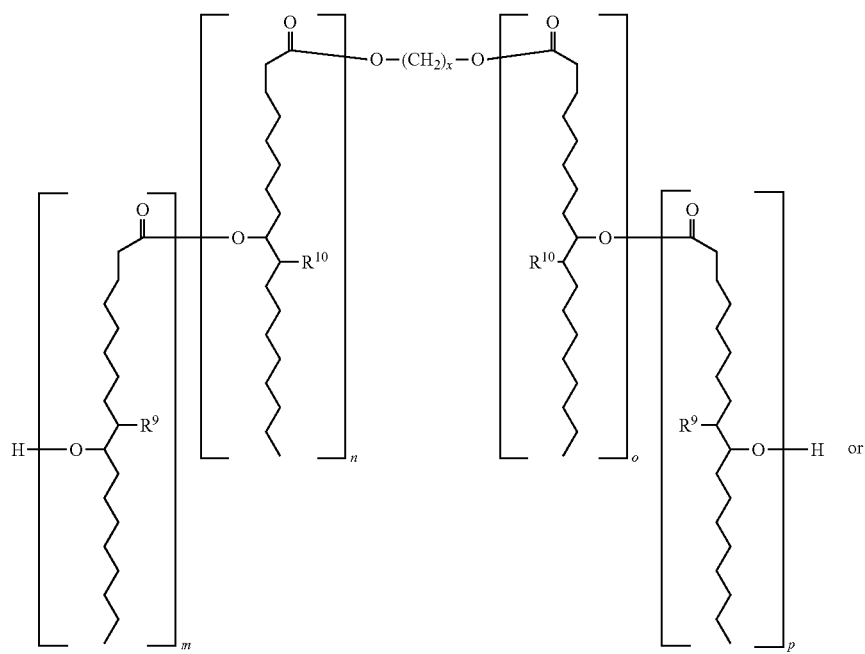
or -continued

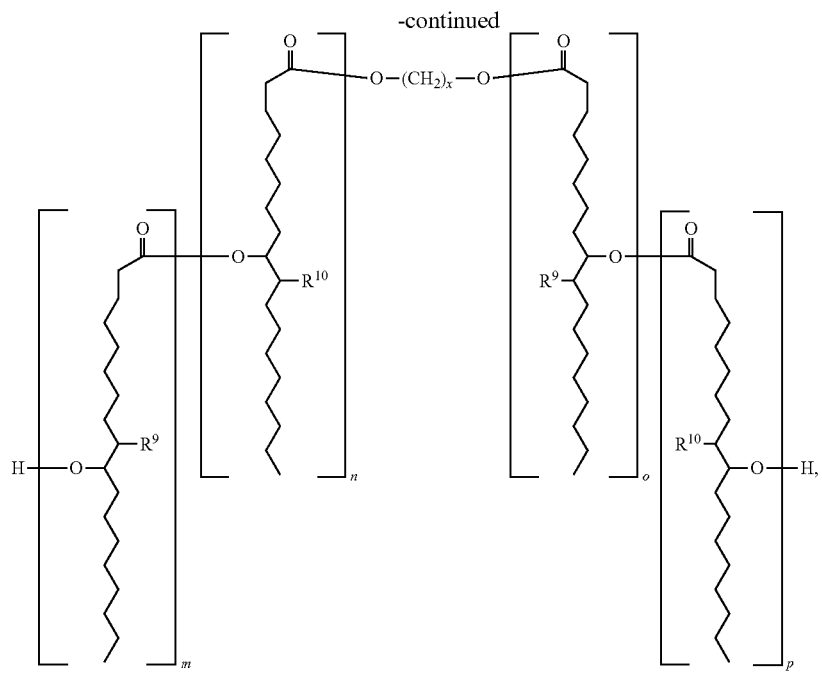

wherein:
x is an integer selected from 1-10;
m, n, o, and p are independently selected from 0-10; and
$R^9$ and $R^{10}$ are —O($C_{1-6}$)alkyl or —O($C_{1-6}$)acyl.

In some aspects, the present disclosure provides an algal oil polyether diol composition comprising at least 25% of a compound of the formula:

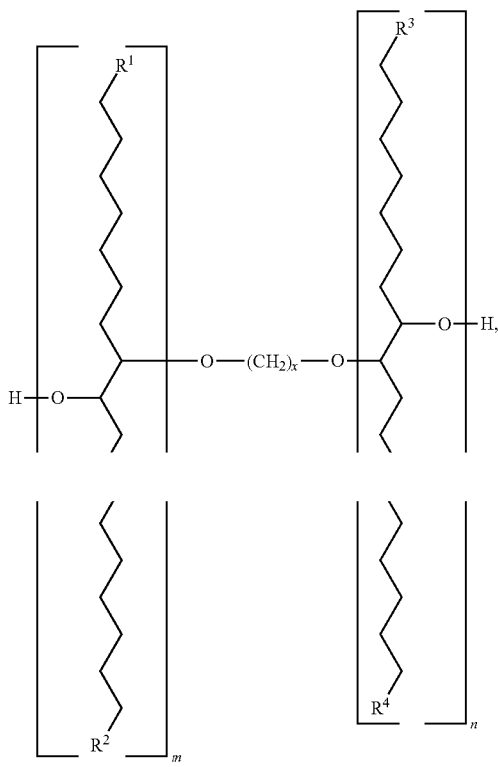

wherein:
x is an integer selected from 1-10;
m and n are independently integers selected from 0-10;
$R^1$, $R^2$, $R^3$, and $R^4$ are Me or —COOMe, wherein
if $R^1$ is Me then $R^2$ is —COOMe, if $R^1$ is —COOMe then $R^2$ is Me,
if $R^3$ is Me then $R^4$ is —COOMe, and if $R^3$ is —COOMe then $R^4$ is Me.

The at least 25% of the algal oil polyester diol composition is of the formula on a weight-by-weight basis.

In some embodiments, the algal oil polyether diol composition comprises at least 30% of the compound.

In some embodiments, the algal oil polyether diol composition comprises at least 40% of the compound.

In some embodiments, the algal oil polyether diol composition comprises at least 50% of the compound.

In some aspects, the present disclosure provides a method for producing a polyurethane dispersion, the method comprising:

a) reacting an algal oil polyether diol composition with an isocyanate and an ionomer, thereby generating an isocyanate-terminated pre-polymer;

b) neutralizing the isocyanate-terminated pre-polymer with an acid or a base, thereby generating a neutralized isocyanate-terminated pre-polymer; and c) dispersing the neutralized isocyanate-terminated pre-polymer in water, thereby generating the polyurethane dispersion, wherein the algal oil polyether diol composition comprises at least 25% of a compound of the formula:

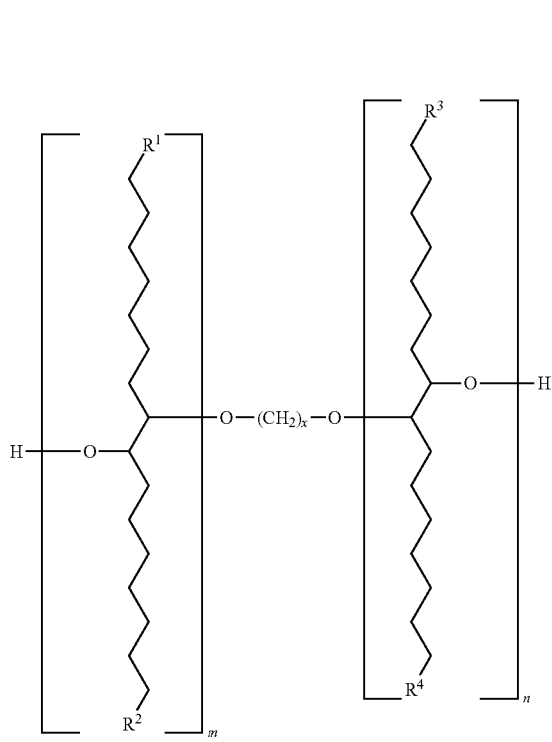

wherein:

x is an integer selected from 1-10;

m and n are independently integers selected from 0-10;

$R^1$, $R^2$, $R^3$, and $R^4$ are Me or —COOMe, wherein if $R^1$ is Me then $R^2$ is —COOMe, if $R^1$ is —COOMe then $R^2$ is Me, if $R^3$ is Me then $R^4$ is —COOMe, and if $R^3$ is —COOMe then $R^4$ is Me.

In some embodiments, the at least 25% of the algal oil polyester diol composition is of the formula on a weight-by-weight basis.

In some embodiments, the algal oil polyether diol composition comprises at least 30% of the compound.

In some embodiments, the algal oil polyether diol composition comprises at least 40% of the compound.

In some embodiments, the algal oil polyether diol composition comprises at least 50% of the compound.

In some embodiments, the method further comprises reacting the algal oil polyether diol composition with an additive in a), wherein the polyurethane dispersion encapsulates the additive.

In some aspects, the present disclosure provides a compound of the formula:

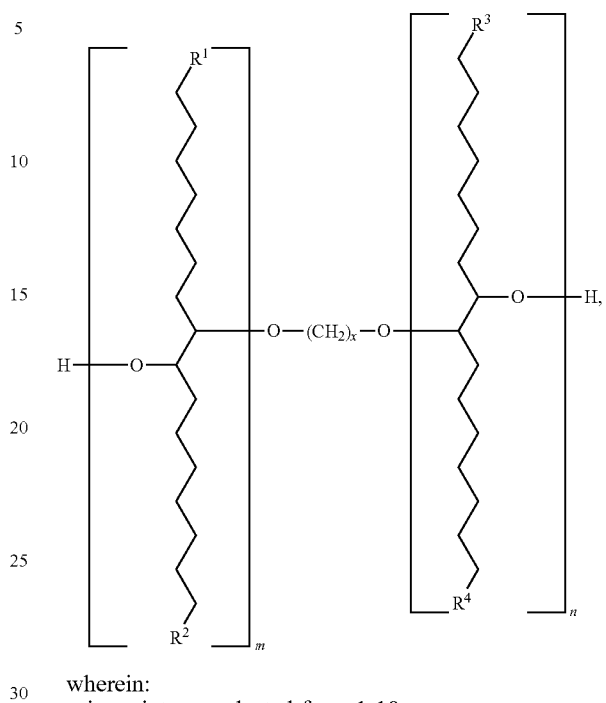

wherein:

x is an integer selected from 1-10;

m and n are independently integers selected from 0-10;

$R^1$, $R^2$, $R^3$, and $R^4$ are Me or —COOMe, wherein if $R^1$ is Me then $R^2$ is —COOMe, if $R^1$ is —COOMe then $R^2$ is Me, if $R^3$ is Me then $R^4$ is —COOMe, and if $R^3$ is —COOMe then $R^4$ is Me.

In some aspects, the present disclosure provides a method for producing a polyurethane dispersion, the method comprising:

a) reacting an epoxidized and ring opened algal oil polyol (EAOP) composition with an isocyanate and an ionomer, thereby generating an isocyanate-terminated pre-polymer;

b) neutralizing the isocyanate-terminated pre-polymer with an acid or a base, thereby generating a neutralized isocyanate-terminated pre-polymer; and c) dispersing the neutralized isocyanate-terminated pre-polymer in water, thereby generating the polyurethane dispersion, wherein the EAOP composition comprises at least 50% of a compound of the formula:

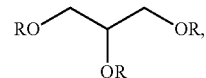

wherein each R is independently selected from:

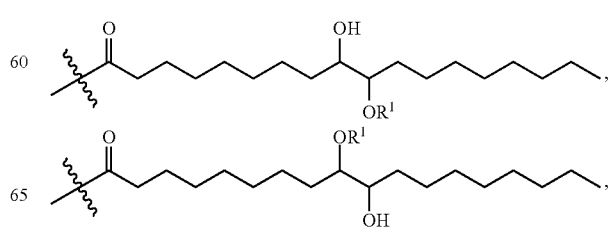

-continued

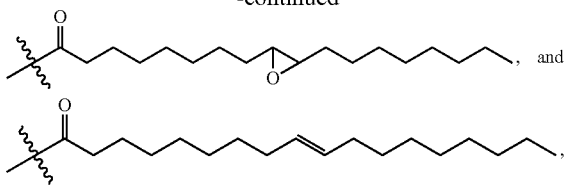
, and

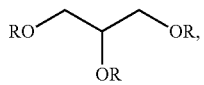
, wherein $R^1$ is —$(C_{1-6})$alkyl or —$(C_{1-6})$acyl.

In some embodiments, the EAOP composition comprises at least 60% of the compound.

In some embodiments, the EAOP composition comprises at least 70% of the compound.

In some embodiments, the method further comprises reacting the EAOP composition with an additive in a), wherein the polyurethane dispersion encapsulates the additive.

In some aspects, the present disclosure provides a hydrogenated epoxidized polyol (H-EAO) composition comprising at least 50% of a compound of the formula:

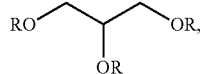

wherein each R is independently selected from:

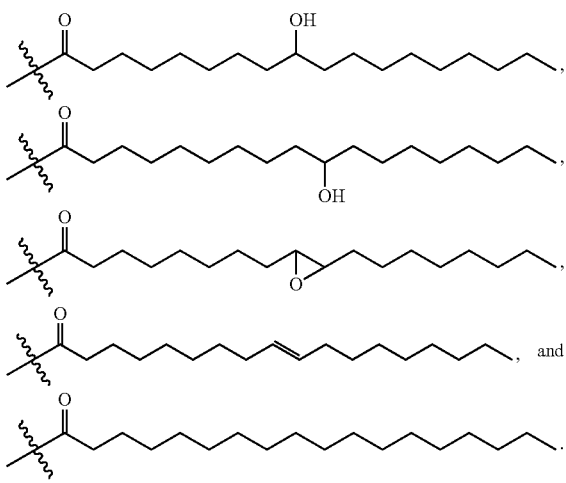

In some embodiments, the H-EAO composition comprises at least 60% of the compound.

In some embodiments, the H-EAO composition comprises at least 70% of the compound.

In some aspects, the present disclosure provides a method for producing a polyurethane dispersion, the method comprising:
  a) reacting a hydrogenated epoxidized polyol (H-EAO) composition with an isocyanate and an ionomer, thereby generating an isocyanate-terminated pre-polymer;
  b) neutralizing the isocyanate-terminated pre-polymer with an acid or a base, thereby generating a neutralized isocyanate-terminated pre-polymer; and
  c) dispersing the neutralized isocyanate-terminated pre-polymer in water, thereby generating the polyurethane dispersion, wherein the H-EAO composition comprises at least 50% of a compound of the formula:

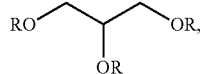

wherein each R is independently selected from:

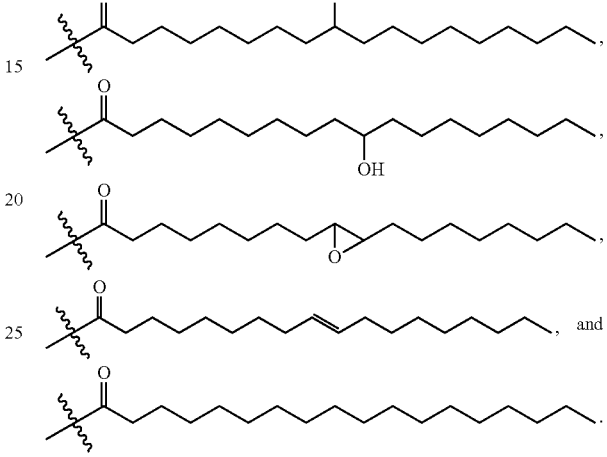

In some embodiments, the H-EAO composition comprises at least 60% of the compound.

In some embodiments, the H-EAO composition comprises at least 70% of the compound.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
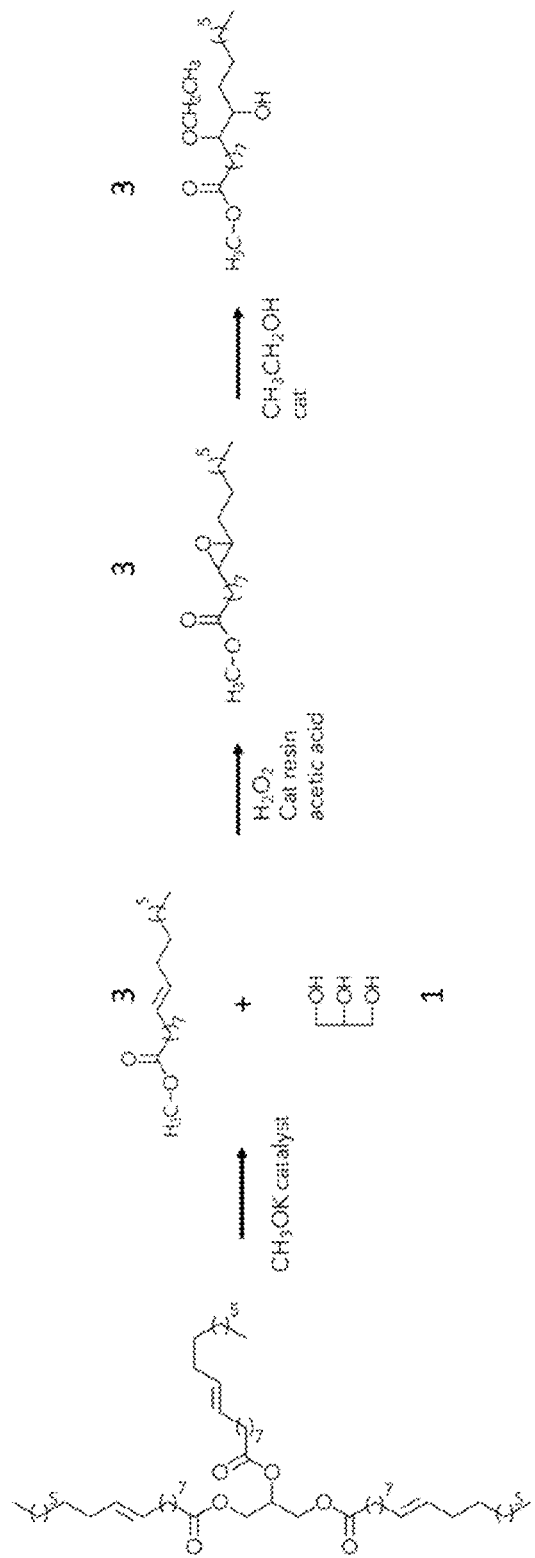
FIG. 1 illustrates a reaction scheme to create polyols from a triglyceride oil via epoxidation and ring opening of fatty acid methyl esters (FAMEs).

Provided herein are compositions useful for imparting improved surface properties to substrates. The starting materials of the compositions herein can be derived from bio-based, renewable materials. Further provided herein are triglyceride oil polyol compositions and uses thereof in making polyurethane dispersions and films therefrom. Polyurethane dispersion compositions, uses thereof, and methods for making polyurethane dispersion compositions that impart improved surface properties to substrates are further provided. Improved surface properties can include repellency to moisture, repellency to oil, repellency to soil, stain resistance, softness, glide, wear resistance, abrasion resistance, heat resistance, solvent resistance, water resistance, good adhesion to surfaces, and toughness. These properties can be particularly useful for substrates, such as fibers, yarns, fabrics, textiles, leather, carpets, paper, wood, and other substrates.

Polymers containing a urethane structure can be used to impart beneficial surface properties to surface treating agents. Polyurethanes (PUs) are versatile polymeric materials with regard to both processing methods and mechanical properties. The principal chain structure of PUs is composed of rigid hard and flexible soft segments. Due to the specific microphase structure formed between hard segments and soft segments, along with a proper selection of reactants, PUs can exhibit properties spanning from high-performance elastomers to tough and rigid plastics. The wide range of achievable properties make PUs attractive for use in a variety of applications and end uses, including, but not limited to, surface treatments, coatings, inks, binders, adhesives, composites, sealants, elastomers, and paints.

As with widely-used polymers like polyethylene, polypropylene, and polystyrene, PUs are typically produced from fossil fuel-based feedstocks, e.g., petroleum-derived isocyanates and petroleum-derived polyols. However, as the increased utilization of fossil fuels poses an imminent threat to the climate, there is an urgent need to replace incumbent, petroleum-derived chemicals with more sustainable, renewable materials. Moreover, the uncertainty in terms of price and availability of petroleum, together with political and institutional tendencies toward the sustainable practices, make renewable sources of PUs even more desirable. Conventional PU materials can also contain a significant amount of organic solvents and sometimes even free isocyanate monomers. Polyurethane dispersions (PUDs) are polyurethane resins dispersed in water, rather than organic solvent. With increasingly restrictive environmental regulations regarding volatile organic compounds (VOCs), aqueous (or waterborne) PU dispersions can be a promising alternative to PUDs derived from conventional PU materials. Waterborne PU dispersions produced from bio-based sources can further contribute to sustainability. Bio-based, natural oil polyol components of PUs may present an opportunity for renewable alternatives with novel functionalities.

Natural oils, such as vegetable oils, can be used as renewable raw materials in the chemical and polymer industries due to their hydrophobicity, biodegradability, low toxicity, wide availability, and low VOC content. Polyols derived from these natural oils, natural oil polyols (NOPs), can be used for PU production including PUD production. However, some limitations can narrow the applicability of vegetable oil-derived polyols for producing waterborne PUDs. For example, the inherently high triglyceride heterogeneity of vegetable oils can lead to structural and reactive heterogeneity of derivatives thereof, such as polyols. The chemical heterogeneity of vegetable oil-derived polyols can compromise the chemical stability of the resulting PUD product. Another compounding limitation is that vegetable oils can create a high degree of polyol hydroxyl group (—OH) functionality. High hydroxyl functionality of NOPs can lead to gelation and high crosslinking, which impedes dispersion of PU prepolymers in water.

Methods described herein include the use of bio-based, renewable raw materials to formulate PUD compositions without compromising the beneficial properties of conventional PUDs produced from fossil fuel sources.

As used herein, the term "triglyceride", "triacylglycerol", or "TAG" generally refers to an oil composed of three saturated and/or unsaturated fatty acids held together by a glycerol backbone.

As used herein, the term "bio-based" generally refers to materials sourced from biological products or renewable agricultural material, including plant, animal, and marine materials, forestry materials, or an intermediate feedstock. The term "bio-based content" refers to the weight of carbon-containing molecules that are derived from biomass relative to the total amount of carbon-containing molecules in the composition. In some embodiments, a bio-based oil is an oil obtained from algae or microalgae, i.e., an algal oil. Bio-based materials can serve as renewable alternatives to petrochemical materials in PU production. In some embodiments, a composition described herein is at least 10% bio-based. In some embodiments, a composition described herein is 10% to 100% bio-based, 35% to 100% bio-based, 50% to 100% bio-based, 75% to 100% bio-based, or 100% bio-based. Bio-based content of a formulation described herein can be measured on a weight-by-weight basis of the total formulation. Alternatively, bio-based (bio-carbon) content of a formulation described herein can be determined by radiocarbon analysis, e.g., using ASTM D6866.

As used herein, the term "natural oil," "natural triglyceride oil," or "naturally occurring oil" generally refers to an oil derived from a plant, animal, fungi, algae, or bacterium that has not undergone additional chemical or enzymatic manipulation. In some embodiments, the term can exclude refining processes, for example, degumming, refining, bleaching, and deodorization.

As used herein, the term "polyol", generally refers to polymer containing multiple hydroxyl groups, e.g., a triglyceride oil polyol.

As used herein, the term "biopolyol", "natural oil polyol", or "NOP" generally refers to a polyol produced in situ by a plant, animal, fungi, algae, or bacterium, or through chemical modification of a triglyceride oil or derivatives thereof obtained from a plant, animal, fungi, algae, or bacterium.

As used herein, the term "microbial oil" refers to an oil extracted from a microbe, e.g., an oleaginous, single-celled, eukaryotic or prokaryotic microorganism, including, but not limited to, yeast, microalgae, and bacteria.

As used herein, the term "oleic content", "oleate content", or "olein content" refers the percentage amount of oleic acid in the fatty acid profile of a substance (e.g., a TAG polyol). As used herein, the term "C18:1 content" refers the percentage amount of a C18:1 fatty acid (e.g., oleic acid) in the fatty acid profile of a substance (e.g., a polyol).

As used herein, the term "iodine value" is an indicator of the number of carbon-carbon double bonds in the fatty acids of an oil composition. Iodine value is determined by the mass of iodine in grams that is consumed by 100 grams of an oil composition.

As used herein, the term "hydroxyl number", "hydroxyl value", or "OH #" of the resulting polyol refers to the number of milligrams of potassium hydroxide (mg KOH/g) required to neutralize the acetic acid taken up on acetylation of one gram of a substance (e.g., a polyol) that contains free hydroxyl groups. The hydroxyl number is a measure of the content of free hydroxyl groups in the substance. The hydroxyl number can be determined by ASTM E1899.

As used herein, the term "ionogenic molecule", "ionogen", or "ionomer" is a molecule composed of repeat units of electrically neutral repeating units and ionizable units covalently bonded to a polymer backbone. Ionomers can be used to achieve dispersibility of PUs to generate PUDs described herein.

As used herein, the term "about" refers to +10% from the value provided.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are described herein.

Polyurethanes

Polyurethanes are polymers that have a molecular backbone containing carbamate/urethane groups (—NHCO$_2$). Segmented polymers are composed of alternating sequences of soft segments and hard segments. Polyurethanes are produced by reacting polyols with isocyanates in the presence of catalyst. In some cases, polyurethanes are produced by the addition of a linker or chain extender and other additives.

Isocyanates

Diisocyanates can be used in producing polyurethane dispersion compositions described herein. Non-limiting examples of diisocyanate compounds include aromatic, cycloaliphatic, or aliphatic diisocyanates such as, but not limited to, α,α,α,α-tetramethylxylene diisocyanate (TMXDI™), 3,5,5-trimethyl-1-isocyanato-3-isocyanatomethylcyclohexane isophorone diisocyanate and derivatives thereof, tetramethylene diisocyanate, hexamethylene diisocyanate (HDI) and derivatives thereof, 2,4-toluene diisocyanate, 2,6-toluene diisocyanate, isophorone diisocyanate (IPDI), m-isopropenyl-α,α-dimethylbenzyl isocyanate (TMI), 4,4'-dicyclohexylmethane diisocyanate (H12MDI), benzene 1,3-bis(1-iscyanato-1-methylethyl), 1-5 naphthalene diisocyanate (NDI), phenylene diisocyanate (PPDI), trans-cyclohexane-1,4-diisocyanate (TMI), bitolylene diisocyanate (TODI), 4,4'-diphenylmethane diisocyanate, 4,4'-diphenyl dimethyl methane diisocyanate, dialkyl diphenyl methane diisocyanate, tetraalkyl diphenyl methane diisocyanate, 4,4'-dibenzyl diisocyanate, 1,3-phenylene diisocyanate, 1,4-phenylene diisocyanate, the isomers of tolylene diisocyanate, 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanatomethyl-3-isocyanato-1,5,5-trimethyl cyclohexane, chlorinated and brominated diisocyanates, phosphorus-containing diisocyanates, 4,4'-diisocyanatophenyl perfluoroethane, tetramethoxy butane-1,4-diisocyanate, butane-1,4-diisocyanate, hexane-1,6-diisocyanate, cyclohexane-1,4-diisocyanate, ethylene diisocyanate, phthalic acid-bis-isocyanatoethyl ester. Additional non-limiting examples of diisocyanates include trimethyl hexamethylene diisocyanate, 1,4-diisocyanatobutane, 1,2-diisocyanatododecane, dimer fatty acid diisocyanate, and partly masked polyisocyanates. These isocyanates can be used for the formation of self-crosslinking PUs. Diisocyanates, such as those described herein, can be used alone or in a mixture of isocyanates.

Catalysts

Catalysts can be used for polymerization of polyols and isocyanates to form PU compositions. Non-limiting examples of PU catalysts include tin catalysts, dibutyltin dilaurate (DBTDL or DBTL), dibutyltin diacetate (DBTDA), triethylenediamine (TEDA or DABCO), dimethylcyclohexylamine (DMCHA), dimethylethanolamine (DMEA), and bis-(2-dimethylaminoethyl)ether (A-99), titanium(IV) isopropoxide tin carboxylates, bismuth-based catalysts, bismuth carboxylates, zinc carboxylates, zirconium carboxylates, nickel carboxylates, metal carboxylates, and amines. In some embodiments, catalysts are not required for polymerization. For example, heat can be used to accelerate the polymerization reaction.

Chain Extenders

Chain extenders are typically low molecular weight compounds, such as hydroxyl amines, glycols, or diamines, that facilitate polymerization. Chain extenders greatly influence the mechanical response (rigidity and flexibility) of the PU. Non-limiting examples of chain extenders include low molecular weight diols, ethylene glycol, diethylene glycol, triethylene glycol, tetraethylene glycol, propylene glycol (1,3-propanediol), dipropylene glycol, tripropylene glycol, neopentyl glycol, alkyl diols of varying lengths (HO—(CH$_2$)$_p$—OH; where p is an integer greater than 1), 1,3-butanediol, 1,4-butanediol, 1,6-pentanediol, 1,6-hexanediol, 1,2,6-hexanetriol, 1,4-cyclohexanedimethanol, ethylenediamine, ethanolamine, diethanolamine, N-methyl diethanolamine (MDEA), phenyldiethanolamine, triethanolamine, isosorbide, glycerol, trimethylolpropane, pentaerythritol, diethyltoluenediamine, dimethylthiotoluenediamine, N,N,N',N'-tetrakis, glycerol, monoacylglycerol, diacylglycerol, and hydroquinone bis(2-hydroxyethyl) (HQEE). Chain extenders can be bio-based or produced through bio-based or other renewable means.

Polyols

Natural Oil Polyols

NOPs, natural oils having two or more hydroxyl moieties, can be obtained directly as a product from plants, other vegetation, microbes, or animals. An average hydroxyl value (OH #) of a NOP can range from about 1 to about 230, from about 10 to about 175, or from about 25 to about 140. Castor oil from the castor oil plant, rich in ricinoleic acid, is an example of a NOP. NOPs can also be produced through chemical modification of natural oils.

Natural oils for producing NOPs include, but are not limited to, microalgal oil, algal oil, soybean oil, safflower oil, castor oil, linseed oil, corn oil, sunflower oil, olive oil, canola oil, sesame oil, grapeseed oil, sea buckthorn oil, almond oil, argan oil, avocado oil, babassu oil, buffalo gourd oil, hazelnut oil, walnut oil, pecan oil, pistachio oil, macadamia nut oil, peanut oil, meadowfoam seed oil, hemp seed oil, coconut oil, cottonseed oil, palm oil, rapeseed oil, tea tree oil, *lallemantia* oil, *eucalyptus* oil, palm oil, palm kernel oil, *hibiscus* seed oil, *perilla* seed oil, pequi oil, pine nut oil, poppyseed oil, prune kernel oil, pumpkin seed oil, *quinoa* oil, ramtil oil, rice bran oil, tea tree oil, thistle oil, wheat germ oil, tung oil, and fish oil. TABLE 1 shows the fatty acid composition of several natural oils suitable for producing NOPs, as well as oleic acid enriched algal oils produced from genetically modified algae for producing algal oil polyols. In some cases, oleic acid enriched algal oils can be produced from non-genetically modified algae. The high oleic algal oil can be (and is for TABLE 1) derived from a genetically modified *P. moriformis* strain as described in US20160348119A1. The mid oleic algal can be (and is for TABLE 1) derived from a naturally occurring *Prototheca wickerhamii* strain (UTEX 1533) obtained from the University of Texas at Austin Culture Collection of Algae (UTEX).

can have a greater percentage of fatty acids that participate in crosslinking reactions with isocyanates. Unlike unsaturated fatty acids, saturated fatty acids do not contain carbon-carbon double bounds, and thus, cannot participate in crosslinking reactions with isocyanates. Thus, polyols generated from chemical modification of unsaturated fatty acids in microbial oil can yield PU materials having superior properties.

Polyols derived from microbial oils can be particularly useful for producing PUDs. Use of vegetable oil-based polyols can be challenging for the synthesis of waterborne PU dispersions because the high hydroxyl functionality of these polyols can lead to gelation and higher crosslinking of the PU prepolymers. High crosslinking can interfere with the dispersibility of the PU prepolymers in water. In con-

TABLE 1

| Fatty Acid (%) | Sea Buckthorn Oil | Grape seed Oil | Macadamia nut Oil | Soybean Oil | Argan Oil | Castor Oil | Meadowfoam Oil | Hemp seed Oil | High Oleic Algal Oil | Mid Oleic Algal Oil |
|---|---|---|---|---|---|---|---|---|---|---|
| C14:0 | 0.4 | 0.1 | 0.7 | 0.1 | 0.2 | 0.0 | 0.0 | 0.1 | 0.4 | 0.9 |
| C16:0 | 30.5 | 4.3 | 8.4 | 11.0 | 13.2 | 1.0 | 0.1 | 6.1 | 2.1 | 18.3 |
| C16:1 | 30.5 | 0.2 | 20.4 | 0.1 | 0.1 | 0.0 | 0.0 | 0.1 | 0.5 | 0.4 |
| C18:0 | 1.0 | 2.0 | 3.3 | 4.5 | 5.8 | 1.2 | 0.1 | 2.5 | 0.9 | 4.9 |
| C18:1 cis-9 | 22.3 | 58.3 | 54.4 | 24.7 | 45.8 | 2.9 | 0.3 | 10.3 | 87.7 | 64.4 |
| C18:1 cis-9 isomer | 8.2 | 2.5 | 3.4 | 1.3 | 0.0 | 0.4 | 0.0 | 0.8 | 0.0 | 0.0 |
| C18:2 | 3.7 | 22.1 | 2.1 | 51.3 | 33.6 | 4.3 | 0.1 | 55.0 | 6.3 | 9.3 |
| C18:3 gamma | 0.0 | 0.0 | 0.0 | 0.0 | 0.0 | 0.0 | 0.0 | 0.0 | 0.4 | 0.2 |
| C18:3 alpha | 2.2 | 7.8 | 0.1 | 5.3 | 0.1 | 0.5 | 0.1 | 0.0 | 0.0 | 0.7 |
| C20:0 | 0.3 | 0.6 | 2.8 | 0.5 | 0.4 | 0.1 | 0.7 | 17.4 | 0.0 | 0.2 |
| C20:1 | 0.2 | 1.3 | 2.6 | 0.4 | 0.5 | 0.4 | 64.5 | 2.4 | 0.0 | 0.0 |
| 12-OH-C18:1 | 0.0 | 0.0 | 0.0 | 0.0 | 0.0 | 88.0 | 0.0 | 0.0 | 0.0 | 0.0 |

Polyols derived from highly unsaturated oils have higher hydroxyl numbers compared to polyols derived from oils having lower unsaturation levels. High hydroxyl number can increase the versatility of a polyol for producing a range of PU materials, such as PUDs. A polyol described herein can have a hydroxyl number of from 125 to 165, from 145 to 165, from 135 to 160, or from 140 to 155. For example, a polyol described herein can have a hydroxyl number of 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, or 165. In some embodiments, the hydroxyl number of a polyol can be determined by ASTM E1899.

Microbial Oil Polyols

Microbial oil produced by oleaginous microbes is another category of natural oils that can be used in polyol synthesis. Microbial oils can have numerous advantages, such as high oil production efficiency and a TAG composition that is enhanced for polyol chemistry. For example, a microbial oil described herein can have relatively low TAG diversity, low fatty acid diversity, and high unsaturated fatty acid content. The high unsaturated fatty acid to saturated fatty acid ratio can allow for increased chemical reactivity at the double bonds. These characteristics can result in a greater degree of hydroxyl group functionality relative to oils having greater TAG heterogeneity (hence, lower purity) and/or diversity (e.g., oilseed or plant derived oils). A low TAG diversity and a high proportion of unsaturated fatty acids can be especially desirable in PU production. Polyols derived from these oils trast, microbial oils having low TAG diversity and high monounsaturated fatty acid content can be desirable alternative starting materials for waterborne PUD production. The uniformity of these polyol structures combined with an inherently lower functionality than traditional vegetable oil derivatives enables predictability in preparing high molecular weight diols and polyols. These features can also promote the formation of long chain, linear polyols that can be advantageous for elastomeric and flexible PU applications.

The complexity and physical properties of a triglyceride oil can be evaluated by its fatty acid profile and its triacylglycerol (TAG) profile. A fatty acid profile is a measure of fatty acid composition. A fatty acid profile of an oil can be determined by subjecting an oil to transesterification to generate fatty acid methyl esters and subsequently quantitating fatty acid type by Gas Chromatography with Flame Ionization Detector (GC-FID). A TAG profile is a measure of TAG composition. A percentage amount of a fatty acid from a fatty acid profile can be expressed on a weight-by-weight basis, a volume-by-volume basis, or a mole/mole basis. The fatty acid profile by GC-FID is determined by normalizing with an internal standard FAME (e.g., C19:0) having a known loading amount (e.g., 4 mg per run). Based on a normalization for the area under the curve for the internal standard, the area under the curve (area %) for each fatty acid is determined. The percentage of fatty acid chains in a composition herein can be determined via GC/FID as described in this paragraph. A TAG profile of an oil can be determined by matrix-assisted laser desorption/ionization-time of flight mass spectrometry (MALDI-TOF/MS) and gas chromatography-mass spectrometry (GC/MS).

Because fatty acids are arrayed at three positions along the glycerol backbone in the triglyceride molecule, the number of possible distinct regioisomers of TAG molecules can be defined by the number of fatty acid species in the oil raised to the third power. Soybean oil, for example, contains 6 fatty acids. Thus, soybean oil can theoretically contain as many as 216 or ($6^3$) TAG regioisomers. The actual number of TAG regioisomers in soybean oil is substantially lower (approximately 37), as soybean oil is a complex, heterogeneous material with each TAG species having varying levels of unsaturated fatty acids. Similarly, soybean oil-derived polyols are highly heterogeneous, which can negatively impact the physical properties of the final polymer produced therefrom. Thus, oils that are very low in saturates and high in a particular species of unsaturated fatty acid can be more suitable for generating NOPs since virtually all fatty acids contained in the triglyceride oil can participate in crosslinking with isocyanate moieties.

Additionally, if the fatty acid profile can be modulated such that the concentration of a particular species of monounsaturated or polyunsaturated fatty acids are significantly increased relative to the native oil, the diversity of TAG species present in the resulting oil can be reduced. The net effect can be a higher number of hydroxylated fatty acids and a higher proportion of TAG species that can participate in urethane chemistries. For example, in two cultivars of peanut oil, N-3101 and H4110, oleic acid content was increased from 46% to 80% and total monounsaturated and polyunsaturated fatty acids was increased only subtly, from 77% to 84%, respectively. According to the TAG profile of the resulting oils derived from the two cultivars, approximately 95% of all TAG species are accounted for in just 8 regioisomers in cultivar H4110 and 23 regioisomers in cultivar N-3101. Thus, triglyceride oils that are significantly enriched in a single TAG species result in more homogeneous substrates for subsequent chemical manipulations and incorporation into end-use materials.

Microorganisms can be genetically modified to produce natural oils enriched for unsaturation, hydroxylation, epoxidation, or other moieties that are beneficial in producing NOPs. Alternatively, microorganisms can be derived from non-genetic modification techniques, e.g., classical strain improvement. In some embodiments, a triglyceride oil described herein is derived from a microbial oil. Microbial oils can be produced using oleaginous microbes. Oleaginous microbes can refer to species of microbes having oil contents in excess of 20% on a dry cell weight basis. These microbes can be uniquely suited for generating highly pure, microbial oil polyols with high degree of hydroxyl group functionality.

Oleaginous microbes can be particularly facile for genetic modification and strain improvement. In some cases, improvements can occur on greatly accelerated time scales relative to what can be achieved in higher plant oilseeds. Oleaginous microbes can offer tremendous utility in generating large quantities of TAG oils in short periods of time.

Furthermore, because these microbes can be heterotrophically grown using simple sugars, the production of these triglyceride oils can be divorced from the traditional constraints imposed by geography, climate, and season that constrain triglyceride oil production from oilseed crops.

Recombinant DNA techniques can be used to engineer or modify oleaginous microbes to produce triglyceride oils having desired fatty acid profiles and regiospecific or stereospecific profiles. Fatty acid biosynthetic genes, including, for example, those encoding stearoyl-ACP desaturase, delta-12 fatty acid desaturase, acyl-ACP thioesterase, ketoacyl-ACP synthase, and lysophosphatidic acid acyltransferase can be manipulated to increase or decrease expression levels and thereby biosynthetic activity. These genetically engineered microbes can produce oils having enhanced oxidative, or thermal stability, rendering a sustainable feedstock source for various chemical processes. The fatty acid profile of the oils can be enriched in midchain profiles or the oil can be enriched in triglycerides having specific saturation or unsaturation contents. In some embodiments, a triglyceride oil described herein is produced by recombinant techniques or genetic engineering. In some embodiments, a triglyceride oil described herein is not produced by recombinant techniques or genetic engineering.

Among microalgae, several genera and species are suitable for producing triglyceride oils that can be converted to polyols including, but not limited to, *Chlorella* sp., *Pseudochlorella* sp., *Prototheca* sp., *Arthrospira* sp., *Euglena* sp., *Nannochloropsis* sp. *Phaeodactylum* sp., *Chlamydomonas* sp., *Scenedesmus* sp., *Ostreococcus* sp., *Selenastrum* sp., *Haematococcus* sp., *Nitzschia*, *Dunaliella*, *Navicula* sp., *Pseudotrebouxia* sp., *Heterochlorella* sp., *Trebouxia* sp., *Vavicula* sp., *Bracteococcus* sp., *Gomphonema* sp., *Watanabea* sp., *Botryococcus* sp., *Tetraselmis* sp., and *Isochrysis* sp.

Among oleaginous yeasts, several genera are suitable for producing triglyceride oils that can be converted to polyols including, but not limited to, *Candida* sp., *Cryptococcus* sp., *Debaromyces* sp., *Endomycopsis* sp., *Geotrichum* sp., *Hyphopichia* sp., *Lipomyces* sp., *Pichia* sp., *Rodosporidium* sp., *Rhodotorula* sp., *Sporobolomyces* sp., *Starmerella* sp., *Torulaspora* sp., *Trichosporon* sp., *Wickerhamomyces* sp., *Yarrowia* sp., and *Zygoascus* sp.

Among oleaginous bacteria there are several genera and species which are suited to producing triglyceride oils that can be converted to polyols including, but not limited to *Flavimonas oryzihabitans*, *Pseudomonas aeruginosa*, *Morococcus* sp., *Rhodobacter sphaeroides*, *Rhodococcus opacus*, *Rhodococcus erythropolis*, *Streptomyces jeddahensis*, *Ochrobactrum* sp., *Arthrobacter* sp., *Nocardia* sp., *Mycobacteria* sp., *Gordonia* sp., *Catenisphaera* sp., and *Dietzia* sp.

Oleaginous microbes can be cultivated in a bioreactor or fermenter. For example, heterotrophic oleaginous microbes can be cultivated on a sugar-containing nutrient broth.

Oleaginous microbes produce microbial oil having triacylglycerides or triacylglycerols. These oils can be stored in storage bodies of the cell. A raw oil can be obtained from microbes by disrupting the cells and isolating the oil. For example, microbial oil can be obtained by providing or cultivating, drying, and pressing the cells. Microbial oils produced can be refined, bleached, and deodorized (RBD) prior to use. Microbial oils can be obtained without further enrichment of one or more fatty acids or triglycerides with respect to other fatty acids or triglycerides in the raw oil composition.

Polyol Production

In the process of producing NOPs from natural sources, the hydroxyl group functionality can be introduced via a chemical conversion of a triglyceride oil. This conversion requires the presence of a double bond on the acyl moiety of the fatty acid, which can be accomplished using several different chemistries including, for example epoxidation and ring opening, ozonolysis, and hydroformylation and reduction.

Epoxidation and subsequent ring opening across the carbon-carbon double bonds of an acyl chain can be carried out using a variety of reagents including, for example, water, hydrogen, methanol, ethanol, propanol, isopropanol, or other polyols. Epoxidation can be facilitated by reaction with hydrogen peroxide and an acid catalyst. Ring opening can be facilitated by reaction with an alcohol, including, for example, β-substituted alcohols. In some embodiments, epoxides undergo ring opening by alcoholysis under acidic conditions. In some embodiments, epoxides undergo ring opening by alcoholysis under basic conditions. Thus, ring opening of epoxides can be facilitated in the presence of an acid or a base. Regioselectivity of the resulting polyol product may depend on whether the reaction is performed under acidic or basic conditions.

Epoxidation and subsequent hydrogenation of epoxides can also be used to generate polyols. This process can be carried out in the presence of hydrogen gas ($H_2$) and a suitable hydrogenation catalyst, such as iridium, nickel (e.g., Raney nickel), cobalt (e.g., Raney cobalt), palladium, platinum, rhodium, or ruthenium. Alkenes in unsaturated acyl chains of TAGs can undergo epoxidation and subsequent hydrogenation to generate a hydrogenated epoxidized algal oil polyol.

Hydroformylation with synthesis gas (syngas) can be carried out using rhodium or cobalt catalysts to form the aldehyde at the olefinic group. The resulting aldehyde can subsequently undergo reduction to an alcohol in the presence of hydrogen and a nickel catalyst to generate the polyol.

The hydroformylation chemistry results in the preservation of fatty acid length and formation of primary hydroxyl group moieties. Primary hydroxyl group functionalities can be desirable in some PU applications due to increased reactivity compared to secondary hydroxyl group moieties. Hydroxyl groups introduced to olefinic groups in the acyl can participate in subsequent downstream chemistries, i.e., reaction with an isocyanate moiety to form a urethane linkage or reaction with methyl esters to form polyesters. Saturated fatty acids which do not contain double bonds cannot participate in crosslinking reactions with isocyanates. Hence, saturated fatty acids can compromise the structural integrity and degrade performance of the polymer produced therefrom.

In some embodiments, polyols described herein have a substantial proportion of primary hydroxyl groups. In some embodiments, some or most of the polyols described herein contain secondary hydroxyl groups. In some embodiments, polyols can be modified to increase the proportion of primary hydroxyl groups.

Derivatives of natural oils can serve as the starting materials for producing NOPs. Non-limiting examples of natural oil derivatives suitable for producing NOPs include fatty acids, fatty acid methyl esters, fatty acid ethyl esters, hydroxylated fatty acids, hydroxylated fatty methyl esters, and hydroxylated fatty ethyl esters. A variety of natural oil polyols can be used to generate PUDs described herein. Non-limiting examples of such polyols include polyester diols, polyether diols, hydrogenated epoxidized TAG polyols, and epoxidized TAG polyols. Alternatively, TAG polyols (without further modification) can be directly used as starting materials for generating PUDs described herein.

Figure 2:
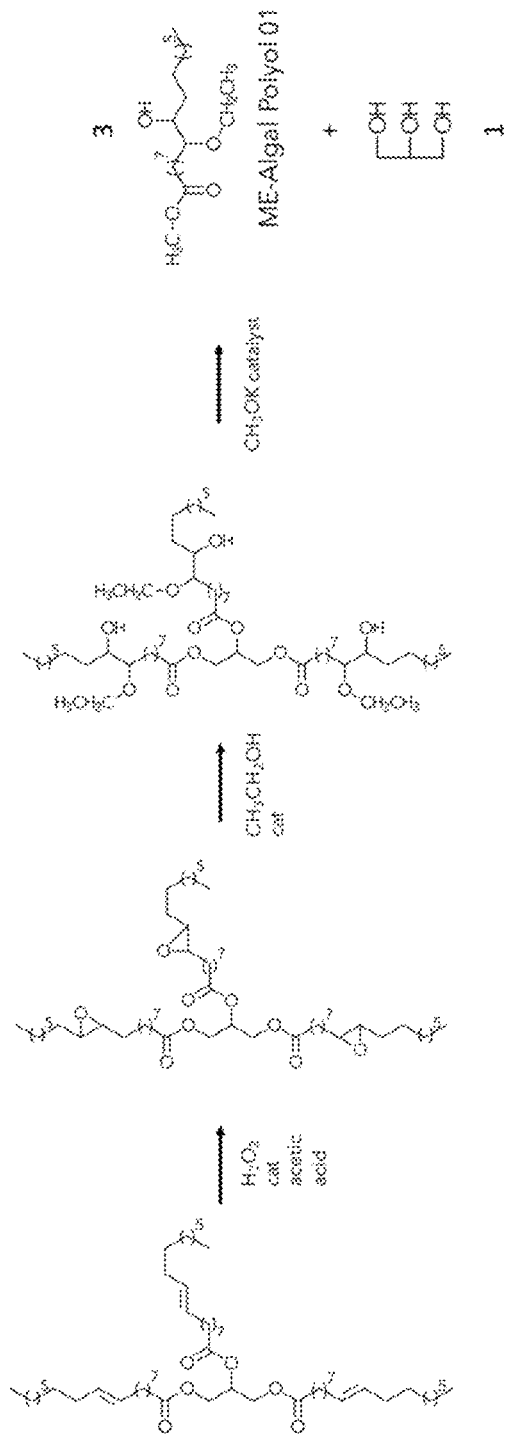
FIG. 2 illustrates a reaction scheme to create polyols from a triglyceride oil via epoxidation and ring opening, followed by generation of hydroxylated FAMEs.

Fatty acid methyl esters can be generated through ester chemistry. For example, the triglyceride can be cleaved through transesterification into fatty acid methyl esters (FAMEs) and glycerol as shown in FIG. 1. In turn, FAMEs can be subjected to epoxidation and ring opening, for example, to create FAMEs of alcohols. Alternatively, as illustrated in FIG. 2, polyols can first be generated from a triglyceride through epoxidation and ring opening, for example, followed by transesterification, into FAMEs of alcohols and glycerol. Glycerol and potassium methoxide catalyst can be removed by washing with water.

Figure 3:
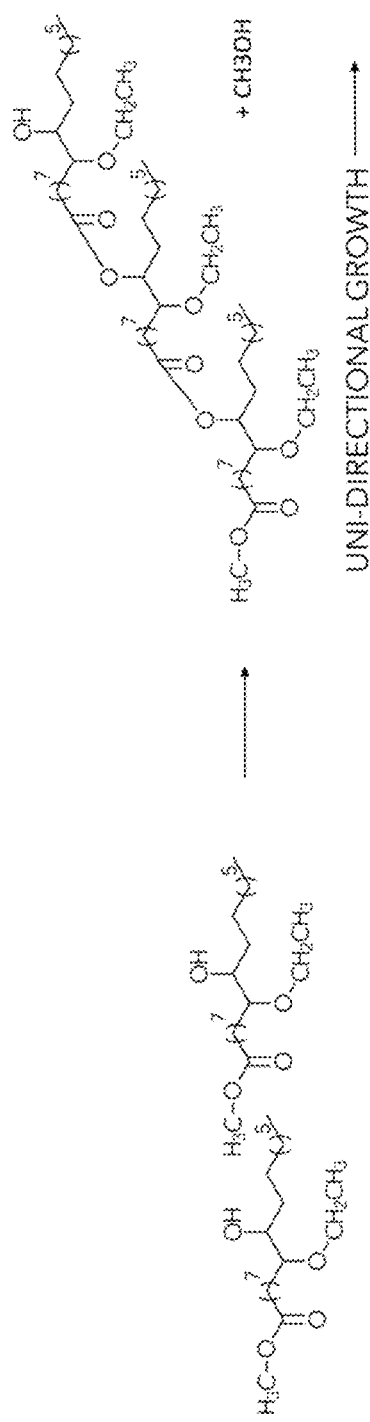
FIG. 3 illustrates a reaction scheme to generate higher molecular weight polyols from polyols of FAMEs.

Catalysts, including potassium methoxide ($KOCH_3$), 1,5,7-triazabicyclo[4.4.0]dec-5-ene (TBD), titanium(IV) isopropoxide (TIP), dibutyltin dilaurate (DBTDL), tris(pentafluorophenyl)borane (BCF), and potassium tert-butoxide, among others, can be utilized to re-esterify ester groups to alcohol moieties. The dual functionality of alcohol FAMEs can be used to create polymer networks using only the methyl esters of the alcohol as shown in FIG. 3. Due to the polarity of the molecules (i.e., ester on one end and alcohol at the other end), the resulting polymer networks can elongate unidirectionally, are linear, and terminate at a single hydroxyl group.

Figure 4:
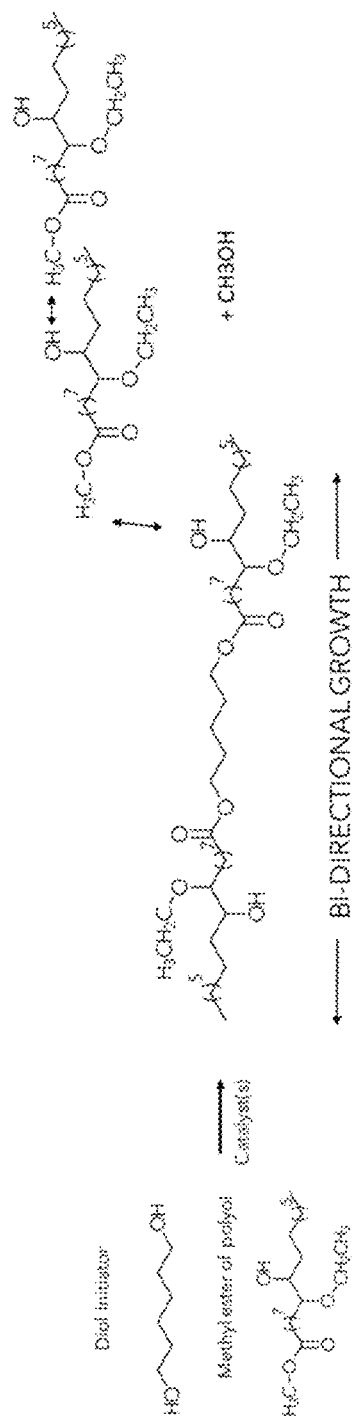
FIG. 4 illustrates a reaction to generate higher molecular weight polyols from polyols of FAMEs and diols.

Polymer networks can also be elongated bi-directionally through incorporation of a diol as shown in FIG. 4. Non-limiting examples of low molecular weight diols for useful for building polymer networks include propylene glycol, alkyl diols, 1,4-butanediol, 1,3-propanediol, and 1,6-hexanediol. In some embodiments, diols can be produced using microbial hosts as described herein.

Figure 5:
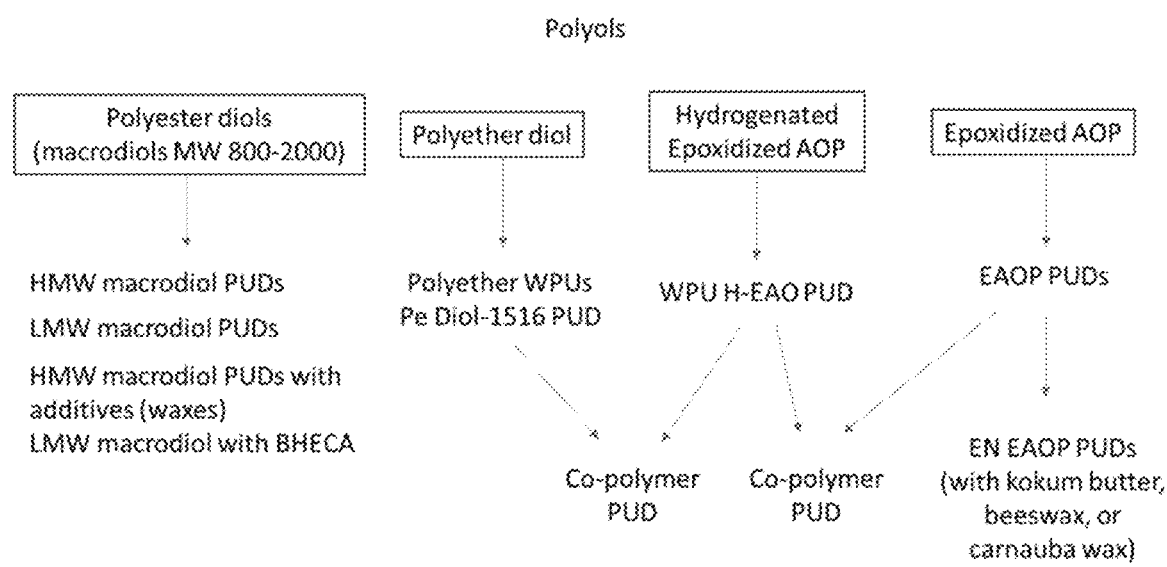
FIG. 5 illustrates various types of polyols that can be used to generate polyurethane dispersions (PUDs) described herein.

Hyperbranched polyols can be prepared to achieve a range of properties, such as molecular weight, viscosity, branching, and reactivity. For example, hyperbranched polyols can combine with isocyanates, ionogenic molecules, or hydrophobic compounds to impart beneficial surface effects to substrates. For example, FIG. 5 illustrates various types of polyols described herein that can be used to generate PUDs.

Non-limiting examples of polyols provided herein include:
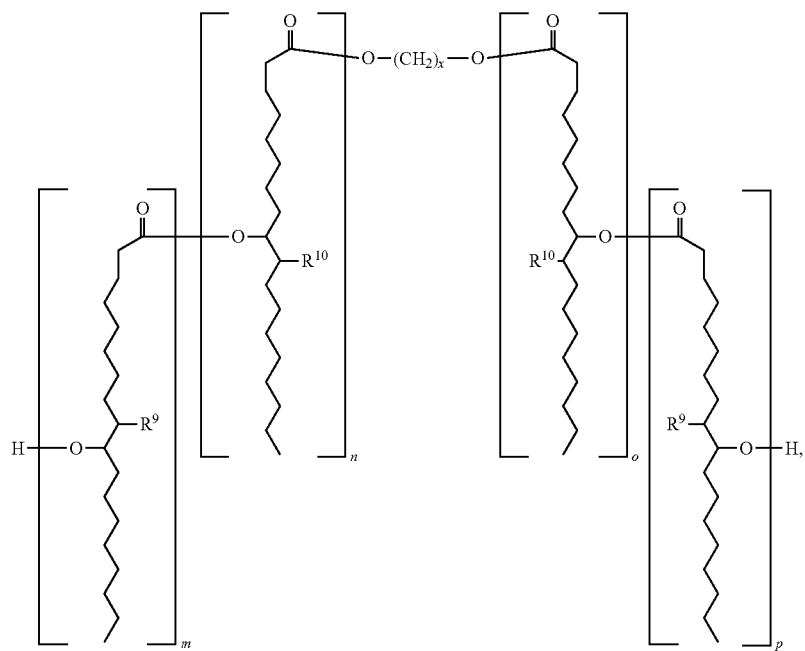
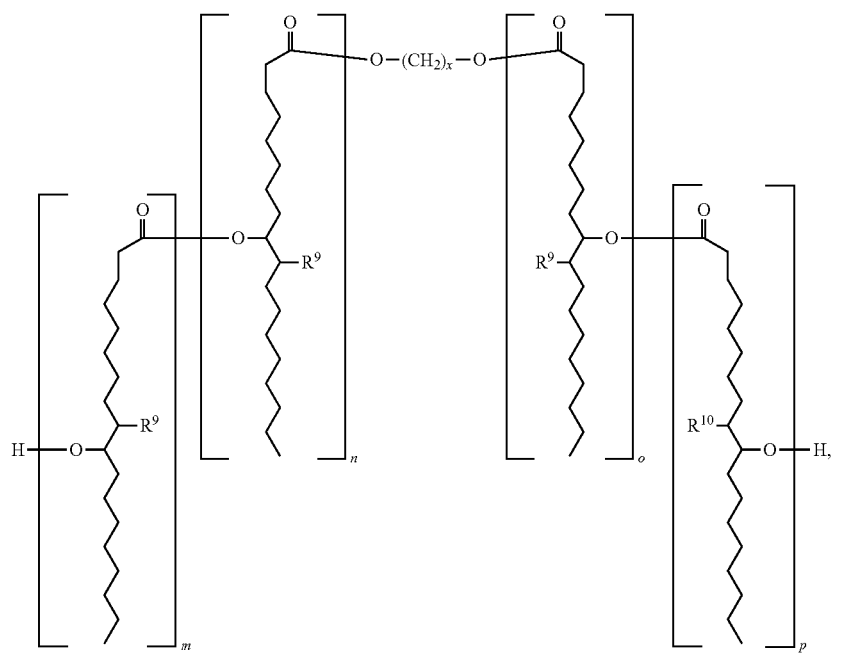
or

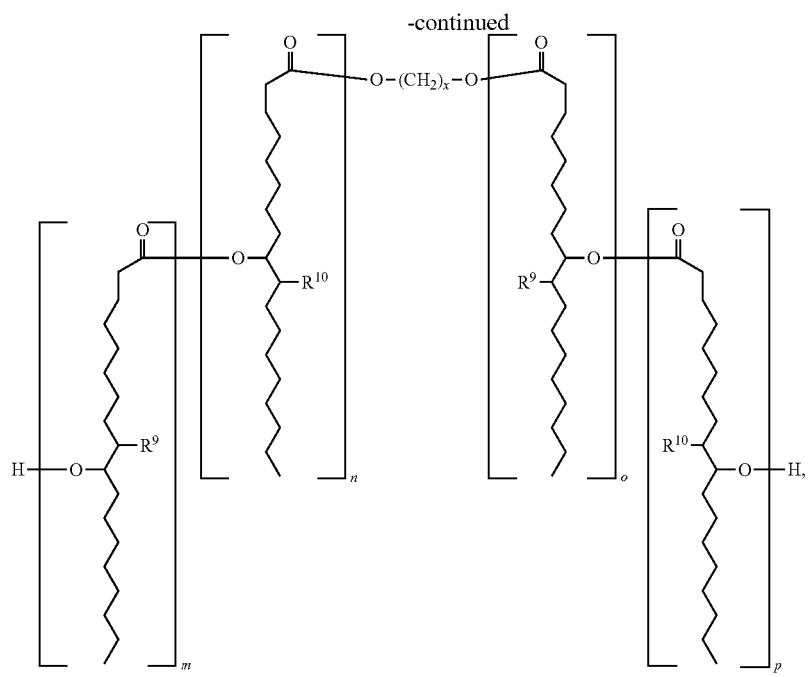

wherein:
x is an integer selected from 1-10;
m, n, o, and p are independently selected from 0-10; and
$R^9$ and $R^{10}$ are $-O(C_{1-6})$alkyl or $-O(C_{1-6})$acyl; and

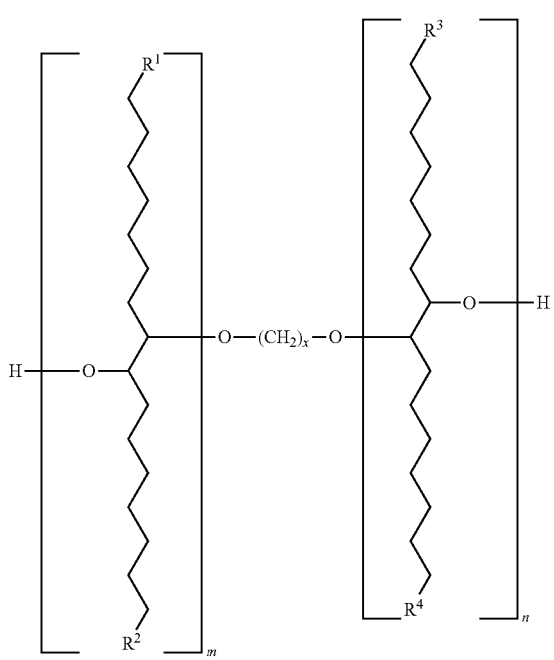

wherein:
x is an integer selected from 1-10;
m, n, o, and p are independently selected from 0-10; and
$R^9$ and $R^{10}$ are $-O(C_{1-6})$alkyl or $-O(C_{1-6})$acyl.

Hydrogenated Epoxidized Polyols

In some embodiments, provided herein is a method for producing a hydrogenated epoxidized algal TAG oil polyol by epoxidizing an algal TAG oil to generate an epoxidized algal TAG oil, wherein the epoxidized algal TAG oil comprises at least about 80% epoxidized oleic acid; and hydrogenating the epoxidized algal TAG oil in the presence of a catalyst and hydrogen to generate the hydrogenated epoxidized algal oil polyol. The epoxidized algal TAG oil comprising at least about 80% epoxidized oleic acid is the product of epoxidizing oleic acid moieties of the TAG. In some embodiments, the epoxidized algal TAG oil comprises at least about 90% epoxidized oleic acid. The hydrogenated epoxidized polyol can comprise greater than 80% or greater than 90% of 9-hydroxyoctadecanoic acid, 10-hydroxyoctadecanoic acid, or a combination thereof. The hydrogenated epoxidized polyol is the product of ring opening of epoxidized oleic acid moieties of the TAG.

In some embodiments, provided herein is a hydrogenated epoxidized algal oil polyol produced by a method described herein.

In some embodiments, provided herein is a reaction mixture for producing a hydrogenated epoxidized algal oil polyol, the reaction mixture comprising: an epoxidized algal TAG oil, wherein the epoxidized algal TAG oil comprises at least about 80% epoxidized oleic acid; a catalyst; and hydrogen gas. The epoxidized algal TAG oil is the product of epoxidizing oleic acid moieties of the TAG. In some embodiments, the epoxidized algal TAG oil comprises at least about 90% epoxidized oleic acid. The hydrogenated epoxidized polyol can comprise greater than 80% or greater than 90% of 9-hydroxyoctadecanoic acid, 10-hydroxyoctadecanoic acid, or a combination thereof. The catalyst can be a suitable hydrogenation catalyst, e.g., iridium, nickel (e.g., Raney nickel), cobalt (e.g., Raney cobalt), palladium, platinum, rhodium, or ruthenium. The hydrogenated epoxidized algal oil polyol has a hydroxyl number of 150-160.

Polyether Diols

In some embodiments, provided herein is a method for producing a polyether diol by epoxidizing an algal TAG oil, thereby generating an epoxidized algal TAG oil, wherein the epoxidized algal TAG oil comprises at least about 80% epoxidized oleic acid; subjecting the epoxidized algal TAG oil to methanolysis, thereby generating methyl esters of the epoxidized algal TAG oil (Me-EAO); and ring opening the Me-EAO with an alkyl diol in the presence of a catalyst, thereby generating the polyether diol. The epoxidized algal TAG oil comprising at least about 80% epoxidized oleic acid is the product of epoxidizing oleic acid moieties of the TAG. The epoxidized algal TAG oil can comprise at least about 90% epoxidized oleic acid. The polyether diol is the product of ring opening of epoxidized oleic acid moieties of the cleaved methyl esters resulting from methanolysis of the TAG. Methanolysis can be in the presence of methanol and a methoxide salt, such as $KOCH_3$. The alkyl diol can comprise 1,3-propanediol, 1,4-butanediol, 1,5-pentanediol, or 1,6-hexanediol. The catalyst can be a suitable transesterification catalyst, e.g., tris(pentafluorophenyl)borane. In some embodiments, the ring opening is with an excess of the Me-EAO as compared to the alkyl diol. In some embodiments, the molar ratio of the Me-EAO and the alkyl diol is about 6 to about 1.

In some embodiments, provided herein is a polyether diol produced by a method described herein.

In some embodiments, provided herein is a reaction mixture for producing a polyether diol, the reaction mixture comprising: epoxidized methyl esters cleaved from an epoxidized algal triglyceride oil, wherein at least about 80% of the epoxidized methyl esters are epoxidized methyl esters of oleic acid; an alkyl diol; and a catalyst.

In some embodiments, provided herein is a polyether diol having the formula:

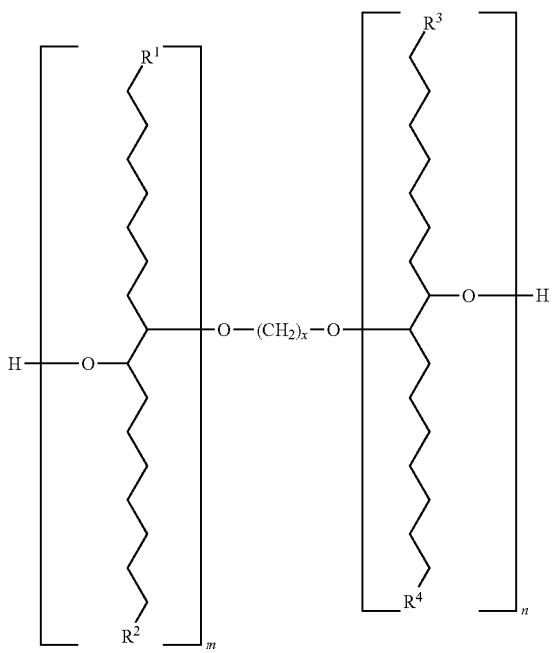

wherein:

x is an integer selected from 1-10;

m, n, o, and p are independently selected from 0-10; and $R^9$ and $R^{10}$ are —$O(C_{1-6})$alkyl or —$O(C_{1-6})$acyl.

Polyester Diols

In some embodiments, provided herein is a method for producing a polyester diol by epoxidizing an algal triglyceride oil, thereby generating an epoxidized algal triglyceride oil, wherein the epoxidized algal triglyceride oil comprises at least about 80% epoxidized oleic acid; ring opening the epoxidized algal oil in the presence of an alcohol, thereby generating an algal oil polyol; subjecting the algal oil polyol to methanolysis, thereby generating methyl esters of the epoxidized algal oil (Me-EAO); and chain extending the Me-EAO using an alkyl diol in the presence of a catalyst, thereby generating a polyester diol. The epoxidized algal TAG oil comprising at least about 80% epoxidized oleic acid is the product of epoxidizing oleic acid moieties of the TAG. The epoxidized algal TAG oil can comprise at least about 90% epoxidized oleic acid. The polyester diol is the product of chain extending polymerization of the alkyl diols and the cleaved methyl esters resulting from methanolysis of the algal oil polyol. Methanolysis can be in the presence of methanol and a methoxide salt, such as $KOCH_3$. The alkyl diol can comprise 1,3-propanediol, 1,4-butanediol, 1,5-pentanediol, or 1,6-hexanediol. The catalyst can be a suitable transesterification catalyst, e.g., tris(pentafluorophenyl)borane. In some embodiments, the ring opening is with an excess of the Me-EAO as compared to the alkyl diol. In some embodiments, the molar ratio of the Me-EAO and the alkyl diol is about 6 to about 1.

In some embodiments, provided herein is a polyester diol produced by a method described herein.

In some embodiments, provided herein is a reaction mixture for producing a polyester diol, the reaction mixture comprising: epoxidized methyl esters cleaved from an epoxidized algal triglyceride oil, wherein at least about 80% of the epoxidized methyl esters are epoxidized methyl esters of oleic acid; an alkyl diol; and a catalyst.

In some embodiments, provided herein is a polyester diol having the formula:

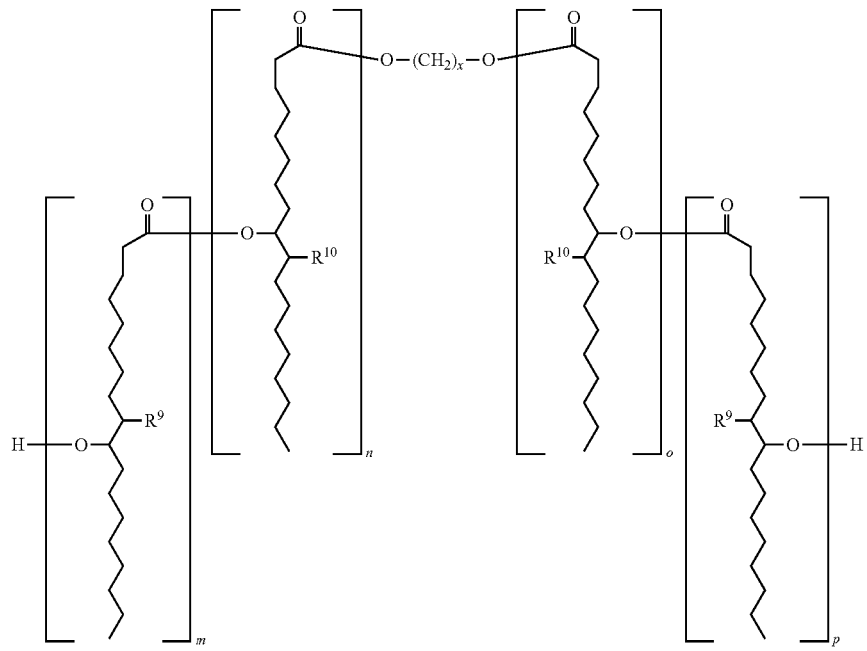

wherein:
x is an integer selected from 1-10;
m, n, o, and p are independently selected from 0-10; and
$R^9$ and $R^{10}$ are —O($C_{1-6}$)alkyl or —O($C_{1-6}$)acyl.

Waterborne Polyurethane Dispersions

Aqueous (or waterborne) PUDs comprise a binary colloidal system in which PU particles are dispersed in a continuous aqueous media. Methods of producing PUDs include the acetone process, the prepolymer mixing process, the melt dispersion process, and the ketimine/ketazine process.

PUD synthesis can be initially carried out in a solvent-containing system, as various components of PUD formulations are immiscible in water. Methyl ethyl ketone (MEK) can be a suitable solvent for this purpose and can be distilled off after the formation of a true, aqueous PUD. As such, PUDs can be prepared in the presence of MEK by forming an isocyanate-terminated prepolymer, dispersing the prepolymer in an aqueous phase by the addition of water, and optionally, forming the PU and/or urea polymer by chain-extending the prepolymer. The prepolymer itself can be made by reacting an excess of a polyisocyanate with a polyol.

The PUDs described herein can be formed by a two-step reaction process or a single step reaction process. In a single step process, a hydrophobic, soft segment precursor can be reacted with one or more hard segment precursors to form a PU prepolymer. The hydrophobic, soft segment precursor can include an oligomeric polyol derived from an intact triglyceride oil, or optionally, from fatty acid esters of a triglyceride oil-based polyol. The hard segment precursors can include an isocyanate (e.g., a diisocyanate, which can be aliphatic) and a hydrophilic second hard segment precursor, e.g., a polyol (such as a diol) that additionally includes a hydrophilic (e.g., ionic) group such as N-methyl diethanolamine (MDEA). Upon the addition of acetic acid, a dispersion can be formed with suitable mixing, followed by the distillation of the MEK to generate an aqueous dispersion. The resulting PU prepolymer includes (i) hydrophobic soft segments and hydrophilic second hard segments linked via urethane group reaction products with the first hard segment precursor, and (ii) terminal isocyanate functional groups (e.g., resulting from terminal first hard segment precursors with an unreacted isocyanate group).

In a second step, the PU prepolymer can be further reacted with an additional chain-extending hard segment precursor. The chain-extending hard segment precursor can be a third hard segment precursor that is reactive with the terminal isocyanate functional groups of the prepolymer (e.g., a diamine or polyamine chain extender forming urea/carbamide links between prepolymer segments). The resulting polymer can have a structure in which PU prepolymer units are linked via the chain extender and is capable of forming a dispersion of the PU polymer particles in an aqueous medium.

Non-limiting examples of PUD additives include surfactants, pH adjusters, crosslinkers, wetting agents, fats, waxes, wax extenders, matting agents, viscosity regulators, inorganic and organic pigments, dyes, and leveling agents. Suitable surfactants include anionic, cationic, nonionic, N-oxides, and amphoteric surfactants. Examples of such other additives include processing aids, foaming agents, lubricants, and anti-stains.

When waxes or fats are used as additives in PUDs, care must be taken as waxes are inherently insoluble in an aqueous solution. Waxes and fats generally do not participate in the PU chemistry. Instead, polymer networks are formed around the wax or fat to encapsulate the wax or fat. A failure to grow the PU network around the molten wax or fat can result in phase separation during the removal of MEK or other solvents.

Ionogenic molecules (known as ionogens or ionomers) are molecules composed of repeat units of electrically neutral repeating units and ionizable units that are covalently bonded to a polymer backbone. To achieve the water dispersibility of PUs described herein, PUD formulations described herein can include an ionogenic molecule that imparts hydrophilic characteristics to the prepolymer by nature of the charged moiety of the ionogenic molecule. In the case of anionomers, the charged moiety can be carboxylate or sulfonate groups. In the case of cationomers, the charged moiety can be ammonium groups. These hydrophilic groups allow the prepolymer to be easily water-dispersible and facilitate the formation of fine prepolymer droplets to form a stable polymer dispersion. Non-limiting examples of ionogenic molecules include N-methyl diethanolamine (MDEA), dimethylolpropionic acid (DMPA), and dimethylolbutanoic acid (DMBA). MDEA is a cationomer, whereas DMPA and DMBA are both anionomers.

Polyols can also be combined with hydrophobic compounds that increase the water resistant properties of the resulting PUD. Non-limiting examples of such hydrophobic compounds include methyl cinnamate, cinnamic acid, methyl ferulate, derivatives thereof (e.g., N,N-bis(2-hydroxyethyl) cinnamamide, also referred to as BHECA), and saturated or unsaturated aromatic carboxylic acids. Hydrophobic monomers can be bio-based or produced through renewable means. In some embodiments, hydrophobic monomers are of a renewable origin or character.

PUDs produced from microbiol oils and polyols described herein can have improved hydrophobicity, stability, durability, stain resistance, or abrasion resistance over PU materials produced from petroleum feedstocks or conventional vegetable oils, such as those derived from plant oilseed crops.

The PUDs described herein can be applied to substrates using methods described herein. Suitable substrates include fibrous substrates. The fibrous substrates can include fibers, yarns, fabrics, fabric blends, textiles, nonwovens, paper, leather, and carpets. These fibrous substrates can be made from natural or synthetic fibers including cotton, cellulose, wool, silk, rayon, nylon, aramid, acetate, acrylic, jute, sisal, sea grass, coir, polyamide, polyester, polyolefin, polyacrylonitrile, polypropylene, polyaramid, or blends thereof. Fabric blends are fabrics made of two or more types of fibers. These blends can be a combination of at least one natural fiber and at least one synthetic fiber, but also can include a blend of two or more natural fibers or of two or more synthetic fibers, as well as spunbonded-meltblown-spunbonded nonwovens. The treated substrates described herein can have excellent water repellency and stain release properties.

Textiles can be natural, synthetic, or semi-synthetic. The textiles can be of animal or plant origin, or can be purely synthetic. Non-limiting examples of textiles include fabrics, yarns, knits, fibers, wovens, non-wovens, clothing, garments, bedding, domestic linen, and upholstery. A textile can be treated prior with a coloring agent such as a dye or a pigment. Non-limiting examples of natural textiles include: burlap; calico; camel hair; canvas; cashmere; cheesecloth; chiffon; corduroy; cotton; denim; doeskin; double gauze; dowlas; drill; dugget; duck cloth; felt; fishnet; flannel; fleece; foulard; fur; fustian; gabardine; gauze; ghalamkar; haircloth; hemp; herringbone; himroo; hodden; jute; kemp; lace; lawn cloth; leather; textile linen; lensey-woolsey; longcloth; Mackinaw cloth; madapolam; madras; milliskin; mockado; mohair; moire; moleskin; monk's cloth; moquette; mouflon; muslin; natural grosgrain; natural melton; natural mesh; oilskin; organdy; organza; osnaburg; Ottoman; Oxford; paduasoy; polyester; pongee; poplin; quilting; Russel cord; satin; seersucker; sharkskin; silk; single gauze; spandex; suede; terrycloth; triple gauze; tweed; twill; velour; velvet; waterproof breathable fabrics; and wool. In certain embodiments, the textile is chosen from cotton and wool. Non-limiting examples of synthetic textiles include elastane, polyamide/elastane, Lycra®; Dyneema®; Gannex; Gore-Tex™; grosgrain; Kevlar™; synthetic melton; synthetic mesh; microfiber; milliskin; moire; Nomex™; nylon; rayon; silnylon; synthetic grosgrain; synthetic melton; synthetic mesh; and synthetic plush. Non-limiting examples of semi-synthetic textiles include semi-synthetic grosgrain; semi-synthetic melton; semi-synthetic mesh; and semi-synthetic plush.

Materials treated with formulations described herein can include any textile, for example, textiles used in the construction of apparel, footwear, backpacks, tents, tarps, outdoor equipment, rugs, carpets, drapes, sheets, mattress covers, bedding, blankets, and seating cushions used in home, office, automotive, airline, or marine applications. Examples of apparel suitable for use with the formulations described herein can include jackets, rain jackets, snow jackets, coats, shells, pants, bibs, and gloves. Examples of footwear suitable for treatment with formulations described herein can include hiking boots, work boots, approach shoes, trail shoes, and running shoes. Additional materials for application of PUDs can include wood or metal surfaces in home, office, automotive, airline, or marine applications.

PUD formulations described herein can be applied to substrates by a variety of application methods. Non-limiting examples of application methods include application by immersion, spraying, dipping, padding, exhaustion, foam, flex-nip, nip, pad, kiss-roll, beck, skein, winch, liquid injection, overflow flood, roll, brush, roller, and the like.

PUD formulations described herein can be diluted with water to achieve a desired activity level and then applied onto a fiber or fabric textile. Removal of any excess emulsion can be achieved by using a mangle, centrifugal separator, or the like to control the amount of liquid absorbed by the textile. Drying can be effected with or without heat. Depending upon the particular textile being treated, when drying is performed with heat, the temperature can range from about 70° C. to about 180° C., and the time of heating from about 1 minute to about 30 minutes. After removal of excessive dispersion, subsequent heating to promote curing can be performed. Cure temperatures can range from about 120° C. to about 200° C. and cure time can range from about 1 minute to about 30 minutes. Upon curing, the resultant condensation product can impart durability, water repellency, and softness to the textile.

In some embodiments, a PUD formulation described herein has a bio-based content of about 50% to about 60% as assessed by ASTM 6866. For example, a PUD formulation described herein has a bio-based content of at least 50%, at least 51%, at least 52%, at least 53%, at least 54%, at least 55%, at least 56%, at least 57%, at least 58%, at least 59%, or at least 60%. In some embodiments, a PUD formulation described herein has a bio-based content of about 50%, about 51%, about 52%, about 53%, about 54%, about 55%, about 56%, about 57%, about 58%, about 59%, or about 60%.

A PUD formulation described herein can be characterized by solids content. Solids content is the mass of the material remaining after drying, e.g., at 70° C. for about 2 hr. Solids content can be calculated as follows: (dry mass of the PUD/starting mass of the PUD)×100. For example, a PUD formulation described herein has a solids content of at least 20%, at least 21%, at least 22%, at least 23%, at least 24%, at least 25%, at least 26%, at least 27%, at least 28%, at least 29%, at least 30%, at least 31%, at least 32%, at least 33%, at least 34%, at least 35%, at least 36%, at least 37%, at least 38%, at least 39%, or at least 40% on a weight percentage basis. In some embodiments, a PUD formulation described herein has a bio-based content of about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, or about 40% on a weight percentage basis.

A PUD formulation described herein can be characterized by hard segment content. Hard segment content can contribute to moisture retention. Hard segment content can be determined from the total soft segment content of a PUD. The total soft segment content can be calculated from the polyol-isocyanate interactions in the PUD as follows: (moles of the polyol×MW of the polyol)+(moles of the isocyanate× MW of the isocyanate). Hard segment content can then be calculated by subtracting the total soft segment content from the total mass of the raw materials as follows: (MW of the ionomer×moles of the ionomer)+(MW of the neutralizing component×moles of the neutralizing component)+(MW of the chain extender×moles of the chain extender). In cases where no chain extender is used in the formulation, the chain extender component is omitted in the hard segment content calculation. For example, a PUD formulation described herein has a hard segment content of at least 30%, at least 31%, at least 32%, at least 33%, at least 34%, at least 35%, at least 36%, at least 37%, at least 38%, at least 39%, at least 40%, at least 41%, at least 42%, at least 43%, at least 44%, at least 45%, at least 46%, at least 47%, at least 48%, at least 49%, or at least 50% on a weight percentage basis. In some embodiments, a PUD formulation described herein has a hard segment content of about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, or about 50% on a weight percentage basis.

Stability of a PUD can be characterized based on whether the PUD remains dispersed in solution, e.g., aqueous solution. Stability can be assessed by centrifugation in a conical test tube of a PUD sample for about 30 minutes at about 3,000 rpm and visual inspection for the presence of solid precipitates on the sides and bottom of the tube.

A PUD formulation described herein can be characterized by viscosity at ambient temperature (e.g., about 25° C.). Viscosity can be determined using a rheometer, e.g., TA Instruments AR 2000 rheometer with a 40 mm 2-degree steel cone at 25° C. For example, a PUD formulation described herein has a viscosity of less than 0.5 mPa·s, less than 1 mPa·s, less than 2 mPa·s, less than 3 mPa·s, less than 4 mPa·s, less than 5 mPa·s, less than 6 mPa·s, less than 7 mPa·s, less than 8 mPa·s, less than 9 mPa·s, or less than 10 mPa·s. In some embodiments, a PUD formulation described herein has a viscosity of from about 1 mPa·s to about 10 mPa·s, from about 4 mPa·s to about 10 mPa·s, or about 4 mPa·s to about 8 mPa·s.

A PUD formulation described herein can be characterized by particle size distribution. Particle size distribution of the PUDs can be measured by dynamic light scattering, e.g., using a Zetasizer device. For example, a PUD formulation described herein can have a particle size distribution from about 70 nm to about 100 nm. In some embodiments, a PUD formulation described herein has a maximum particle size of less than 500 nm, less than 400 nm, less than 300 nm, less than 200 nm, less than 100 nm, less than 90 nm, less than 80 nm, or less than 70 nm.

Polydispersity index (PDI) can be used to describe the width or spread of the particle size distribution. PDI can also be measured by dynamic light scattering, e.g., using a Zetasizer device. PDI value can range from 0 to 1, where the colloidal particles with PDIs less than 0.1 implies monodisperse particles and colloidal particles with PDIs more than 0.1 imply polydisperse particle size distributions. In some embodiments, a PUD formulation described herein has a PDI of less than 0.1, less than 0.15, less than 0.2, less than 0.3, less than 0.4, or less than 0.5. In some embodiments, a PUD formulation described herein has a PDI of about 0.10, about 0.11, about 0.12, about 0.13, about 0.14, about 0.15, about 0.16, about 0.17, about 0.18, about 0.19, or about 0.20.

A PUD formulation described herein can be characterized by hydrophobicity or water repellency when applied as a film onto a substrate. Water repellency can be assessed by water contact angle measurements and water absorption. The contact angle is the angle where a liquid interface meets a solid surface. Water contact angle can be used to quantify the wettability of a solid surface (PUD film) by a liquid (water). Generally, the greater the contact angle, the higher the degree of hydrophobicity of the surface. Water contact angles can be determined by applying a thin film of a liquid PUD onto a glass slide. After drying, contact angle measurements can be performed with a Drop Shape Analyzer DSA25. These devices are designed to determine the wettability as well as the surface tension of a PUD film.

In some embodiments, a PUD film described herein has a water contact angle of 60 to 70 degrees, 70 to 80 degrees, 80 to 90 degrees, 60 to 100 degrees, 70 to 100 degrees, 80 to 100 degrees, 90 to 100 degrees, 100 to 110 degrees, 100 to 150 degrees, or greater. In some embodiments, a PUD film described herein has a water contact angle of greater than 60 degrees, greater than 65 degrees, greater than 70 degrees, greater than 75 degrees, greater than 80 degrees, greater than 85 degrees, greater than 90 degrees, greater than 95 degrees, or greater than 100 degrees. In some embodiments, a PUD film described herein has a water contact angle of about 60 degrees, about 65 degrees, about 70 degrees, about 75 degrees, about 80 degrees, about 85 degrees, about 90 degrees, about 95 degrees, about 100 degrees, or about 110 degrees.

Water absorbency of a PUD film can be determined gravimetrically. PUDs can be casted in Teflon molds and cured. The dried PUD films of known weight ($m_0$) can be immersed in water at room temperature for 24 h. Excess water can be removed by wiping with a paper towel prior to weighing again ($m_1$). The percentage of water absorption (WA) can be calculated as follows: $WA=((m_1-m_0)/m_0)\times 100$.

In some embodiments, a PUD formulation described herein has a water absorption of 0% to about 5%, 0% to about 4%, 0% to about 3%, 0% to about 2%, or 0% to about 1%. In some embodiments, a PUD formulation described herein has a water absorption of less than 10%, less than 9%, less than 8%, less than 7%, less than 6%, less than 5%, less than 4%, less than 3%, less than 2%, or less than 1%.

The amount of a PUD film on a textile can also be characterized by pick-up percentage, which refers to the amount of PUD picked up by the textile during application of the PUD thereto. In examples described herein, a PUD having a known solids content, is applied to a tared textile sample. After application of the PUD, the wet textile sample is then weighed. The pick-up percentage is the increase in weight, on a percentage basis, of the textile sample when dry. In some embodiments, a PUD formulation described herein has a pick-up percentage of at least 50%, at least 60%, at least 70%, or at least 80%.

Application of a PUD film on a textile can also be characterized by spray rating testing, e.g., according to AATCC (American Association of Textile Chemists and Colorists) Method 22-2010. Spray rating can be determined by comparing the appearance of the tested specimen with descriptive standards and photographs to evaluate the ability of the WPU film treated textiles to repel water. Samples can be rated according to a Standard Spray Test Rating Chart:
100—No sticking or wetting of upper surface;
90—Slight random sticking or wetting of upper surface;
80—Wetting of upper surface at spray points;
70—Partial wetting of whole of upper surface;
50—Complete wetting of whole of upper surface; and
0—Complete wetting of whole upper and lower surfaces.

Glass transition temperature ($T_g$) of a PUD formulation can be assessed by differential scanning calorimetry (DSC). Samples for DSC can be obtained from polymer films (weight of about 10-12 mg). DSC can be carried out on a thermal analyzer in a nitrogen atmosphere. Samples can be cooled to −80° C., then heated to 120° C. with a heating rate of 10° C./min to erase the thermal history of the sample. Samples can then be cooled to −80° C. with a cooling rate of 10° C./min, and heated again to 120° C. with heating rate of 10° C./min. In some embodiments, the PUD formulation described herein has a $T_g$ of about 0° C. to about 50° C., about 5° C. to about 10° C., about 10° C. to about 20° C., about 20° C. to about 30° C., about 30° C. to about 40° C., or about 40° C. to about 50° C.

PUD formulations can also be characterized by mechanical testing, including tensile strength and elongation at break testing. For mechanical testing, PUD formulations can be casted in Teflon molds and cured to produce PUD films. Mechanical properties of the films can be analyzed by using an Instron Universal Testing Machine with crosshead speed of 50 mm/min. Rectangular samples of 60×8 mm² (length× width) can be used.

In some embodiments, a PUD formulation described herein has a tensile strength of about 0.1 MPa to about 20 MPa, about 1 MPa to about 10 MPa, about 5 MPa to about 10 MPa, about 10 MPa to about 15 MPa, or about 10 MPa to about 20 MPa. For example, a PUD film described herein has a tensile strength of about 1 MPa, about 2 MPa, about 3 MPa, about 4 MPa, about 5 MPa, about 6 MPa, about 7 MPa, about 8 MPa, about 9 MPa, about 10 MPa, about 11 MPa, about 12 MPa, about 13 MPa, about 14 MPa, about 15 MPa, about 16 MPa, about 17 MPa, about 18 MPa, about 19 MPa, or about 20 MPa. Tensile strength of a PUD film can be assessed by ASTM D638.

In some embodiments, the PUD film described herein has an elongation at break of greater than 100%, greater than 200%, greater than 300%, greater than 400%, greater than 500%, greater than 600%, greater than 700%, greater than 800%, greater than 900%, or greater than 1,000%. For example, a PUD film described herein has an elongation at break of 100% to 200%, 200% to 300%, 300% to 400%, 400% to 500%, 500% to 600%, 600% to 700%, 700% to 800%, 800% to 900%, or 900% to 1,000%. Elongation at break of a PUD film can be assessed by ASTM D638.

In some embodiments, provided herein is a method for producing a polyurethane dispersion by:
a) epoxidizing an algal TAG oil, thereby generating an epoxidized algal TAG oil;
b) ring opening the epoxidized algal TAG oil in the presence of an alcohol, thereby generating an algal oil polyol;
c) reacting the algal oil polyol with an isocyanate, an ionomer, and an additive, thereby generating an isocyanate-terminated pre-polymer;
d) neutralizing the isocyanate-terminated pre-polymer with an acid or a base, thereby generating a neutralized isocyanate-terminated pre-polymer; and
e) dispersing the neutralized isocyanate-terminated pre-polymer in water, thereby generating the polyurethane dispersion that encapsulates the additive,
wherein the algal TAG oil comprises at least 60% of one or more monounsaturated fatty acids.

In some embodiments, provided herein is a method for producing a polyurethane dispersion by:
a) epoxidizing an algal TAG oil, thereby generating an epoxidized algal TAG oil;
b) ring opening the epoxidized algal oil in the presence of an alcohol, thereby generating an algal oil polyol;
c) subjecting the algal oil polyol to methanolysis, thereby generating methyl esters of the epoxidized algal oil (Me-EAO);
d) chain extending the Me-EAO using an alkyl diol in the presence of a catalyst, thereby generating a polyester diol;
e) reacting the polyester diol with an isocyanate, an ionomer, and an additive, thereby generating an isocyanate-terminated pre-polymer;
f) neutralizing the isocyanate-terminated pre-polymer with an acid or a base, thereby generating a neutralized isocyanate-terminated pre-polymer; and
g) dispersing the neutralized isocyanate-terminated pre-polymer in water and a chain extender, thereby generating the polyurethane dispersion that encapsulates the additive,
wherein the algal TAG oil comprises at least 60% of one or more monounsaturated fatty acids.

The algal TAG oil comprises the one or more monounsaturated fatty acids such that the one or more monounsaturated fatty acids are at least 60% of the fatty acids appended to the glycerol backbone of the TAG.

The algal TAG oil can comprise at least 80% of one or more monounsaturated fatty acids. The algal TAG oil can comprise at least 90% of one or more monounsaturated fatty acids. The one or more monounsaturated fatty acids is a C18:1 fatty acid. The one or more monounsaturated fatty acids is oleic acid. The algal TAG oil can comprise at least 60% of oleic acid, at least 80% of oleic acid, or at least 90% of oleic acid.

The algal TAG oil can have an iodine value of at least 80 g $I_2$/100 g, e.g., 88 g $I_2$/100 g.

The epoxidized algal TAG oil can comprise at least about 80% epoxidized oleic acid or at least about 90% epoxidized oleic acid.

The alcohol can be ethanol.

The isocyanate can be isophorone diisocyanate (IPDI) or dicyclohexylmethane diisocyanate (HMDI).

The ionomer is N-methyldiethanolamine (MDEA).

The additive does not react with the algal oil polyol, the isocyanate, or the ionomer.

In some embodiments, the additive is present in an amount of from 1-30%, from 1-10%, from 10-30%, from 10-20%, from 20-30%, e.g., about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30%.

The wax or fat can comprise kokum butter, beeswax, or carnauba wax.

The neutralizing of the isocyanate-terminated pre-polymer is with acetic acid.

The molar ratio of the algal oil polyol, the ionomer, and the isocyanate is 0.5-1.5 to 0.5-1.5 to 1.5-2.5, respectively. For example, molar ratio of the algal oil polyol, the ionomer, and the isocyanate can be 0.8-1.2 to 0.8-1.2 to 1.8-2.3, respectively. For example, the molar ratio of the algal oil polyol, the ionomer, and the isocyanate can be 1 to 0.95 to 2, respectively. The molar ratio of the algal oil polyol, the ionomer, and the isocyanate can be 1 to 1.2 to 2.3, respectively.

In some embodiments, provided herein is a method for producing a polyurethane dispersion by:
a) reacting an algal oil polyol with an isocyanate, an ionomer, and an additive, thereby generating an isocyanate-terminated pre-polymer;
b) neutralizing the isocyanate-terminated pre-polymer with an acid or a base, thereby generating a neutralized isocyanate-terminated pre-polymer; and
c) dispersing the neutralized isocyanate-terminated pre-polymer in water, thereby generating the polyurethane dispersion that encapsulates the additive.

In some embodiments, the algal oil polyol is a polyester diol, a polyether diol, a hydrogenated epoxidized polyol, or an epoxidized polyol.

In some embodiments, provided herein is a method for producing a polyurethane dispersion by:
a) reacting an epoxidized and ring opened algal oil polyol (EAOP) composition with an isocyanate and an ionomer, thereby generating an isocyanate-terminated pre-polymer;
b) neutralizing the isocyanate-terminated pre-polymer with an acid or a base, thereby generating a neutralized isocyanate-terminated pre-polymer; and
c) dispersing the neutralized isocyanate-terminated pre-polymer in water, thereby generating the polyurethane dispersion,
wherein the EAOP comprises at least 50% of a compound of the formula:

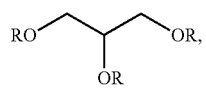

wherein each R is independently selected from:

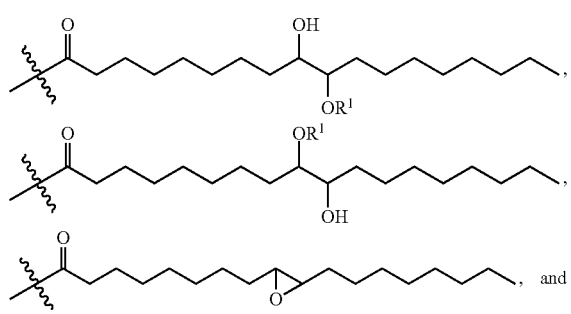

wherein $R^1$ is —$(C_{1-6})$alkyl or —$(C_{1-6})$acyl.

In some embodiments, provided herein is a method for producing a polyurethane dispersion by:
a) reacting an epoxidized and ring opened algal oil polyol (EAOP) composition with an isocyanate and an ionomer, thereby generating an isocyanate-terminated pre-polymer;
b) neutralizing the isocyanate-terminated pre-polymer with an acid or a base, thereby generating a neutralized isocyanate-terminated pre-polymer; and
c) dispersing the neutralized isocyanate-terminated pre-polymer in water, thereby generating the polyurethane dispersion,
wherein at least 50% of the EAOP on a molar basis are one or more compounds of the formula:

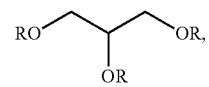

wherein each R is independently selected from:

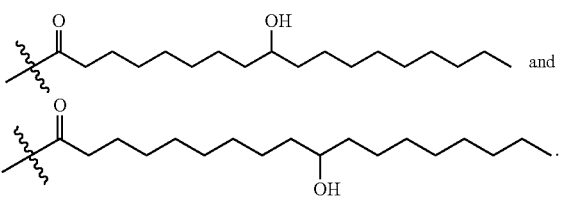

Test Methods

The following test methods and materials can be used to characterize PUDs described herein.

Test Method 1—Water Repellency. The water repellency of a treated substrate can be measured according to the DuPont Technical Laboratory Method as outlined in the TEFLON® Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance the finished substrate has to staining by water-based substances.

Test Method 2—Spray Test. The dynamic water repellency of treated substrates was measured according to the AATCC 22-2010. Samples are visually scored by reference to published standards, with a rating of 100 denoting no water penetration or surface adhesion. A rating of 90 denotes slight random sticking or wetting without penetration; lower values indicate progressively greater wetting and penetration.

Test Method 3—Stain Release. This test measures the ability of a fabric to release oily stains during home laundering. Treated textiles are placed on a flat surface. Using an eyedropper, 5 drops of MAZOLA® corn oil or mineral oil (0.2 mL) are placed onto the fabric to form 1 drop of oil. A weight (5 lb, 2.27 kg) is placed on top of the oil drop with a piece of glassine paper separating the oil drop. The weight is left in place for 60 seconds. After 60 seconds, the weight and glassine paper are removed. The textiles samples are then washed using an automatic washer on high for 12 min with AATCC 1993 Standard Reference Detergent WOB12 or granular detergent (100 g). The textiles are then dried on high for 45-50 min. Finally, the textiles are evaluated for residual stain of 1 to 5 with 1 having the largest residual stain remaining and 5 being no stain residual was visible.

Test Method 4—Water Resistance (Rain Test) [AATCC 35]: This test measures the resistance to the penetration of water by impact, and thus can be used to predict the probable rain penetration resistance of fabrics. A test specimen, backed by a weighed blotter, is sprayed with water for 5 min under controlled conditions. The blotter is then reweighed to determine the amount of water which has leaked through the specimen during the test.

Test Method 5—Water Resistance (Hydrostatic Pressure Test) [AATCC 127]: This test measures the resistance of a fabric to the penetration of water under hydrostatic pressure. It is applicable to all types of fabrics, including those treated with a water resistant or water repellent finish. Water resistance depends on the repellency of the fibers and yarns, as well as the fabric construction. The results obtained by this method may not be the same as the results obtained by the test methods for resistance to rain or water spray. One surface of the test specimen is subjected to a hydrostatic pressure that is increased at a constant rate until three points of leakage appear on the other surface of the test specimen.

EXAMPLES

The invention, having been described in detail above, is exemplified in the following examples, which are offered to illustrate, but not to limit, the claimed invention.

Example 1: Generation of an Algal Oil Polyol Through Epoxidation and Ring Opening An algal oil polyol was prepared from an algal oil obtained from a genetically modified *P. moriformis* strain (as described in US20160348119A1). To generate an epoxidized algal oil, the reagents and amounts indicated in TABLE 2 were charged in a reactor equipped with a magnetic bar stirrer, a thermometer, and a neck for addition of chemicals. The mixture was heated to 65° C. upon which hydrogen peroxide was added dropwise. The temperature of the reaction was held below 80° C. for 70 min. The reaction then continued at 70° C. for 7 hr. Amberlite was removed by filtration. The mixture was then washed with hot, distilled water until a neutral pH was reached. Washing was carried out in a separatory funnel by shaking and the mixture separated into two layers. Water layer (bottom) was removed, and the organic layer was dried in a rotary evaporator under vacuum. The epoxidized oil was characterized by standardized methods. Values are given in TABLE 3.

TABLE 2

| Reagent | Amount (g) |
| --- | --- |
| Algal Oil, Iodine value: I.V. = 88 g $I_2$/100 g | 200 |
| Hydrogen peroxide ($H_2O_2$), 30 wt % in water | 21 |
| Toluene, ≥99.3% | 119 |
| Glacial acetic acid (AcOH), M = 60 g/mol | 35 |
| Ion exchange resin Amberlite IR 120H (Aldrich) | 100 |

TABLE 3

| Property (units) | Standard | Value |
| --- | --- | --- |
| Acid number (mg KOH/g) | IUPAC 2.201 | 0.68 |
| Epoxy oxygen content (%) | ASTM D1652, Test method B | 5.01 |
| Hydroxyl number (mg KOH/g) | ASTM E1899 | 118.3 |

Polyols were synthesized in a 500-mL, three-neck round bottom flask, equipped with a reflux condenser and a strong mechanical stirrer or magnetic bar stirrer. Alcohol and catalyst were added first into the flask. The mixture was then heated to the boiling point of alcohol and the epoxidized algal oil (EAO) was added over about 5 min from a dropping funnel. The reaction mixture was stirred throughout the reaction. The total reaction time was 30 min. Lewatitte MP-64 (Bayer) was added as a neutralizing agent for the catalyst. The mixture was then stirred and left to cool for about 1 hour until the acid was neutralized (i.e., pH was around 6 as determined using pH paper). The ion-exchange resin was then separated from the liquid portion by filtration (Fisher brand filter paper P8; porosity—coarse). Methanol was removed by evaporation (distillation and rotary evaporator): first under low vacuum and then 1 hour under high vacuum at 70-80° C. TABLE 4 lists reagents used in the ring opening reactions to produce polyols. TABLE 5 presents properties of two resulting algal polyols.

TABLE 4

| Reagent (grams) | Polyol 1 | Polyol 2 |
| --- | --- | --- |
| Epoxidized Algal Oil | 150 | 200 |
| Methanol | 91.8 | 0 |
| Ethyl alcohol, absolute, 200 proof, 99.5% (Aldrich) | 0 | 173.1 |
| Catalyst ($HBF_4$, 48 wt % in water, Aldrich) | 0.5 | 0.777 |
| Ion-exchange resin, Lewatitte, MP-64 (Bayer) | 5 | 7 |

TABLE 5

| Property (units) | Standard | Polyol 1 | Polyol 2 |
| --- | --- | --- | --- |
| Acid number (mg KOH/g) | IUPAC 2.201 | 0.58 | 0.66 |
| Epoxy oxygen content (%) | ASTM D1652, Test method B | 0.01 | 0.03 |
| Hydroxyl number (mg KOH/g) | ASTM E1899 | 158.15 | 152 |
| Viscosity ($\eta$@25° C., Pa · s) | | 1.99 | 1.87 |

Example 2: Synthesis of Polyester Diols from an Algal Polyol and 1,6-Hexanediol Polyester diols with molecular weights of ca. 1675, 1745, and 2065 were generated from methyl esters of ethanol ring opened, epoxidized algal oil and 1,6-hexanediol. Algal triglyceride oil characterized by an Iodine Value of 88 g $I_2$/100 g and a fatty acid profile of 91% oleate, 5% linoleate, 1.8% palmitate, and 1.12% other fatty acids was epoxidized and ring opened with ethanol according to the procedure described in EXAMPLE 1 to generate a polyol designated Et-EAO. Methyl esters of Et-EAO, designated Me-Et-EAO, were obtained via methanolysis by reacting Et-EAO with methanol (Sigma-Aldrich, MW=32.04 g/mol) in the presence of $KOCH_3$ (Sigma-Aldrich, MW=0.132 g/mol).

Briefly, 400 g polyol, 660 g methanol, and 4 g potassium methoxide were added to a 2-L Parr high pressure reactor with agitation (1200 rpm). The reaction temperature was increased to 80° C. and held for 5 min at a pressure of 20-40 psi. The pressure was released, and the reactor allowed to cool to 60° C. The contents were then transferred to a rotary evaporator, heated to 60° C., and excess MeOH was removed under vacuum. The material was then transferred to a separatory funnel and the glycerol phase removed from the resulting Me-Et-EAO. The polyol product was washed a further 3× with water until the water phase was neutral by pH. The Me-Et-EAO was dried on rotary evaporator at 90° C. for 3 hr under high vacuum. Me-Et-EAO was characterized by a viscosity of 0.43 Pa·s and a hydroxyl number of 155 mg KOH/g.

Polyester diols of differing molecular weights, designated Diol-1675, Diol-1745, and Diol-2065, were generated from Me-Et-EAO and 1,6-hexanediol (HDO) using titanium(IV) isopropoxide (TIP) as a catalyst. Molar ratios of Me-Et-EAO to 1,6-hexanediol were kept at 5:1, 6:1, and 7:1, respectively, while catalyst concentration was kept at 0.5 wt. % for each reaction. Starting materials, including catalyst, were charged into a 3-necked, round bottom flask equipped with a magnetic stirrer, a nitrogen inlet, a thermocouple, a Dean Stark condenser, and a sparger. Nitrogen was sparged for 15 min at which point the vessel was heated to 160° C. for 15 min. The temperature was further ramped to 200° C. over the course of 1 hr, then held for 34-64 hr depending upon the molecular weight desired. Heating was stopped when the content of Me-Et-EAO comprised less than 2% of the reaction products as assessed by gel permeation chromatography. TABLE 6 provides reaction components and the physical properties of the resulting polyester diols.

TABLE 6

| Polyol | Molar ratio [Me—Et-EAO]:[HDO] | Reaction conditions | Scale (kg) | $OH^\#$ | MW (g/mol) | Viscosity η @ 25° C., Pa·s | Appearance |
|---|---|---|---|---|---|---|---|
| Diol-1675 | 5:1 | 64 h @ 200° C. | 0.43 | 70 | 1675 | 2.1 | Dark brown |
| Diol-1745 | 6:1 | 36 h @ 200° C. | 1.5 | 64 | 1745 | 2 | Dark brown |
| Diol-1745 | 6:1 | 37 h @ 200° C. | 1.5 | 64 | 1745 | 2 | Dark brown |
| Diol-1745 | 6:1 | 38 h @ 200° C. | 1.5 | 64 | 1745 | 2 | Dark brown |
| Diol-1745 | 6:1 | 39 h @ 200° C. | 1.5 | 64 | 1745 | 2 | Dark brown |
| Diol-2065 | 7:1 | 23 h @ 200° C. | 0.52 | 54 | 2065 | 3.2 | Dark brown |

Example 3: Synthesis of Hydrogenated Epoxidized Algal Oil (H-EAO) Polyol

A polyol was generated through the hydrogenation of an epoxidized algal oil. The epoxidized algal oil (EAO) was prepared as outlined in EXAMPLE 1. Raney nickel, isopropanol, ethyl acetate, and Celite® were purchased from Sigma-Aldrich.

400 g EAO, 320 g isopropanol, and 80 g sponge nickel were charged to a 2-L Parr high pressure reactor. The reactor was flushed with 50 psi hydrogen 4×, then heated to 110° C. with agitation set at 1500 rpm. Hydrogen gas was maintained at 120 psi for 16 hr followed by an increase to 940 psi for 8 hr, and an increase to 1140 psi for 6 hr after which no additional hydrogen was consumed. At the conclusion of the reaction, the contents were cooled to about 50° C. Ethyl acetate was then added to rinse the reactor contents onto a bed of Celite® and applied to a Büchner funnel. Isopropanol and ethyl acetate were removed by rotary evaporation under low vacuum at 70° C. followed by the addition of toluene to further reduce viscosity. The product was filtered twice at about 70° C., followed by removal of solvent by rotary evaporation at 85° C. under high vacuum for 2 hr. TABLE 7 provides reaction components and the properties of the resulting H-EAO polyol.

TABLE 7

| Polyol | EOC (Me-EAO) $0\%^a$ | Reaction conditions | Scale | $OH^\#$ | MW (g/mol) | Viscosity η @ 25° C., Pa·s | $T_m$ (° C.) | Appearance |
|---|---|---|---|---|---|---|---|---|
| H-EAO | <0.05 (4.9) | 15 h @110° C./ 120 psi, +2 h | 400 g | 154 | 364 | 70 | 70 | White solid |

TABLE 7-continued

| Polyol | EOC (Me-EAO) 0%[a] | Reaction conditions | Scale | OH[#] | MW (g/mol) | Viscosity η @ 25° C., Pa·s | $T_m$ (° C.) | Appearance |
|---|---|---|---|---|---|---|---|---|
| | | @ 130° C./ 120 psi, +12 h @130° C./ 940 psi | | | | | | |

Example 4: Synthesis of a Polyether Diol of MW 1516 (Pe Diol-1516) from Methyl Esters of Epoxidized Algal Oil and 1,3-Propanediol A polyether diol was generated for use in PUD synthesis. The polyether diol was generated through the ring opening polymerization of epoxidized methyl esters of algal oil catalyzed by tris(pentafluorophenyl)borane (B($C_6F_5$)$_3$; BCF; MW=511.98 g/mol), 1,3-propanediol (1,3-PDO; MW=76.09 g/mol), and toluene (MW=92.14 g/mol). BCF, 1,3-PDO, and toluene were purchased from Sigma-Aldrich. EAO was prepared as outlined in EXAMPLE 1 and had an epoxy oxygen content (EOC) of 4.8%. Methyl esters of EAO were prepared as described for the preparation of methyl esters of ethanol ring opened epoxidized algal oil (Me-Et-EAO) in EXAMPLE 2. Methyl esters of EAO (Me-EAO) and 1,3-PDO were used at a 6:1 molar ratio in the synthesis of the polyether diol as outlined below. 1,3-PDO (0.105 mol) was charged into a 250-mL flask equipped with a magnetic stirrer, a nitrogen inlet, and a dropping funnel. The reaction was bubbled for 15 min with $N_2$. Next, 0.1 wt % BCF in toluene (3 mL) was added. After 2 min, 0.64 mol Me-EAO was added dropwise to the flask over 50 min. After 3 hr, the reaction was quenched with the addition of water. The resulting product was washed with an equal volume of water 3×, and then dried on a rotary evaporator under high vacuum at 80° C. for 2 hr. TABLE 8 provides reaction components and the physical properties of the resulting polyether diol.

TABLE 8

| Polyol | Molar ratio [Me-EAO]:[PDO] | EOC (Me-EAO) %[a] | Reaction conditions | Scale | OH[#] | MW (g/mol) | Viscosity η @ 25° C., Pa·s | Appearance |
|---|---|---|---|---|---|---|---|---|
| Pe Diol-1516 | 6:1 | 4.8 | 2 h @ 80 °C. | 200 g | 74 | 1516 | 0.58 | Yellow |

Example 5: Preparation of Various Algal Oil Derived PUDs

An algal oil polyol (AOP) of MW~1058; OH #=159 mg KOH/g was prepared as outlined for Polyol 2 in EXAMPLE 1. Isophorone diisocyanate (IPDI) (98%) was from Acros Organics. MW=222.28 g/mol; NCO, content wt %=37.8. Desmodur W, Dicyclohexylmethane diisocyanate (HMDI) was from Bayer, MW=262.35 g/mol; NCO content wt %=31.8. N-methyldiethanolamine (MDEA), ≥99% was from Sigma-Aldrich; MW=119.2 g/mol. Ethylene diamine (EDA), >99% was from Sigma-Aldrich, MW=60.1 g/mol. Methyl ethyl ketone (MEK) (MW=72.11 g/mol), acetone (MW=58.08 g/mol), and glacial acetic acid (≥99.8%, MW=60.05 g/mol) were from Fischer Scientific. Dibutyltin dilaurate (DBTL) was from TCI Chemicals Laboratory. Beeswax, carnauba wax, and kokum butter were from Essential Wholesale and Labs. FIG. 5 illustrates various types of polyols described herein that can be used to generate PUDs as detailed in the following examples. Polyester diols (i.e., macrodiols having a molecular weight (MW) of 800-2000 can be used to produce high molecular weight (HMW) macrodiol PUDs, low molecular weight (LMW) macrodiol PUDs, HMW macrodiol PUDs with additive (e.g., waxes), and LMW macrodiol PUDs with BHECA. Polyether diols can be used to produce polyether waterborne PUDs (WPU) such as Pe Diol-1516 as described in EXAMPLE 4 and EXAMPLE 15. Hydrogenated epoxidized algal oil polyols and epoxidized algal oil polyols can also be used to produce WPU, optionally incorporating waxes or fats. In some cases, these resulting WPU may be combined to produced co-polymer PUDs.

Example 6: Preparation of a Waterborne PUD Encapsulating a Fat (2% Kokum Butter) Based on AOP In this synthesis, the molar ratio of OH groups of AOP:MDEA:IPDI was 1:0.95:2. AOP, prepared as outlined for Polyol 2 in EXAMPLE 1. IPDI, MDEA, and molten kokum butter (>70° C., 2.0 wt % total reactants) were charged to a 1000-mL three-necked flask equipped with a mechanical stirrer, a condenser, a nitrogen supply, and a thermometer. The reaction was heated to 80° C. with stirring (1000-1200 rpm) and bubbled with $N_2$. Next, DBTL at 0.1 wt % was added along with 25 g of MEK to reduce viscosity. The amount of MEK was adjusted depending on the developing viscosity of the mixture and its tendency to gel. The reaction was mixed at 1000-1200 rpm for an additional 120 min. The viscosity of the mixture was monitored over time. If viscosity began to increase, additional MEK was slowly added until the viscosity stabilized. After 2 hr, the reaction was cooled to room temperature and neutralized by the addition of acetic acid, in an equal molar amount to the MDEA used in the reaction. After neutralization for 30 min, 70-90 g distilled water (<1 MΩ) were added to emulsify the dispersion by mixing at 1000 rpm for an additional 120 min. MEK was removed from the dispersion under vacuum at 45° C. Polyurethane films were made by drying the dispersion in aluminum pans for 3 days at room temperature followed by drying for 3 days at 50° C. Physical properties of the films are shown in TABLES 9A-9C.

Example 7: Preparation of a Waterborne PUD Encapsulating a Wax (6% Beeswax) Based on AOP In this synthesis, the molar ratio of OH groups of AOP:MDEA:IPDI was 1:1.2:2.3. AOP was prepared as outlined for Polyol 2 in EXAMPLE 1. AOP, IPDI, beeswax (6 wt % total reaction), and DBTL (0.07 wt %) were charged in a 1000-mL three-neck round bottom flask equipped with a mechanical stirrer, a reflux condenser, and a nitrogen supply. The reaction mixture was stirred at 80° C. for 30 min with $N_2$ sparging. After 25 min, 15 g MEK was added. MDEA was added with syringe and then an additional 15 g MEK was added over 5 min followed by an additional 60 g MEK. The reaction mixture was then stirred at 80° C. for an additional 150 min. After the reaction mixture was cooled to room temperature (for about 30 min), an additional 30 g MEK and acetic acid, in an equal molar amount to the MDEA used in the reaction, were added under stirring for 30 min. Finally, 285 g distilled water (<1 MΩ) was added for emulsification (5-6 min). The resulting dispersion was stirred for an additional 2 hr at 1060 rpm. MEK was removed from the dispersion under vacuum at 45° C. Polyurethane films were made by drying the dispersion in aluminum pans for 3 days at room temperature followed by drying for 3 days at 50° C. Physical properties of the films are shown in TABLES 9A-9C.

Example 8: Preparation of a Waterborne PUD Utilizing HMDI and AOP with Varying Hard Segment Contents In the first case, the molar ratio of OH groups used in the synthesis WPU-AOP-HMDI-1-S1 was AOP:MDEA:HMDI was 1:1:2.05. AOP was prepared as outlined for Polyol 2 in EXAMPLE 1. AOP, HMDI, and MDEA were charged to a 1000-mL three-necked flask equipped with a mechanical stirrer, a condenser, a nitrogen supply, and a thermometer. The reaction was heated to 80° C. with stirring (1000-1200 rpm) and bubbled with $N_2$. Next, DBTL at 0.1 wt % was added along with 25 g of MEK to reduce viscosity. The amount of MEK added was adjusted depending on the developing viscosity of the mixture and its tendency to gel. The reaction was mixed at 1000-1200 rpm for an additional 120 min. The viscosity of the mixture was monitored over time. If viscosity began to increase, additional MEK was slowly added until the viscosity stabilized. After 2 hr, the reaction was cooled to room temperature and neutralized by the addition of acetic acid, in an equal molar amount to the MDEA used in the reaction. After neutralization for 30 min, 70-90 g distilled water (<1 MΩ) were added to emulsify the dispersion by mixing at 1000 rpm for an additional 120 min. MEK was removed from the dispersion under vacuum at 45° C. Physical properties of the films are shown in TABLES 9A-9C.

In the second case, the molar ratio of OH groups used in the synthesis WPU-AOP-HMDI-2-S1 was AOP:MDEA:HMDI was 1:1.05:2.1. AOP was prepared as outlined for Polyol 2 in EXAMPLE 1. AOP, HMDI, and MDEA were charged to a 1000-mL three-necked flask equipped with a mechanical stirrer, a condenser, a nitrogen supply, and a thermometer. The reaction was heated to 80° C. with stirring (1000-1200 rpm) and bubbled with $N_2$. Next, DBTL at 0.1 wt % was added along with 25 g of MEK to reduce viscosity. The amount of MEK was adjusted depending on the developing viscosity of the mixture and its tendency to gel. The reaction was mixed at 1000-1200 rpm for an additional 120 min. The viscosity of the mixture was monitored over time. If viscosity began to increase, additional MEK was slowly added until the viscosity stabilized. After 2 hr, the reaction was cooled to room temperature and neutralized by the addition of acetic acid, in an equal molar amount to the MDEA used in the reaction. After neutralization for 30 min, 70-90 g distilled water (<1 MΩ) were added to emulsify the dispersion by mixing at 1000 rpm for an additional 120 min. MEK was removed from the dispersion under vacuum at 45° C. Physical properties of the films are shown in TABLES 9A-9C.

In the third case, the molar ratio of OH groups used in the synthesis WPU-AOP-HMDI-3-S1 was AOP:MDEA:HMDI was 1:0.9:1.95. AOP was prepared as outlined for Polyol 2 in EXAMPLE 1. AOP, HMDI, and MDEA were charged to a 1000-mL three-necked flask equipped with a mechanical stirrer, a condenser, a nitrogen supply, and a thermometer. The reaction was heated to 80° C. with stirring (1000-1200 rpm) and bubbled with $N_2$. Next, DBTL at 0.1 wt % was added along with 25 g of MEK to reduce viscosity. The amount of MEK was adjusted depending on the developing viscosity of the mixture and its tendency to gel. The reaction was mixed at 1000-1200 rpm for an additional 120 min. The viscosity of the mixture was monitored over time. If viscosity began to increase, additional MEK was slowly added until the viscosity stabilized. After 2 hr, the reaction was cooled to room temperature and neutralized by the addition of acetic acid, in an equal molar amount to the MDEA used in the reaction. After neutralization for 30 min, 70-90 g distilled water (<1 MΩ) were added to emulsify the dispersion by mixing at 1000 rpm for an additional 120 min. MEK was removed from the dispersion under vacuum at 45° C. Physical properties of the films are shown in TABLES 9A-9C.

In the fourth case, the molar ratio of OH groups used in the synthesis WPU-AOP-HMDI-4-S1 was AOP:MDEA:HMDI was 1:1.15:2.2. AOP was prepared as outlined for Polyol 2 in EXAMPLE 1. AOP, HMDI, and MDEA were charged to a 1000-mL three-necked flask equipped with a mechanical stirrer, a condenser, a nitrogen supply, and a thermometer. The reaction was heated to 80° C. with stirring (1000-1200 rpm) and bubbled with $N_2$. Next, DBTL at 0.1 wt % was added along with 25 g of MEK to reduce viscosity. The amount of MEK was adjusted depending on the developing viscosity of the mixture and its tendency to gel. The reaction was mixed at 1000-1200 rpm for an additional 120 min. The viscosity of the mixture was monitored over time. If viscosity began to increase, additional MEK was slowly added until the viscosity stabilized. After 2 hr, the reaction was cooled to room temperature and neutralized by the addition of acetic acid, in an equal molar amount to the MDEA used in the reaction. After neutralization for 30 min, 70-90 g distilled water (<1 MΩ) were added to emulsify the dispersion by mixing at 1000 rpm for an additional 120 min. MEK was removed from the dispersion under vacuum at 45° C. Polyurethane films were made by drying the dispersion in aluminum pans for 3 days at room temperature followed by drying for 3 days at 50° C. Physical properties of the films are shown in TABLES 9A-9C. The incorporation of HMDI improved water resistance (i.e., reduced water absorption) of the resulting PUDs

Example 9: Preparation of a Waterborne PUD Encapsulating a Wax (7% Beeswax)

Polyester diol of MW 1675 was prepared as outlined in EXAMPLE 2. The molar ratio of OH groups from polyester diol and MDEA to amine groups on EDA and isocyanate groups on IPDI were 0.90:2.1:0.3:3.5, respectively. Polyester diol, IPDI, DBTL, and molten beeswax (>80° C.) were charged in a 2-L, three-neck round bottom flask equipped with a mechanical stirrer, a reflux condenser, and a sparger with $N_2$. The reaction mixture was stirred at 80° C. for 2 hr with $N_2$ sparging. Then, MDEA was added into reaction mixture. The reaction continued for 2 hr. MEK was then added in intervals to reduce viscosity and prevent gelation. After the reaction mixture was cooled to room temperature, a final aliquot of MEK sufficient to maintain the viscosity and prevent gelling was added. The solution was then neutralized by the addition of acetic acid, in an equal molar amount to the MDEA used in the reaction, followed by stirring for 30 min. Next, distilled water (<1 MΩ) was added for emulsification and EDA solution in water was added to complete the chain extension, followed by vigorous stirring (1000-1200 rpm) for 2 hr. MEK was then removed from the dispersion under vacuum at 45° C. Polyurethane films were made by drying the dispersion in aluminum pans for 3 days at room temperature followed by drying for 3 days at 50° C. Physical properties of the films are shown in TABLES 9A-9C.

Example 10: Preparation of a Waterborne PUD Encapsulating a Fat (2% Kokum Butter)

Polyester diol of MW 1745 was prepared as outlined in EXAMPLE 2. The molar ratio of OH groups from polyester diol and MDEA to amine groups on EDA and isocyanate groups on IPDI were 0.90:2.1:0.3:3.5, respectively. Polyester diol, IPDI, DBTL, and molten kokum butter (>70° C.) were charged in a 2-L, three-neck round bottom flask equipped with a mechanical stirrer, a reflux condenser, and a sparger with $N_2$. The reaction mixture was stirred at 80° C. for 2 hr with $N_2$ sparging. Then, MDEA was added into reaction mixture. The reaction continued for 2 hr. MEK was added in intervals to reduce viscosity and prevent gelation. After the reaction mixture was cooled to room temperature, a final aliquot of MEK sufficient to maintain the viscosity and prevent gelation was added. The solution was then neutralized by the addition of acetic acid, in an equal molar amount to the MDEA used in the reaction, followed by stirring for 30 min. Next, distilled water (<1 MΩ) was added for emulsification and EDA solution in water was added to complete the chain extension, followed by vigorous stirring (1000-1200 rpm) for 2 hr. MEK was then removed from the dispersion under vacuum at 45° C. Polyurethane films were made by drying the dispersion in aluminum pans for 3 days at room temperature followed by drying for 3 days at 50° C. Physical properties of the films are shown in TABLES 9A-9C.

Example 11: Preparation of a Waterborne PUD Encapsulating a Wax (2% Carnauba Wax)

Polyester diol of MW 1745 was prepared as outlined in EXAMPLE 2. The molar ratio of OH groups from polyester diol and MDEA to amine groups on EDA and isocyanate groups on IPDI were 0.90:2.1:0.3:3.5, respectively in this synthesis. Polyester diol, IPDI, DBTL, and molten carnauba wax (>80° C.) were charged in a 2-L three-neck round bottom flask equipped with a mechanical stirrer, a reflux condenser, and a sparger with $N_2$. The reaction mixture was stirred at 80° C. for 2 hr with $N_2$ sparging. Then, MDEA was added into reaction mixture. The reaction continued for 2 hr. MEK was then added in intervals to reduce viscosity and prevent gelation. After the reaction mixture was cooled to room temperature, a final aliquot of MEK sufficient to maintain the viscosity and prevent gelling was added. The solution was then neutralized by the addition of acetic acid, in an equal molar amount to the MDEA used in the reaction, followed by stirring for 30 min. Next, distilled water (<1 MΩ) was added for emulsification and EDA solution in water was added to complete the chain extension, followed by vigorous stirring (1000-1200 rpm) for 2 hr. MEK was then removed from the dispersion under vacuum at 45° C. Polyurethane films were made by drying the dispersion in aluminum pans for 3 days at room temperature followed by drying for 3 days at 50° C. Physical properties of the films are shown in TABLES 9A-9C.

Example 12: Preparation of a Waterborne PUD Encapsulating a Wax (2% Beeswax)

Polyester diol of MW 1745 was prepared as outlined in EXAMPLE 2. The molar ratio of OH groups from polyester diol and MDEA to amine groups on EDA and isocyanate groups on IPDI were 0.90:2.1:0.3:3.5, respectively. Polyester diol, IPDI, DBTL, and molten beeswax (>80° C.) were charged in a 2-L, three-neck round bottom flask equipped with a mechanical stirrer, a reflux condenser, and a sparger with $N_2$. The reaction mixture was stirred at 80° C. for 2 hr with $N_2$ sparging. Then, MDEA was added into reaction mixture. The reaction continued for 2 hr. MEK was then added in intervals to reduce viscosity and prevent gelation. After the reaction mixture was cooled to room temperature, a final aliquot of MEK sufficient to maintain the viscosity and prevent gelling was added. The solution was then neutralized by the addition of acetic acid, in an equal molar amount to the MDEA used in the reaction, followed by stirring for 30 min. Next, distilled water (<1 MΩ) was added for emulsification and EDA solution in water was added to complete the chain extension, followed by vigorous stirring (1000-1200 rpm) for 2 hr. MEK was then removed from the dispersion under vacuum at 45° C. Polyurethane films were made by drying the dispersion in aluminum pans for 3 days at room temperature followed by drying for 3 days at 50° C. Physical properties of the films are shown in TABLES 9A-9C.

Example 13: Preparation of a Waterborne PUD Utilizing IPDI and a Macrodiol of MW 2065 Encapsulating a Wax (2% Carnauba Wax)

Polyester diol of MW 2065 was prepared as outlined in EXAMPLE 2. The molar ratio of OH groups from polyester diol and MDEA to amine groups on EDA and isocyanate groups on IPDI were 0.75:2.25:0.3:3.66, respectively. Polyester diol, IPDI, DBTL, and molten Carnauba wax (>80° C.) were charged in a 2-L, three-neck round bottom flask equipped with a mechanical stirrer, a reflux condenser, and a sparger with $N_2$. The reaction mixture was stirred at 80° C. for 2 hr with $N_2$ sparging. Then, MDEA was added into reaction mixture. The reaction continued for 2 hr. MEK was then added in intervals to reduce viscosity and prevent gelation. After the reaction mixture was cooled to room temperature, a final aliquot of MEK sufficient to maintain the viscosity and prevent gelling was added. The solution was then neutralized by the addition of acetic acid, in an equal molar amount to the MDEA used in the reaction, followed by stirring for 30 min. Next, distilled water (<1 MΩ) was added for emulsification and EDA solution in water was added to complete the chain extension, followed by vigorous stirring (1000-1200 rpm) for 2 hr. MEK was then removed from the dispersion under vacuum at 45° C. Polyurethane films were made by drying the dispersion in aluminum pans for 3 days at room temperature followed by drying for 3 days at 50° C. Physical properties of the films are shown in TABLES 9A-9C.

Example 14: Preparation of a Waterborne PUD Utilizing Hydrogenated Algal Oil Polyol (H-EAO)

A PUD formulation was prepared utilizing the H-EAO polyol prepared as described in EXAMPLE 3. The molar ratio of OH groups from H-EAO and MDEA to isocyanate groups on IPDI were 1:0.95:2, respectively. Briefly, the polyol was charged in a 2-L, three-neck round bottom flask equipped with a mechanical stirrer, a reflux condenser, and a nitrogen supply. The flask was heated with a heater and temperature controlled at 80° C. After the polyol was melted, MDEA was added followed by bubbling with $N_2$ for 15 min. Next, IPDI and DBTL catalyst (0.06 wt %) were added. The reaction mixture was then stirred (400 rpm) at 70-80° C. and MEK was added at intervals depending on the viscosity. After 65 min, heating was stopped and additional MEK was added for a total of 220 mL. After the reaction mixture was cooled to room temperature, acetic acid, in an equal molar amount to the MDEA used in the reaction, was added as neutralizer under stirring for 30 min. Next, 530 g distilled water (<1 MΩ) was added for emulsification under high agitation (1200 rpm) for 5 min followed by continued stirring at 1000 rpm for 2 hr. MEK was then removed on a rotary evaporator at 45° C. under low vacuum. Polyurethane films were made by drying the dispersion in aluminum pans for 3 days at room temperature followed by drying for 3 days at 50° C. Physical properties of the films are shown in TABLES 9A-9C.

Example 15: Preparation of a Waterborne PUD Utilizing a Polyether Diol (Pe-Diol-1516)

A PUD was prepared utilizing the polyether diol prepared as outlined in EXAMPLE 4. The molar ratio of OH groups from polyether diol and MDEA to amine groups on EDA and isocyanate groups on IPDI were 1:2:0.3:3.6, respectively. Diol, IPDI, and DBTDL (0.1 wt %) were charged in a 2-L three-neck round bottom flask equipped with a mechanical stirrer, a reflux condenser, and a nitrogen supply. The reaction mixture was stirred at 80° C. for 2 hr with $N_2$ sparging followed by the addition of MDEA. MEK was also added at intervals to reduce viscosity. The reaction mixture was then cooled to room temperature. Additional MEK was added to further reduce viscosity. Acetic acid, in an equal molar amount to the MDEA used in the reaction, was added as neutralizer under stirring for 30 min. After neutralization with acetic acid, distilled water was added for emulsification. Finally, EDA solution in water (<1 MΩ) was added and vigorously stirred for 2 hr at 720 rpm. MEK was evaporated at 45° C. for 2 hr under low vacuum. Polyurethane films were made by drying the dispersion in aluminum pans for 3 days at room temperature followed by drying for 3 days at 50° C. Physical properties of the films are shown in TABLES 9A-9C. Pe Diol-1516, polyether diol of MW 1516; Diol-1745, polyester diol of MW 1745; Diol-1675, polyester diol of MW 1675; Diol-2065, polyester diol of MW 2065; EAOP, epoxidized ring opened algal oil polyol; H-EAO, hydrogenated epoxidized algal oil polyol; NA, not available; NS, no sedimentation; LS, low sedimentation; HS wt %, hard segment weight %; $T_g$, glass transition temperature.

TABLE 9A

| Polyol | Mols | | | | MDEA, wt % | HS wt % | Additive (wt %) | Bio-based content in polymer, % | MDEA, wt % | Solids content, % | Viscosity, mPa · s |
| --- | --- | --- | --- | --- | --- | --- | --- | --- | --- | --- | --- |
| | Diol OH | MDEA OH | EDA NH2 | IPDI/ HMDI NCO | | | | | | | |
| Pe Diol- | 1 | 2 | 0.3 | 3.6 | 9.2 | 30.6 | NA | 56.3 | 9.2 | 24.1 | 5.73 |
| Diol-1745 | 0.8 | 2.2 | 0.3 | 3.5 | 10.3 | 34.6 | NA | 53.8 | 10.6 | 24.3 | 10.3 |
| Diol-1745 | 0.9 | 2.1 | 0.3 | 3.5 | 9.7 | 31.2 | Beeswax, 2.0 | 57.9 | 9.7 | 25.1 | 7.7 |
| Diol-1745 | 0.9 | 2.1 | 0.3 | 3.5 | 9.7 | 31.2 | Carnauba wax, | 57.9 | 9.7 | 25.2 | 9.04 |
| Diol-1745 | 0.9 | 2.1 | 0.3 | 3.5 | 9.7 | 31.2 | Kokum butter, | 57.9 | 9.7 | 25.4 | 8.02 |
| Diol-1675 | 0.8 | 2.2 | 0.3 | 3.65 | 10.5 | 35.5 | Beeswax, 7.0 | 53.9 | 10.5 | 24.1 | 36.8 |
| Diol-2065 | 0.75 | 2.25 | 0.3 | 3.66 | 10.4 | 33.2 | Carnauba wax, | 56.5 | 10.4 | 25.7 | 6.82 |
| EAOP | 1 | 0.95 | NA | 2 | 9 | 44.2 | Kokum butter, | 53.5 | 9 | 24.4 | 4.82 |
| EAOP | 1 | 1.2 | NA | 2.3 | 10.6 | 50.3 | Beeswax, 6.0 | 55.6 | 10.3 | 24.7 | 10.4 |
| EAOP | 1 | 1 | NA | 2.05 (HMDI) | 8.8 | 48.2 | NA | 49.6 | 8.8 | 24.2 | 4.96 |
| EAOP | 1 | 1.05 | NA | 2.1 (HMDI) | 9.1 | 48.9 | NA | 48.8 | 9.1 | 25.6 | 5.48 |
| EAOP | 1 | 0.9 | NA | 1.95 (HMDI) | 8.1 | 46.7 | NA | 51.2 | 8.1 | 24.6 | 4.39 |
| EAOP | 1 | 1.15 | NA | 2.2 (HMDI) | 9.7 | 50.3 | NA | 47.4 | 9.7 | 24.8 | 5.21 |
| H-EAO | 1 | 0.95 | NA | 2 | 8.8 | 45.8 | NA | 54.2 | 8.8 | 22 | 8 |

TABLE 9B

| Polyol | Additive (wt %) | pH | Appearance | Stability | Particle size, nm (PDI) | $M_n$ | $M_w$ | $M_{peak}$ | $M_w/M_n$ |
|---|---|---|---|---|---|---|---|---|---|
| Pe Diol-1516 | NA | 5 | Milky white | NS | 158 (0.391) | Insoluble in THF | | | |
| Diol-1745 | NA | 6 | Creamy | NS | 114 (0.396) | 17001 | 76745 | 24495 | 4.51 |
| Diol-1745 | Beeswax, 2.0 | 6 | Creamy | LS | 113 (0.384) | Insoluble in THF | | | |
| Diol-1745 | Carnauba wax, 2.0 | 6 | Creamy | LS | 152 (0.439) | Insoluble in THF | | | |
| Diol-1745 | Kokum butter, 2.0 | 6 | Milky white | LS | 161 (0.421) | Insoluble in THF | | | |
| Diol-1675 | Beeswax, 7.0 | 6 | Beige and milky | LS | 453 (0.805) | Insoluble in THF | | | |
| Diol-2065 | Carnauba wax, 2.0 | 6 | Milky white | LS | 203 (0.494) | Insoluble in THF | | | |
| EAOP | Kokum butter, 2.0 | 5 | Translucent white | NS | 105 (0.112) | Insoluble in THF | | | |
| EAOP | Beeswax, 6.0 | 5.4 | White and milky | NS | 183 (0.258) | Insoluble in THF | | | |
| EAOP | NA | 5 | Translucent white | NS | 84 (0.183) | Insoluble in THF | | | |
| EAOP | NA | 5 | Translucent white | NS | 74 (0.179) | Insoluble in THF | | | |
| EAOP | NA | 5 | Translucent white | LS | 99 (0.115) | Insoluble in THF | | | |
| EAOP | NA | 5 | Translucent yellowish | NS | 58 (0.093) | Insoluble in THF | | | |
| H-EAO | NA | 5 | Translucent white | NS | 70 (0.127) | Insoluble in THF | | | |

TABLE 9C

| Polyol | Additive (wt %) | Contact angle ($\theta_w$), deg | Water absorption, % | Hard segments, % | $T_g$ DSC °C. | Tensile strength, MPa | Elongation at break, % |
|---|---|---|---|---|---|---|---|
| Pe Diol-1516 | NA | 101 ± 5.0 | 4.1 | 30.6 | 12 | 4.84 | 294 |
| Diol-1745 | NA | 93 ± 4.3 | 9.8 | 34.6 | −35; +10 | 4.73 | 485 |
| Diol-1745 | Beeswax, 2.0 | 102 ± 8.0 | 3.2 | 31.2 | −39 | 1.23 | 550 |
| Diol-1745 | Carnauba wax, 2.0 | 100 ± 4.9 | 5.4 | 31.2 | −35 | 2.14 | 470 |
| Diol-1745 | Kokum butter, 2.0 | 104 ± 5.5 | 5.2 | 31.2 | −39 | 1.79 | 531 |
| Diol-1675 | Beeswax, 7.0 | 106 ± 2.4 | 2.4 | 35.5 | −40 | 1.6 | 425 |
| Diol-2065 | Carnauba wax, 2.0 | 98 + 2.6 | 4.3 | 33.2 | −39 | 4.03 | 321 |
| EAOP | Kokum butter, 2.0 | 102 ± 5.1 | 2.3 | 44.2 | 4 | 7.4 | 259 |
| EAOP | Beeswax, 6.0 | 109 ± 3.5 | 2.2 | 50.3 | 14 | 5.6 | 217 |
| EAOP | NA | 91 ± 5.7 | 1.8 | 48.2 | 14 | 24.9 | 213 |
| EAOP | NA | 92 ± 3.2 | 1.8 | 48.9 | 15 | 27.7 | 292 |
| EAOP | NA | 95 ± 3.5 | 1.3 | 46.7 | 15 | 25.7 | 194 |
| EAOP | NA | 92 ± 3.6 | 1.7 | 50.3 | 16 | 41.6 | 194 |
| H-EAO | NA | 108 ± 2 | 2 | 45.8 | 12.3 | 3.6 | 436 |

Example 16: Application of PUDs onto Textiles

For each of the cationic waterborne PUDs of EXAMPLE 6-15, a bath was prepared by diluting each PUD formulation 10-fold to approximately 2-3% solids in water. Swatches of different fabric types including cotton, polyester, and polyamide-LycraR® were individually immersed in the PUD bath. Excess fluid was removed using a roller system. The resulting deposition left behind about 3-4% solids (wt polymer/wt fabric). Fabric was dried in a stenter machine and the temperature was increased from 80° C. to 150° C. After drying, various properties of the coated fabric swatches were assessed, including water repellency, abrasion resistance, and tear strength.

Example 17: Characterization of PUDs and Textiles Applied Thereto

FT-IR. The FT-IR spectra of the WPU films were recorded on ATR Perkin Elmer Spectrum Two, over the range 500-4000 cm$^{-1}$. The progress of the polyaddition reaction was followed using FTIR IRaffinity-1, Shimadzu.

Stability. The stability of WPU dispersions was evaluated by centrifugation at 3000 r/min on a Centrific Centrifuge (Fisher Scientific) at room temperature.

Solids Content. The solids content (SC) of WPUs was determined gravimetrically. A WPU sample of about 2 g was placed in an aluminum tray and dried in an air oven under temperature of 120° C. for 2 hr. The solids content is calculated as average of two samples for each WPU dispersion.

Viscosity. The viscosity of WPU dispersions was measured with an advanced rheometer (AR 2000 ex, TA Instruments) by using cone and plate geometry at temperature of 25° C. in the range of shear rates of 0.1 to 200 l/s.

Particle Size Distribution. The particle size distribution of WPU dispersions was measured on Zeta-sizer (Malvern instruments Nano-ZS90). Approximately 10 μL of the WPU dispersions was diluted with 990 μL distilled water before testing.

Zeta Potential. The zeta potential is the electric potential difference between the liquid adhering to a dispersed particle and the fluid surrounding the particle. The zeta potential can be used to characterize the stability of a PUD.

Pick-up Percentage. The amount of a PUD film on a textile can also be characterized by pick-up percentage, which refers to the amount of PUD picked up by the textile during application of the PUD. A PUD having a known solids content, is applied to a tared textile sample. After application of the PUD, the wet textile sample is then weighed. The pick-up percentage is the increase in weight, on a percentage basis, of the textile sample when dry.

Solids content on fabric. The solids content on fabric on a percentage basis was calculated based on the solids content of a PUD applied to a textile. The difference between the tared textile weight (dry) and the wet weight after PUD application is used to determine the wet weight of PUD on the textile. The solids content on fabric can therefore be used to calculate the actual solids content on fabric.

Water absorption. The water absorption of WPU films was determined gravimetrically. Round-shaped film samples (θ, 1 cm) were dried at 50° C. for 2 hr before testing. The WPU films of known weight ($m_0$) were immersed in a distilled water at room temperature for 24 hr. Then, the samples were wiped with paper and weighted (ml). An average value of five measurements was used for each sample. The percentage of water absorption (WA) was calculated as follows: $WA=(m_1-m_0)/m_0 \times 100$.

Water Contact Angle. The contact angle of water droplets on WPU films was measured by a custom-built instrument. Water contact angle (θ) was read from projected image of the water droplet (volume, 10 μL) placed on the film, by using Image J program. All the samples were dried at 50° C. at least 8 hr before testing.

Differential Scanning Calorimetry. Differential scanning calorimetry (DSC) was carried out on a thermal analyzer (TA Instruments, DSC Q100) in nitrogen atmosphere (flow rate 50 mL/min). The samples were cooled to −80° C., then heated to +120° C. with heating rate of 10° C./min (I run) to erase thermal history. Then, the samples were cooled to −80° C. with cooling rate of 10° C./min, and heated again to +120° C. with heating rate of 10° C./min (II run). The glass transition temperature ($T_g$) was determined from the second run as the midpoint temperature in heat capacity change. Samples were cut from polymer films (weight of around 10-12 mg). Molar enthalpy ($\Delta H_m$) was determined by dividing the enthalpy or change in enthalpy by the number of moles.

Mechanical Characterization. The mechanical properties of the WPU films were analyzed by using an Instron universal testing machine (model 3367) with crosshead speed of 50 mm/min. Rectangular samples of 60×8 mm$^2$ (length×width) were used. An average value of four replicates of each sample was taken.

The dynamic mechanical analysis of the WPU films was carried out using a dynamic mechanical analyzer (TA Instruments, DMA Q800-2602) with tensile mode at 1 Hz and heating rate of 3° C./min in the temperature range from −100 to 150° C. The glass transition temperature ($T_g$) of the films was obtained from peaks of the tan δ and E" curves.

Spray Rating. The assessment of spray rating was determined by comparing the appearance of the tested specimen with descriptive standards and photographs to evaluate the ability of the WPU film treated textiles to repel water. Samples can be rated according to a Standard Spray Test Rating Chart:

100—No sticking or wetting of upper surface;
90—Slight random sticking or wetting of upper surface;
80—Wetting of upper surface at spray points;
70—Partial wetting of whole of upper surface;
50—Complete wetting of whole of upper surface; and
0—Complete wetting of whole upper and lower surfaces.

Example 18: Preparation of an Anionic Waterborne PUD Encapsulating 25 wt % Beeswax Based on AOP In this synthesis, the molar ratio of functional groups (isocyanate groups from IPDI/hydroxyl groups from AOP/hydroxyl groups from DMPA) was 1.575:1:0.5. The polyol AOP, prepared as outline for Polyol 2 in EXAMPLE 1 (15.85 g), DMPA, and beeswax (25 wt %, total reactants) were charged in a 500-mL three-neck round bottom flask equipped with a mechanical stirrer, a reflux condenser, a thermometer, and a nitrogen inlet. Bis(hydroxymethyl)propionic acid (DMPA), 98% was from Acros Organics, MW=134.13 g/mol. The reaction mixture was heated and stirred at 350 rp) at 80-85° C. (oil bath), then IPDI and one drop of catalyst (DBTDL)/1 mL MEK were injected. The reaction was carried out for 4 h, and 30 g MEK was added in portions to reduce the viscosity of the reaction mixture. Then, the reaction mixture was cooled to 45-47° C. and neutralized by the addition of triethylamine (TEA) (1.5 equiv. per DMPA) with stirring for 60 minutes. Triethylamine (TEA), 99% was from Acros, MW=101.19 g/mol. Finally, 145 g distilled water was slowly added (10 min) into the polymer solution under high stirring (500-1000 rpm) to emulsify the dispersion. Then, the dispersion was stirred for an additional 2 h at 1100-1200 rpm. The anionic waterborne PU dispersions with a solids content of 20 wt % was obtained after removal of the MEK under vacuum at 40° C. In addition, AWPU was cast in a Teflon mold (2 days, room temperature; 4 days in an oven at 70° C.) to obtain the corresponding PU film.

TABLE 10 outlines basic formulations for synthesis of anionic AWPU-AOP/beeswax dispersions using the method outlined above, but with varying amounts of beeswax. All polymerizations were catalyzed with 0.1 wt % of DBTDL. AOP, algal oil polyol; AOP OH, hydroxyl groups from AOP;

DMPA OH, hydroxyl groups from DMPA; IPDI NCO, isocyanate groups from IPDI; DMPA wt %, bis(hydroxymethyl)propionic acid weight %; HS wt %, hard segment weight %; additive wt %, wax/fat additive weight %.

TABLE 10

| Sample | Polyol, AOP | Mols AOP OH | DMPA OH | IPDI NCO | DMPA, wt % | HS, wt % | Additive, wt % |
|---|---|---|---|---|---|---|---|
| AWPU-AOP-3 (beeswax-12) | 48.3 | 1.0 | 0.70 | 1.785 | 8.0 | 44.0 | 12 |
| AWPU-AOP-3 (beeswax-15) | 46.6 | 1.0 | 0.70 | 1.785 | 8.0 | 44.0 | 15 |
| AWPU-AOP-3 (beeswax-20) | 43.6 | 1.0 | 0.70 | 1.785 | 8.0 | 44.0 | 20 |
| AWPU-AOP-4 (beeswax-15) | 48.7 | 1.0 | 0.6 | 1.65 | 7.0 | 41.8 | 15 |
| AWPU-AOP-4 (beeswax-20) | 45.4 | 1.0 | 0.6 | 1.68 | 7.0 | 41.8 | 20 |
| AWPU-AOP-5 (beeswax-20) | 47.2 | 1.0 | 0.5 | 1.575 | 6.0 | 40.9 | 20 |
| AWPU-AOP-5 (beeswax-25) | 44.1 | 1.0 | 0.5 | 1.575 | 6.0 | 40.9 | 25 |

TABLE 11 outlines basic formulations for synthesis of anionic AWPU-AOP-5/25 wt % beeswax dispersions using the method outlined above, but with varying amounts of TEA. All polymerizations were catalyzed With 0.1 wt % of DBTDL. AOP, algal oil polyol; AOP OH, hydroxyl groups from AOP; DMPA OH, hydroxyl groups from DMPA; IPDI NCO, isocyanate groups from IPDI; DMPA wt %, bis(hydroxymethyl)propionic acid weight %; HS wt %, hard segment weight %; TEA excess % triethylamine excess weight %.

TABLE 11

| Sample | Polyol, AOP | Mols AOP OH | DMPA OH | IPDI NCO | DMPA, wt % | HS, wt % | TEA, excess % |
|---|---|---|---|---|---|---|---|
| AWPU-AOP-5 (beeswax-25)-1 | 45.1 | 1.0 | 0.50 | 1.575 | 6.0 | 39.9 | 0 |
| AWPU-AOP-5 (beeswax-25)-2 | 44.6 | 1.0 | 0.50 | 1.575 | 6.0 | 39.9 | 25 |
| AWPU-AOP-5 (beeswax-25)-3 | 43.7 | 1.0 | 0.50 | 1.575 | 6.0 | 39.9 | 75 |
| AWPU-AOP-5 (beeswax-25)-4 | 43.2 | 1.0 | 0.50 | 1.575 | 6.0 | 39.9 | 100 |

TABLE 12 summarizes the properties of AWPU-AOP/beeswax dispersions having with varying amounts of beeswax. NS, no sedimentation.

TABLE 12

| Sample | Bio-based content in polymer, % | DMPA, wt % | Solids content, % | Viscosity, mPas | pH | Stability | Zeta potential, mV | Particle size, nm (PDI) |
|---|---|---|---|---|---|---|---|---|
| AWPU-AOP-3 (beeswax-12) | 60.3 | 6.4 | 17.8 | 38 | ~8 | NS | 74.1 ± 1.0 | 498 (1.0) |
| AWPU-AOP-3 (beeswax-15) | 61.6 | 6.2 | 18.1 | 24 | ~8 | NS | −60.0 ± 1.5 | 243 (0.256) |
| AWPU-AOP-3 (beeswax-20) | 63.6 | 5.8 | 16 | 188 | ~8 | NS | −66.1 ± 0.6 | 231 (0.298) |
| AWPU-AOP-4 (beeswax-15) | 63.7 | 5.6 | 18.8 | 31 | ~8 | NS | −67.6 ± 0.2 | 216 (0.271) |
| AWPU-AOP-4 (beeswax-20) | 65.4 | 5.2 | 18.0 | 228 | ~8 | NS | −64.8 ± 4.3 | 221 (0.357) |
| AWPU-AOP-5 (beeswax-20) | 67.2 | 4.5 | 18.6 | 665 | ~8 | NS | −80.3 ± 1.2 | 273 (0.069) |
| AWPU-AOP-5 (beeswax-25) | 69.1 | 4.2 | 18.6 | 445 | ~8 | NS | −74.3 ± 2.4 | 288 (0.499) |

TABLE 13 summarizes the properties of AWPU-AOP/25 wt % beeswax dispersions having varying amounts of TEA. NS, no sedimentation.

TABLE 13

| Sample | Bio-based content in polymer, % | DMPA, wt % | Solids content, % | Viscosity, mPas | pH | Stability | Zeta potential, mV | Particle size, nm (PDI) |
|---|---|---|---|---|---|---|---|---|
| AWPU-AOP-5 (beeswax-25)-1 | 70.1 | 4.3 | 19.1 | 10840 | ~8 | NS | −83.8 ± 0.7 | 252 (0.330) |
| AWPU-AOP-5 (beeswax-25)-2 | 69.6 | 4.2 | 19.4 | 3590 | ~8 | NS | −88.4 ± 4.1 | 489 (0.112) |
| AWPU-AOP-5 (beeswax-25)-3 | 68.7 | 4.2 | 18.7 | 124 | ~8 | NS | −71.4 ± 1.2 | 194 (0.396) |

TABLE 13-continued

| Sample | Bio-based content in polymer, % | DMPA, wt % | Solids content, % | Viscosity, mPas | pH | Stability | Zeta potential, mV | Particle size, nm (PDI) |
|---|---|---|---|---|---|---|---|---|
| AWPU-AOP-5 (beeswax-25)-4 | 68.2 | 4.1 | 18.8 | 160 | ~8 | NS | −67.6 ± 1.4 | 201 (0.371) |

TABLE 14 summarizes results of DSC analysis and some properties of anionic AWPU-AOP/beeswax films. $T_g$, glass transition temperature; $T_m$, melting temperature; $\Delta H_m$, molar enthalpy.

TABLE 14

| Sample | $T_g$, °C. | $T_m$, °C. | $\Delta H_m$, J/g | Contact angle ($\theta_w$), deg |
|---|---|---|---|---|
| AWPU-AOP-3 (beeswax-12) | 10 | 66 | 20.6 | 108.07 ± 1.9 |
| AWPU-AOP-3 (beeswax-15) | 5 | 64 | 22.8 | 108.2 ± 1.6 |
| AWPU-AOP-3 (beeswax-20) | 17 | 64 | 32.2 | 105.5 ± 2.2 |
| AWPU-AOP-4 (beeswax-15) | 5 | 64 | 22.8 | 106.1 ± 3.2 |
| AWPU-AOP-4 (beeswax-20) | 12 | 64 | 29.6 | 107.4 ± 1.1 |
| AWPU-AOP-5 (beeswax-20) | 19 | 65 | 31.5 | 105.6 ± 0.8 |
| AWPU-AOP-5 (beeswax-25) | 17 | 65 | 42.8 | 107.7 ± 0.8 |

TABLE 15 summarizes results of DSC analysis and some properties of anionic AWPU-AOP/25% beeswax films. $T_g$, glass transition temperature; $T_m$, melting temperature; $\Delta H_m$, molar enthalpy.

TABLE 15

| Sample | $T_g$, °C. | $T_m$, °C. | $\Delta H_m$, J/g | Contact angle ($\theta_w$), deg |
|---|---|---|---|---|
| AWPU-AOP-5 (beeswax-25)-1 | 17 | 65 | 43.5 | 105.5 ± 1.1 |
| AWPU-AOP-5 (beeswax-25)-2 | 17 | 64 | 33.6 | 106.7 ± 1.2 |
| AWPU-AOP-5 (beeswax-25)-3 | 16 | 65 | 44.2 | 105.6 ± 1.0 |
| AWPU-AOP-5 (beeswax-25)-4 | 16 | 65 | 44.4 | 106.4 ± 1.1 |

TABLE 16 summarizes spray rating of AWPU/beeswax coated fabrics. PA/elastane, poly amine/elastane.

TABLE 16

| | Textile | Pick-up, % | Solids content on fabric, % | Spray rating, grade | Water absorption, % |
|---|---|---|---|---|---|
| AWPU-AOP-3 (beeswax-12) | PA/elastane | 77.6 | 2.32 | 50 | 17.4 |
| AWPU-AOP-3 (beeswax-12) | cotton | 81.7 | 2.45 | 0 | 51.3 |
| AWPU-AOP-3 (beeswax-15) | PA/elastane | 76.8 | 2.30 | 50-70 | 14.4 |
| AWPU-AOP-3 (beeswax-15) | cotton | 75.8 | 2.27 | 0 | 31.9 |
| AWPU-AOP-3 (beeswax-20) | PA/elastane | 74.5 | 2.24 | 70 | 11.9 |
| AWPU-AOP-3 (beeswax-20) | cotton | 81.5 | 2.44 | 50 | 23.0 |
| AWPU-AOP-4 (beeswax-15) | PA/elastane | 78.4 | 2.35 | 70 | 10.7 |
| AWPU-AOP-4 (beeswax-15) | cotton | 78.9 | 2.37 | 50-70 | 14.9 |
| AWPU-AOP-4 (beeswax-20) | PA/elastane | 75.7 | 2.27 | 70 | 11.8 |
| AWPU-AOP-4 (beeswax-20) | cotton | 82.1 | 2.46 | 80 | 5.3 |
| AWPU-AOP-5 (beeswax-20) | PA/elastane | 75.4 | 2.26 | 70-80 | 8.3 |
| AWPU-AOP-5 (beeswax-20) | cotton | 77.9 | 2.34 | 50 | 20.7 |
| AWPU-AOP-5 (beeswax-25) | PA/elastane | 74.9 | 2.25 | 80 | 6.6 |
| AWPU-AOP-5 (beeswax-25) | cotton | 78.7 | 2.36 | 70 | 9.9 |

TABLE 17 summarizes spray rating of AWPU/25 wt % beeswax coated fabrics with varying amounts of TEA in excess. PA/elastane, polyamine/elastane.

TABLE 17

| | Textile | Pick-up, % | Solids content on fabric, % | Spray rating, grade | Water absorption, % |
|---|---|---|---|---|---|
| AWPU-AOP-5 (beeswax-25)-1 | PA/elastane | 70.3 | 2.11 | 70 | 11.1 |
| AWPU-AOP-5 (beeswax-25)-1 | cotton | 81.6 | 2.44 | 50 | 23.7 |
| AWPU-AOP-5 (beeswax-25)-2 | PA/elastane | 76.4 | 2.29 | 70 | 11.7 |
| AWPU-AOP-5 (beeswax-25)-2 | cotton | 87.5 | 2.32 | 70 | 12.7 |
| AWPU-AOP-5 (beeswax-25)-3 | PA/elastane | 74.2 | 2.22 | 80 | 7.3 |
| AWPU-AOP-5 (beeswax-25)-3 | cotton | 73.2 | 2.20 | 50 | 17.3 |
| AWPU-AOP-5 (beeswax-25)-4 | PA/elastane | 73.9 | 2.22 | 80 | 8.1 |
| AWPU-AOP-5 (beeswax-25)-4 | cotton | 81.1 | 2.43 | 80 | 6.7 |

Figure 6:
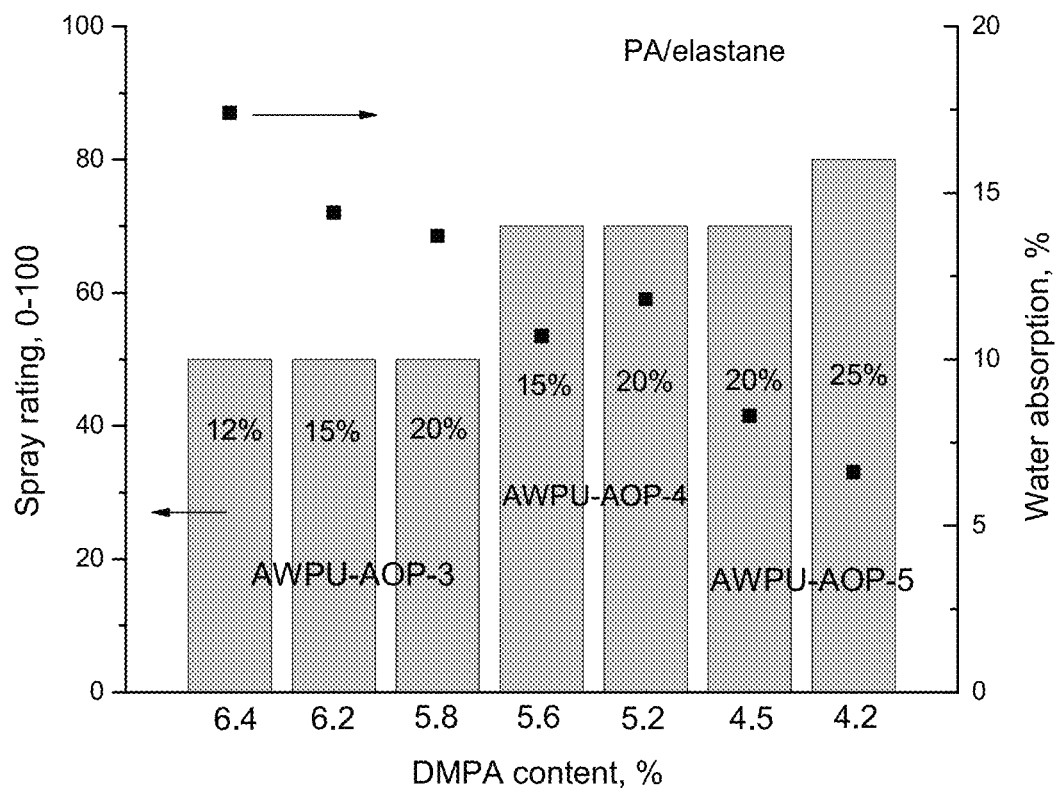
FIG. 6 illustrates water repellency of PA/elastane fabric impregnated with different AWPU/beeswax dispersions, according to spray rating (bars) and water absorption (black squares).
Figure 7:
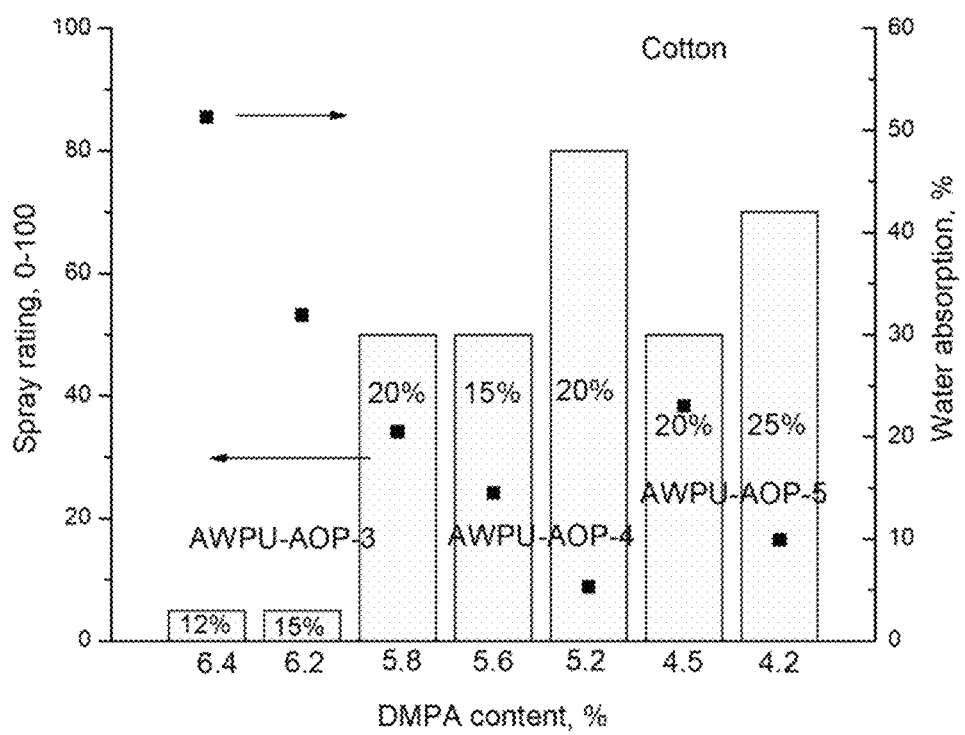
FIG. 7 illustrates water repellency of cotton fabric impregnated with different AWPU/beeswax dispersions, according to spray rating (bars) and water absorption (black squares).

FIG. 6 graphically depicts water repellency of PA/elastane fabric impregnated with different AWPU/beeswax dispersions, according to spray rating (bars) and water absorption (black squares). FIG. 7 graphically depicts water repellency of cotton fabric impregnated with different AWPU/beeswax dispersions, according to spray rating (bars) and water absorption (black squares).

Figure 8:
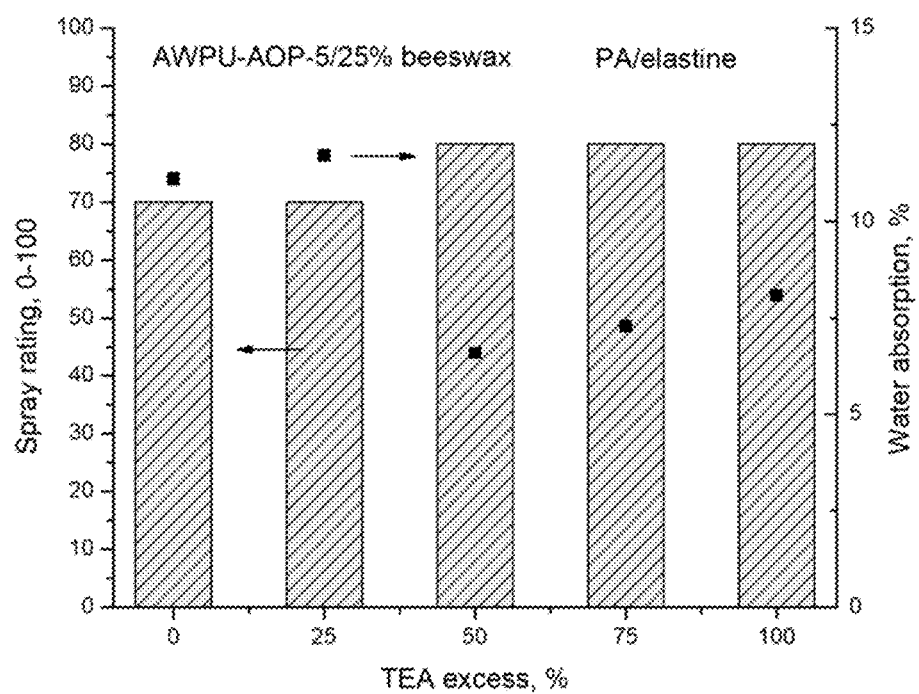
FIG. 8 illustrates water repellency of PA/elastane fabric impregnated with AWPU-AOP-5/25 wt % beeswax dispersions with varying amounts of TEA in excess, according to spray rating (bars) and water absorption (black squares).
Figure 9:
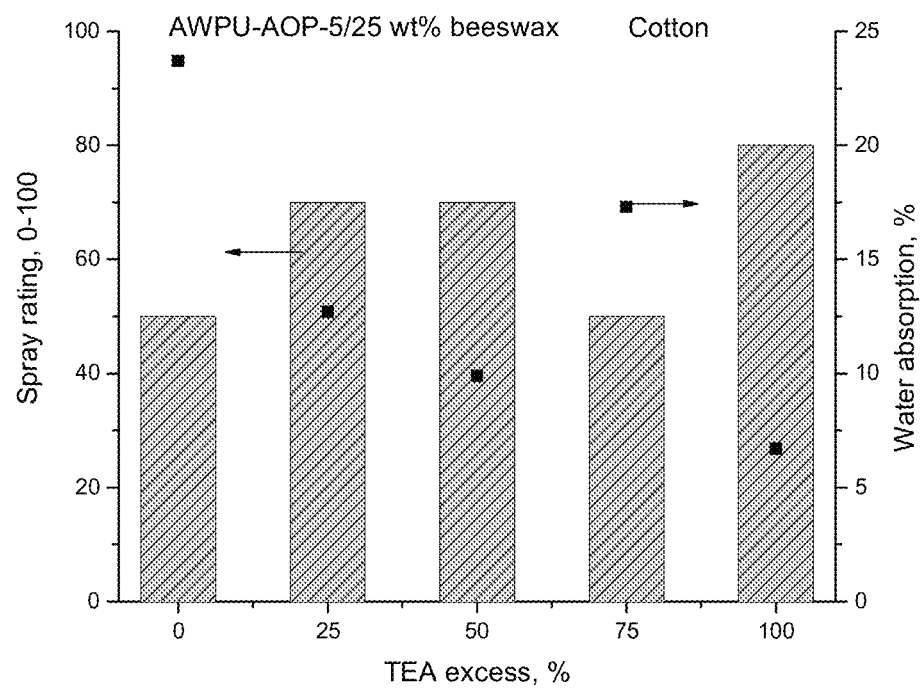
FIG. 9 illustrates water repellency of cotton fabric impregnated with AWPU-AOP-5/25 wt % beeswax dispersions with varying amounts of TEA in excess, according to spray rating (bars) and water absorption (black squares).

FIG. 8 graphically depicts water repellency of PA/elastane fabric impregnated with AWPU-AOP-5/25 wt % beeswax dispersions with varying amounts of TEA in excess, according to spray rating (bars) and water absorption (black squares). FIG. 9 graphically depicts water repellency of cotton fabric impregnated with AWPU-AOP-5/25 wt % beeswax dispersions with varying amounts of TEA in excess, according to spray rating (bars) and water absorption (black squares).

Figure 10:
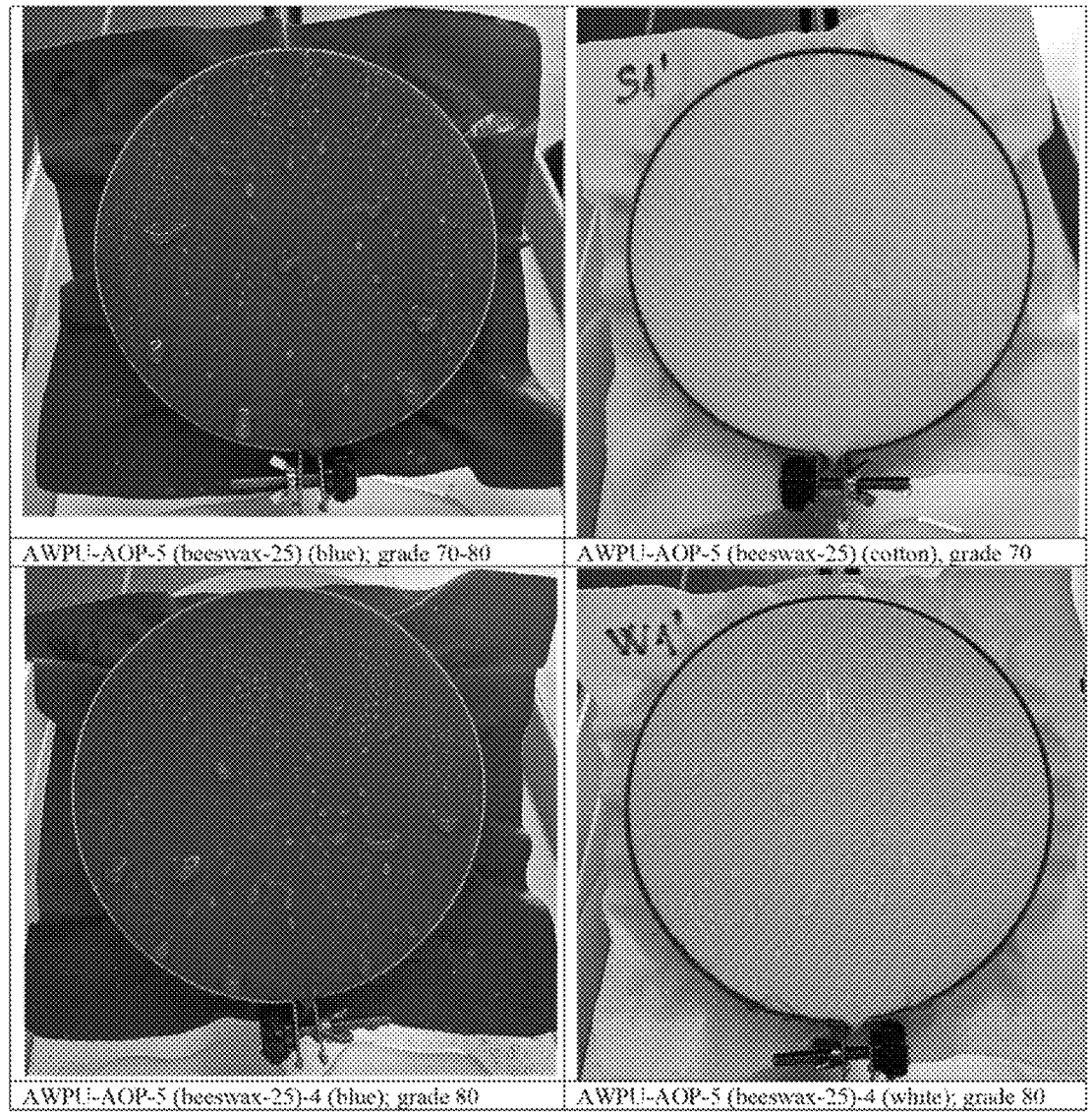
FIG. 10 illustrates water repellency of cotton fabric impregnated with AWPU-AOP-5/25 wt % beeswax dispersions with varying amounts of TEA in excess, according to spray rating (bars) and water absorption (black squares).

FIG. 10 shows photographs of the appearance of the fabric (Nylon/Spandex, blue) and cotton treated with AWPU-AOP-5 (beeswax-25), (S1 and S1') and AWPU-AOP-5(beeswax-25)-4, (W1 and W1') on frame after spray testing.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for producing a polyurethane dispersion, the method comprising:
   a) epoxidizing an algal triglyceride (TAG) oil, thereby generating an epoxidized algal TAG oil;
   b) ring opening the epoxidized algal TAG oil in the presence of an alcohol, thereby generating an algal oil polyol;
   c) reacting the algal oil polyol with an isocyanate, an ionomer, and an additive, thereby generating an isocyanate-terminated pre-polymer;
   d) neutralizing the isocyanate-terminated pre-polymer with an acid or a base, thereby generating a neutralized isocyanate-terminated pre-polymer; and
   e) dispersing the neutralized isocyanate-terminated pre-polymer in water, thereby generating the polyurethane dispersion that encapsulates the additive,
   wherein the algal TAG oil comprises at least 60% of one or more monounsaturated fatty acids, wherein the additive is a wax.

2. The method of claim 1, wherein the algal TAG oil comprises at least 80% of one or more monounsaturated fatty acids.

3. The method of claim 1, wherein the one or more monounsaturated fatty acids is a C18:1 fatty acid.

4. The method of claim 1, wherein the one or more monounsaturated fatty acids is oleic acid.

5. The method of claim 1, wherein the algal TAG oil comprises at least 60% of oleic acid.

6. The method of claim 1, wherein the algal TAG oil comprises at least 80% of oleic acid.

7. The method of claim 1, wherein the algal TAG oil has an iodine value of at least 80 g $I_2$/100 g.

8. The method of claim 1, wherein the epoxidized algal TAG oil comprises at least 80% epoxidized oleic acid.

9. The method of claim 1, wherein the epoxidized algal TAG oil comprises at least 90% epoxidized oleic acid.

10. The method of claim 1, wherein the alcohol is ethanol.

11. The method of claim 1, wherein the isocyanate is isophorone diisocyanate (IPDI).

12. The method of claim 1, wherein the isocyanate is dicyclohexylmethane diisocyanate (HMDI).

13. The method of claim 1, wherein the ionomer is N-methyldiethanolamine (MDEA).

14. The method of claim 1, wherein the wax is beeswax.

15. The method of claim 1, wherein the wax is carnauba wax.

16. The method of claim 1, wherein the neutralizing of the isocyanate-terminated pre- polymer is with acetic acid.

17. The method of claim 1, wherein the molar ratio of the algal oil polyol, the ionomer, and the isocyanate is 0.8-1.2 to 0.8-1.2 to 1.8-2.3, respectively.

18. The method of claim 1, wherein the molar ratio of the algal oil polyol, the ionomer, and the isocyanate is 1 to 0.95 to 2, respectively.

19. The method of claim 1, wherein the molar ratio of the algal oil polyol, the ionomer, and the isocyanate is 1 to 1.2 to 2.3, respectively.

20. A method for producing a polyurethane dispersion, the method comprising:
   a) epoxidizing an algal triglyceride (TAG) oil, thereby generating an epoxidized algal TAG oil;
   b) ring opening the epoxidized algal TAG oil in the presence of ethanol, thereby generating an algal oil polyol;
   c) reacting the algal oil polyol with isophorone diisocyanate (IPDI), N-methyldiethanolamine (MDEA), and at least one wax, thereby generating an isocyanate- terminated pre-polymer; and
   d) dispersing the isocyanate-terminated pre-polymer in water, thereby generating the polyurethane dispersion,
   wherein the algal TAG oil comprises at least 60% of one or more monounsaturated fatty acids, wherein the molar ratio of the algal oil polyol, the MDEA, and the IPDI is 1 to 1.2 to 2.3, respectively.

21. The method of claim 20, wherein the algal TAG oil comprises at least 80% of one or more monounsaturated fatty acids.

22. The method of claim 20, further comprising neutralizing the isocyanate-terminated pre-polymer with acetic acid.

23. The method of claim 20, wherein the reacting is performed in the presence of methyl ethyl ketone.

* * * * *